United States Patent
Sharifi et al.

(10) Patent No.: US 10,244,369 B1
(45) Date of Patent: Mar. 26, 2019

(54) SCREEN CAPTURE IMAGE REPOSITORY FOR A USER

(71) Applicant: GOOGLE LLC, Mountain View, CA (US)

(72) Inventors: Matthew Sharifi, Kilchberg (CH); David Petrou, Brooklyn, NY (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/131,077

(22) Filed: Sep. 14, 2018

Related U.S. Application Data

(60) Continuation of application No. 15/692,682, filed on Aug. 31, 2017, now Pat. No. 10,080,114, which is a
(Continued)

(51) Int. Cl.
*H04W 4/18* (2009.01)
*G06F 17/24* (2006.01)
(Continued)

(52) U.S. Cl.
CPC .......... *H04W 4/18* (2013.01); *G06F 3/04842* (2013.01); *G06F 3/04845* (2013.01);
(Continued)

(58) Field of Classification Search
CPC ................. H04W 4/18; G06F 3/04845; G06F 17/30321; G06F 17/3053; G06F 17/30259;
(Continued)

(56) References Cited

U.S. PATENT DOCUMENTS 5,731,844 A   3/1998   Rauch et al.
5,946,647 A   8/1999   Miller et al.
(Continued)

FOREIGN PATENT DOCUMENTS

CN   101075236 A   11/2007
CN   101201827 A   6/2008
(Continued)

OTHER PUBLICATIONS

"The new IFTTT is here", IFTTT Blog (https://ifttt.com/blog/2016/11/the-new-ifttt-is-here), printed Nov. 3, 2016, 6 pages.
(Continued)

*Primary Examiner* — Amandeep Saini
(74) *Attorney, Agent, or Firm* — Brake Hughes Bellermann LLP

(57) ABSTRACT

Systems and methods are provided for receiving a screen capture image from a client device, the screen capture image being generated responsive to a command from a user, and the screen capture image including content generated by an application. The method also includes saving the screen capture image in a data store of images. The data store of images is associated with a user profile of the user using the client device. The method also includes associating a timestamp with the screen capture image and receiving an expiration time for the screen capture image from the user. The screen capture image is available for display until the expiration time.

20 Claims, 26 Drawing Sheets

Related U.S. Application Data division of application No. 14/712,679, filed on May 14, 2015, now Pat. No. 9,788,179.

(60) Provisional application No. 62/023,736, filed on Jul. 11, 2014.

(51) Int. Cl.

| | | |
|---|---|---|
| *G06F 17/30* | (2006.01) | |
| *G06K 9/00* | (2006.01) | |
| *H04L 29/08* | (2006.01) | |
| *G06F 3/0484* | (2013.01) | |
| *G06F 9/451* | (2018.01) | |
| *G06Q 10/10* | (2012.01) | |
| *G06K 9/62* | (2006.01) | |
| *G06F 17/22* | (2006.01) | |
| *G06F 17/27* | (2006.01) | |

(52) U.S. Cl.
CPC .......... *G06F 9/451* (2018.02); *G06F 17/2235* (2013.01); *G06F 17/241* (2013.01); *G06F 17/278* (2013.01); *G06F 17/3053* (2013.01); *G06F 17/30112* (2013.01); *G06F 17/30247* (2013.01); *G06F 17/30259* (2013.01); *G06F 17/30268* (2013.01); *G06F 17/30321* (2013.01); *G06F 17/30899* (2013.01); *G06K 9/00469* (2013.01); *G06K 9/6215* (2013.01); *G06Q 10/1097* (2013.01); *H04L 67/06* (2013.01)

(58) Field of Classification Search
CPC .... G06F 9/451; G06F 3/04842; G06F 17/241; G06F 17/30112; G06F 17/30247; G06F 17/30268; G06F 17/278; G06F 17/30899; G06F 17/2235; G06K 9/6215; G06K 9/00469; G06Q 10/1097; H04L 67/06
USPC ......................................................... 382/305
See application file for complete search history.

(56) References Cited

U.S. PATENT DOCUMENTS

| | | | |
|---|---|---|---|
| 6,662,226 B1 | 12/2003 | Wang et al. | |
| 7,054,917 B1 | 5/2006 | Kirsch et al. | |
| 7,421,153 B1 | 9/2008 | Ronca et al. | |
| 7,548,915 B2 | 6/2009 | Ramer et al. | |
| 7,822,759 B2 | 10/2010 | MacLaurin et al. | |
| 7,917,514 B2 | 3/2011 | Lawler et al. | |
| 8,090,222 B1 | 1/2012 | Baluja et al. | |
| 8,131,786 B1 | 3/2012 | Bengio et al. | |
| 8,150,911 B2 | 4/2012 | Bell et al. | |
| 8,204,966 B1 | 6/2012 | Mendis et al. | |
| 8,255,386 B1 | 8/2012 | Annau et al. | |
| 8,280,414 B1 | 10/2012 | Nourse et al. | |
| 8,341,156 B1 | 12/2012 | Westgate et al. | |
| 8,347,237 B2 | 1/2013 | Bier et al. | |
| 8,418,055 B2 | 4/2013 | King et al. | |
| 8,452,799 B2 | 5/2013 | Zhou et al. | |
| 8,468,110 B1 | 6/2013 | Podgorny et al. | |
| 8,571,319 B2 | 10/2013 | Balasubramanian et al. | |
| 8,645,325 B2 | 2/2014 | Anderson et al. | |
| 8,671,341 B1 | 3/2014 | Hellwig et al. | |
| 8,700,604 B2 | 4/2014 | Roseman et al. | |
| 8,767,497 B2 | 7/2014 | Marumoto et al. | |
| 8,799,061 B1 | 8/2014 | Chatterjee et al. | |
| 8,954,836 B1 | 2/2015 | Look et al. | |
| 8,977,639 B2 | 3/2015 | Petrou et al. | |
| 9,165,406 B1 | 10/2015 | Gray et al. | |
| 9,176,984 B2 | 11/2015 | Hull et al. | |
| 9,276,883 B2 | 3/2016 | Zhang et al. | |
| 9,354,778 B2 | 5/2016 | Cornaby et al. | |
| 9,424,668 B1 | 8/2016 | Petrou et al. | |
| 9,582,482 B1 | 2/2017 | Sharifi et al. | |
| 9,703,541 B2 | 7/2017 | Sharifi et al. | |
| 9,762,651 B1 | 9/2017 | Sharifi et al. | |
| 9,788,179 B1 | 10/2017 | Sharifi et al. | |
| 9,798,708 B1 | 10/2017 | Sharifi et al. | |
| 2004/0117750 A1 | 6/2004 | Skoll et al. | |
| 2005/0083413 A1 | 4/2005 | Reed et al. | |
| 2006/0047639 A1 | 3/2006 | King et al. | |
| 2006/0080594 A1 | 4/2006 | Chavoustie et al. | |
| 2006/0106844 A1 | 5/2006 | Naick et al. | |
| 2006/0156222 A1 | 7/2006 | Chi et al. | |
| 2006/0221409 A1 | 10/2006 | Cohen et al. | |
| 2006/0253491 A1 | 11/2006 | Gokturk et al. | |
| 2007/0008321 A1 | 1/2007 | Gallagher et al. | |
| 2007/0047781 A1 | 3/2007 | Hull et al. | |
| 2007/0143345 A1 | 6/2007 | Jones et al. | |
| 2007/0168379 A1 | 7/2007 | Patel et al. | |
| 2007/0233671 A1 | 10/2007 | Oztekin et al. | |
| 2008/0176606 A1 | 7/2008 | Kim | |
| 2008/0235018 A1 | 9/2008 | Eggen et al. | |
| 2008/0275701 A1 | 11/2008 | Wu et al. | |
| 2008/0281974 A1 | 11/2008 | Slothouber et al. | |
| 2008/0301101 A1 | 12/2008 | Baratto et al. | |
| 2008/0313031 A1 | 12/2008 | Li et al. | |
| 2009/0005003 A1 | 1/2009 | Hartwell | |
| 2009/0006388 A1 | 1/2009 | Ives et al. | |
| 2009/0036215 A1 | 2/2009 | Saeki | |
| 2009/0063431 A1 | 3/2009 | Erol et al. | |
| 2009/0138466 A1 | 5/2009 | Henry et al. | |
| 2009/0228573 A1 | 9/2009 | Asakawa et al. | |
| 2009/0228777 A1 | 9/2009 | Henry et al. | |
| 2009/0252413 A1 | 10/2009 | Hua et al. | |
| 2009/0282012 A1 | 11/2009 | Konig et al. | |
| 2009/0319449 A1 | 12/2009 | Gamon et al. | |
| 2010/0010987 A1 | 1/2010 | Smyth et al. | |
| 2010/0060655 A1 | 3/2010 | Huang | |
| 2010/0088612 A1 | 4/2010 | Jia et al. | |
| 2010/0250598 A1 | 9/2010 | Brauer et al. | |
| 2010/0262928 A1 | 10/2010 | Abbott | |
| 2010/0306249 A1 | 12/2010 | Hill et al. | |
| 2010/0313141 A1 | 12/2010 | Yu et al. | |
| 2011/0072455 A1 | 3/2011 | Pickelsimer et al. | |
| 2011/0125735 A1 | 5/2011 | Petrou | |
| 2011/0128288 A1 | 6/2011 | Petrou et al. | |
| 2011/0131160 A1 | 6/2011 | Canny et al. | |
| 2011/0131235 A1 | 6/2011 | Petrou et al. | |
| 2011/0137895 A1 | 6/2011 | Petrou et al. | |
| 2011/0145692 A1 | 6/2011 | Noyes et al. | |
| 2011/0191676 A1 | 8/2011 | Guttman et al. | |
| 2011/0225152 A1 | 9/2011 | Beaudreau et al. | |
| 2011/0238768 A1 | 9/2011 | Habets et al. | |
| 2011/0246471 A1 | 10/2011 | Rakib | |
| 2011/0258049 A1 | 10/2011 | Ramer et al. | |
| 2011/0275358 A1 | 11/2011 | Faenger | |
| 2011/0283296 A1 | 11/2011 | Chun | |
| 2011/0307478 A1 | 12/2011 | Pinckney et al. | |
| 2011/0307483 A1 | 12/2011 | Radlinski et al. | |
| 2012/0044137 A1 | 2/2012 | Oddiraju et al. | |
| 2012/0083294 A1 | 4/2012 | Bray et al. | |
| 2012/0092286 A1 | 4/2012 | O'Prey et al. | |
| 2012/0117058 A1 | 5/2012 | Rubinstein et al. | |
| 2012/0158751 A1 | 6/2012 | Tseng | |
| 2012/0159340 A1 | 6/2012 | Bae et al. | |
| 2012/0191840 A1 | 7/2012 | Gordon | |
| 2012/0194519 A1 | 8/2012 | Bissell et al. | |
| 2012/0216102 A1 | 8/2012 | Malla | |
| 2013/0080447 A1 | 3/2013 | Ramer et al. | |
| 2013/0091463 A1 | 4/2013 | Nordstrom et al. | |
| 2013/0097507 A1 | 4/2013 | Prewett | |
| 2013/0108161 A1 | 5/2013 | Carr | |
| 2013/0111328 A1 | 5/2013 | Khanna et al. | |
| 2013/0117252 A1 | 5/2013 | Samaddar et al. | |
| 2013/0173604 A1 | 7/2013 | Li et al. | |
| 2013/0254217 A1 | 9/2013 | Xu | |
| 2013/0263098 A1 | 10/2013 | Duda et al. | |
| 2013/0290110 A1 | 10/2013 | Luvogt et al. | |
| 2013/0325844 A1 | 12/2013 | Plaisant | |
| 2013/0346431 A1 | 12/2013 | Erol et al. | |
| 2014/0025706 A1 | 1/2014 | Barve et al. | |

(56) References Cited

U.S. PATENT DOCUMENTS

| | | |
|---|---|---|
| 2014/0029810 A1 | 1/2014 | Barr et al. |
| 2014/0040272 A1 | 2/2014 | Houghton |
| 2014/0046965 A1 | 2/2014 | Tian et al. |
| 2014/0053227 A1* | 2/2014 | Ruppin .............. G06F 21/10 726/1 |
| 2014/0082670 A1 | 3/2014 | Papish |
| 2014/0089626 A1 | 3/2014 | Schluessler et al. |
| 2014/0118597 A1 | 5/2014 | Tabak et al. |
| 2014/0142922 A1 | 5/2014 | Liang et al. |
| 2014/0146200 A1 | 5/2014 | Scott et al. |
| 2014/0152655 A1 | 6/2014 | Johnston et al. |
| 2014/0157210 A1 | 6/2014 | Katz et al. |
| 2014/0164371 A1 | 6/2014 | Tesch et al. |
| 2014/0188889 A1 | 7/2014 | Martens et al. |
| 2014/0208234 A1 | 7/2014 | Amit et al. |
| 2014/0240543 A1* | 8/2014 | Kim .............. H04N 5/2258 348/231.99 |
| 2014/0250147 A1 | 9/2014 | Shapira et al. |
| 2014/0279013 A1 | 9/2014 | Chelly et al. |
| 2014/0282660 A1 | 9/2014 | Oztaskent et al. |
| 2014/0316890 A1 | 10/2014 | Kagan |
| 2014/0362108 A1 | 12/2014 | Aguera-Arcas |
| 2014/0366158 A1 | 12/2014 | Han et al. |
| 2015/0016700 A1 | 1/2015 | Drozdzal et al. |
| 2015/0019997 A1 | 1/2015 | Kim et al. |
| 2015/0095855 A1 | 4/2015 | Bai et al. |
| 2015/0100524 A1 | 4/2015 | Pantel et al. |
| 2015/0169701 A1 | 6/2015 | Stekkelpak et al. |
| 2015/0178786 A1 | 6/2015 | Claessens |
| 2015/0212695 A1 | 7/2015 | Nordstrom et al. |
| 2015/0339405 A1 | 11/2015 | Vora et al. |
| 2016/0055246 A1 | 2/2016 | Marcin et al. |
| 2016/0321052 A1 | 11/2016 | Sharifi et al. |
| 2017/0098159 A1 | 4/2017 | Sharifi et al. |
| 2017/0118576 A1 | 4/2017 | Sharifi et al. |
| 2017/0139879 A1 | 5/2017 | Sharifi et al. |

FOREIGN PATENT DOCUMENTS

| | | |
|---|---|---|
| CN | 101587495 A | 11/2009 |
| CN | 101763357 A | 6/2010 |
| EP | 2306290 A2 | 4/2011 |
| EP | 2466921 A2 | 6/2012 |
| EP | 2728481 A1 | 5/2014 |
| EP | 2824558 A1 | 1/2015 |
| WO | 0308080 A1 | 10/2003 |
| WO | 2009054619 A2 | 4/2009 |
| WO | 2012075315 A1 | 6/2012 |
| WO | 2013173940 A1 | 11/2013 |
| WO | 2014105922 A1 | 7/2014 |
| WO | 2014146265 A1 | 9/2014 |
| WO | 2016029099 A1 | 2/2016 |

OTHER PUBLICATIONS

Adistambha, et al., "Efficient multimedia query-by-content from mobile devices", Computers & Electrical Engineering XX, vol. 36, No. 4, 2010, pp. 626-642.

Collobert, Ronan, et al., "Natural Language Processing (almost) from Scratch", Journal of Machine Learning Research, vol. 12, Aug. 1, 2011, pp. 2493-2537.

Hsu, et al. "Snap2Read: Automatic Magazine Capturing and Analysis for Adaptive Mobile Reading", Lecture Notes in Computer Science, vol. 6524, 2011, 11 pages.

Minkov, et al. "Extracting Personal Names from Emails: Applying Named Entity Recognition to Informal Text," Assoc. of Computational Linguistics, 2004, 26 pages.

* cited by examiner

Italian restaurant Palo Alto

Italian Cafe
www.italianpa.com
3.0 ★★★☆☆
more info
822 Emerson St. Palo Alto
(650) 329-2746

Mr. Calzone
www.calzone.com
4.0 ★★★★☆
more info
733 Sheridan Ave. Palo Alto
(650) 328-5438

Mama's Kitchen
www.mamaspaloalto.com
2.0 ★★☆☆☆
more info
834 University Ave. Palo Alto
(650) 324-6549

Mio Ristorante Italiano
www.mioristorante.com
4.1 ★★★★☆
more info
9032 Bryant St. Palo Alto
(650) 325-8736

Italian restaurant (Palo Alto) — 625

Italian Cafe
www.italianpa.com
3.0 ★★★☆☆
more info
(822 Emerson St. Palo Alto)
(650) 329-2746

Mr. Calzone
www.calzone.com
4.0 ★★★★☆
more info
(733 Sheridan Ave. Palo Alto)
(650) 328-5438

Mama's Kitchen
www.mamaspaloalto.com
2.0 ★★☆☆☆
more info
(834 University Ave. Palo Alto)
(650) 324-6549

Mio Ristorante Italiano — 605
www.mioristorante.com — 610
4.1 ★★★★☆
more info
(9032 Bryant St. Palo Alto) — 615
(650) 325-8736 — 620

SCREEN CAPTURE IMAGE REPOSITORY FOR A USER

RELATED APPLICATIONS

This application is a continuation of U.S. application Ser. No. 15/692,682, filed on Aug. 31, 2017, titled "Detection and Ranking of Entities From Mobile Onscreen Content, which is a divisional of U.S. application Ser. No. 14/712, 679, filed on May 14, 2015, titled "Detection and Ranking of Entities From Mobile Onscreen Content," which is a non-provisional of, and claims priority to, U.S. Provisional Application No. 62/023,736, filed on Jul. 11, 2014, titled "User Interface Enhancements for a Mobile Device." The subject matter of these earlier filed applications are incorporated herein by reference.

BACKGROUND

Due to the use of mobile devices, such as smartphones and tablets, user interaction with mobile applications has been increasing. But unlike web-based applications, mobile applications can differ significantly in the features they provide. For example, link structure, the user interface, and interaction with other applications can be inconsistent from one app to another. Additionally, because mobile applications are conventionally closed (e.g., cannot be crawled), the actions of the user cannot be used as context to improve the user experience, such as personalizing search, targeting advertising, and providing personalized suggestions and assistance.

SUMMARY

Implementations capture an image of a screen on a mobile device at intervals and analyze the screen content via recognition tools to provide context for improving the user experience. For example, in some implementations, the system performs entity detection in a mobile app environment. To provide context for disambiguation, the system may group some of the captured images into a window. The window may represent a fixed length of time, with some portions of the window providing context for entities occurring in the other portions. In some implementations, the system is adaptive so the window is larger when the user's screen is static (e.g. no scrolling). Entities may be disambiguated, ranked, and associated with a user profile. In some implementations, the system may generate annotation data to provide personalized assistance the user. The annotation data may provide a visual cue for actionable content, entities or content relevant to the user, summary information, etc. The annotation data may present the annotation content, and also provide additional content, such as labels, image labels, expunge areas, etc. In some implementations, the system may index the captured images, for example by text and/or entities identified from an image. The system may use the index in various ways, such as allowing a user to search for previously viewed content, to provide context-based assistance, and to automate user input. In some implementations, the system enables the user to share a current screen or previously captured screens with another user. In some implementations, the system may track or capture user input actions, such as taps, swipes, text input, or any other action the user takes to interact with the mobile device and use this information to learn and automate actions to assist the user. In some implementations, the system may use additional data, such as the location of the mobile device, ambient light, device motion, etc., to enhance the analysis of screen data and generation of annotation data.

In one aspect, a mobile device includes at least one processor and memory storing a graph-based data store of entities connected by edges and recognized items identified by performing recognition on each of a plurality of images of screens captured on the mobile device each recognized item being associated with an image of the plurality of images. The memory may also store instructions that, when executed by the at least one processor, cause the mobile device select a set of images from the plurality of images, the set representing a chronological window of time, each image in the set having a timestamp within the chronological window, and to identify entities from the graph-based data store in the recognized items of images in a first portion of the window using recognized items for images in a remaining portion of the window as context to disambiguate ambiguous entity references.

According to one aspect, a computer system includes at least one processor and memory storing instructions that, when executed by the at least one processor, cause the system to receive, from a mobile device, an image of a screen displayed on the mobile device, to identify recognized items for the image by performing recognition on the image, and to repeat the receiving and identifying for a plurality of images. The instructions may also include instructions that, when executed by the at least one processor, cause the system to select a set of images from the plurality of images, the set representing a chronological window of time, each image in the set having a timestamp within the chronological window and to identify entities appearing in the recognized items for images in a first portion of the window using the recognized items for images in a remaining portion of the window as context to disambiguate ambiguous entity references.

According to one aspect, a method includes receiving an image captured from a mobile device display for a mobile application, determining a window that includes a chronological set of images, the images each representing a respective screen captured from a display of a mobile device and having an associated timestamp, and identifying entities appearing in images in a first portion of the window using text for images in a remaining portion of the window as context to disambiguate ambiguous entity references.

In one aspect, a method includes capturing a screen displayed on a mobile device as an image, sending the image to a server, and determining when to repeat the capturing and sending based on user interaction with the screen. These and other aspects can include one or more of the following features. For example, determining when to repeat the capturing and sending can include repeating the capturing and sending at a first interval when the screen displayed on the mobile device is static and repeating the capturing and sending at a second interval when the screen is not static. In addition or optionally, the second interval is no longer than one second. As another example, the method may also include receiving data from the server generated from the image and using the data to personalize the screen displayed to the user. As another example, the method may also include identifying entities from a data graph that appear in content represented by the captured screen and storing, in a user profile, the entities identified.

In one general aspect, a computer program product embodied on a computer-readable storage device includes instructions that, when executed by at least one processor formed in a substrate, cause a computing device to perform any of the disclosed methods, operations, or processes.

Another general aspect includes a system and/or a method for detection and ranking of entities from mobile screen content, substantially as shown in and/or described in connection with at least one of the figures, and as set forth more completely in the claims. Another general aspect includes a system and/or a method for highlighting important or user-relevant mobile onscreen content, substantially as shown in and/or described in connection with at least one of the figures, and as set forth more completely in the claims. Another general aspect includes a system and/or a method for providing actions for mobile onscreen content, substantially as shown in and/or described in connection with at least one of the figures, and as set forth more completely in the claims. Another general aspect includes a system and/or a method for providing insight for mobile onscreen content, substantially as shown in and/or described in connection with at least one of the figures, and as set forth more completely in the claims. Another general aspect includes a system and/or a method for indexing mobile onscreen content, substantially as shown in and/or described in connection with at least one of the figures, and as set forth more completely in the claims. Another general aspect includes a system and/or a method for automating user input and/or providing assistance from interaction understanding, substantially as shown in and/or described in connection with at least one of the figures, and as set forth more completely in the claims. Another general aspect includes a system and/or a method for sharing mobile onscreen content, substantially as shown in and/or described in connection with at least one of the figures, and as set forth more completely in the claims.

One or more of the implementations of the subject matter described herein can be implemented so as to realize one or more of the following advantages. As one example, implementations may provide a consistent user experience across mobile applications, so that similar type of actionable content behaves the same across applications. As another example, implementations provide context for personalizing certain tasks, such as ranking search results and providing assistance. As another example, implementations provide an interface to quickly discover user-relevant and content relevant content on the screen and to surface insightful relationships between entities displayed in the content. As another example, implementations may allow a user of a mobile device to share a screen with another user or to transfer the state of one mobile device to another mobile device. Implementations may also allow a mobile device to automatically perform a task with minimal input from the user.

The details of one or more implementations are set forth in the accompanying drawings and the description below. Other features will be apparent from the description and drawings, and from the claims.

BRIEF DESCRIPTION OF DRAWINGS

FIG. 6A illustrates an example display of a mobile computing device.

FIG. 6B illustrates the example display of FIG. 6A displayed with annotation data identifying actionable content, in accordance with disclosed implementations.

FIG. 12A illustrates an example display of a mobile computing device with annotation data highlighting connections between entities found in the content of the display, in accordance with disclosed implementations.

FIG. 12B illustrates an example display of a mobile computing device with annotation data providing information about a connection between two entities found in the content of the display, in accordance with disclosed implementations.

Like reference symbols in the various drawings indicate like elements.

DETAILED DESCRIPTION

Figure 1:
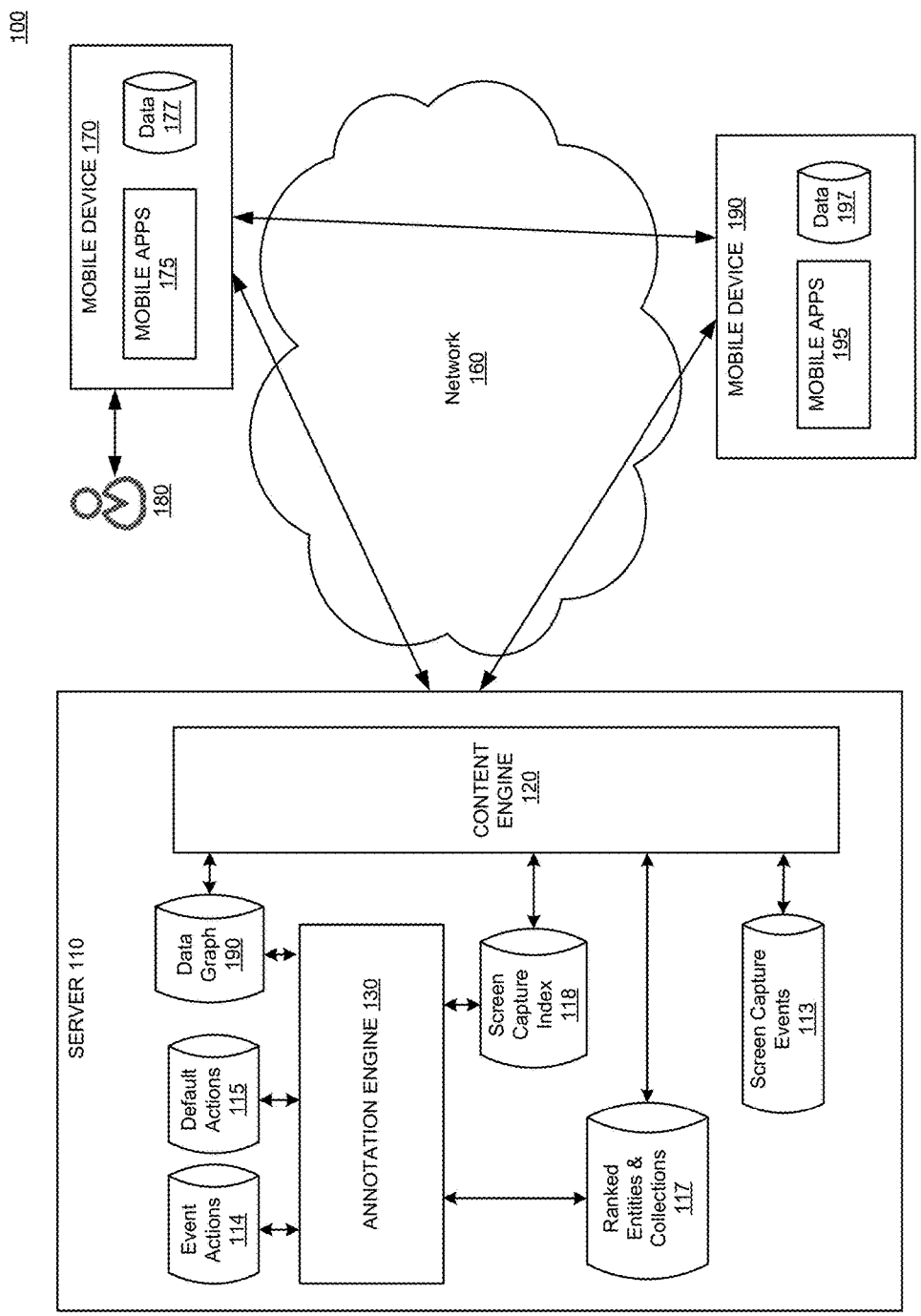
FIG. 1 is a block diagram illustrating an example system in accordance with the disclosed subject matter.
Figure 3:
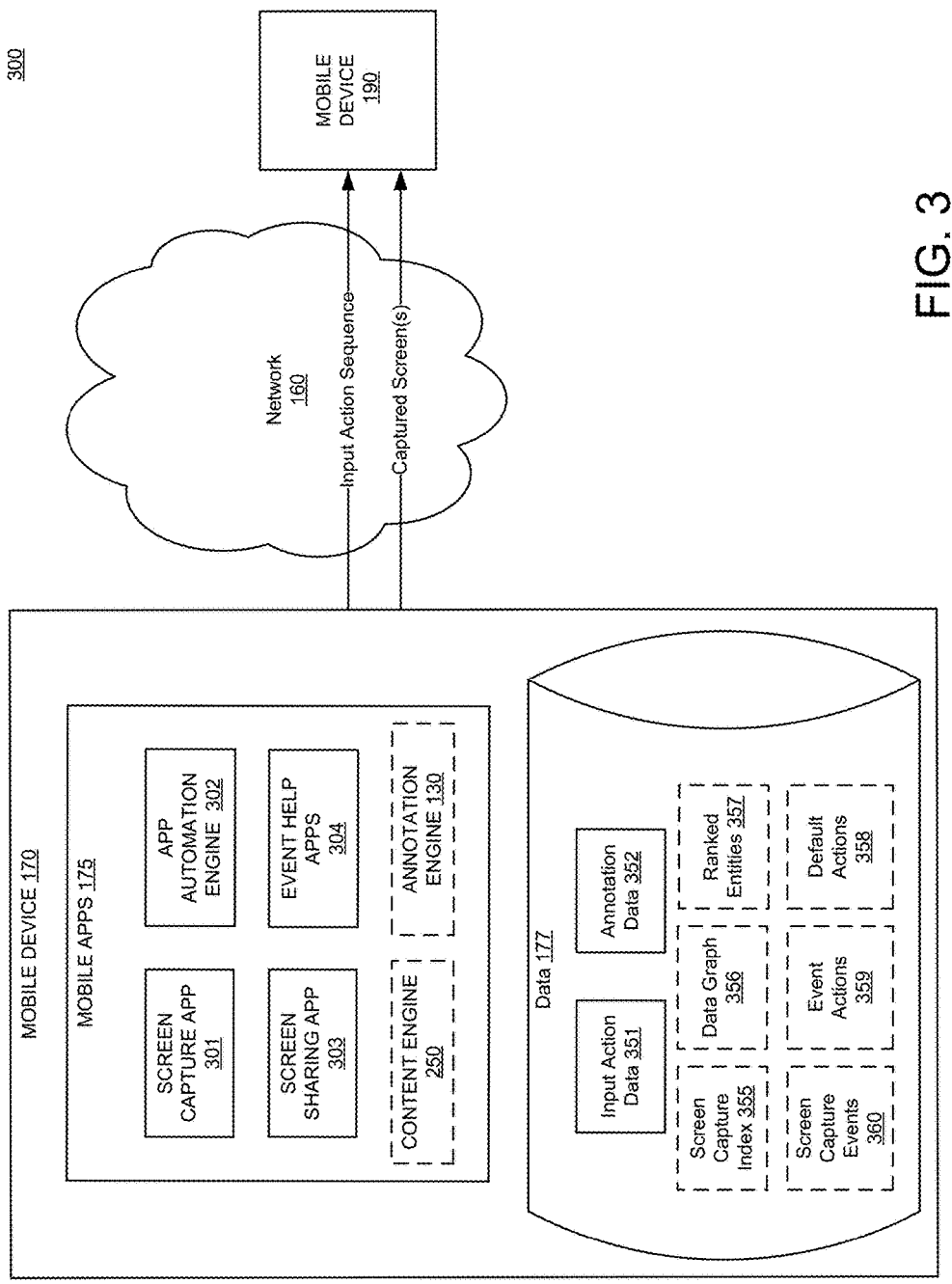
FIG. 3 is a block diagram illustrating another example system in accordance with the disclosed subject matter.

FIG. 1 is a block diagram of a mobile content context system in accordance with an example implementation. The system 100 may be used to provide context for various forms of user assistance on a mobile device and a consistent user experience across mobile applications. The depiction of system 100 in FIG. 1 is a client-server system, with some data processing occurring at a server 110. However, other configurations and applications may be used. For example, the data processing may occur exclusively on the mobile device 170, as illustrated in FIG. 3. Furthermore, in some implementations some of the processing may be done on the mobile device 170 and some of the processing may occur on the server 110. In some implementations, a user of the mobile device 170 may indicate that portions of the processing be performed at the server 110. Thus, implementations are not limited to the exact configurations illustrated.

The mobile content context system 100 may include a data graph 190. The data graph 190 may be a large graph-based data store that stores data and rules that describe knowledge about the data in a form that provides for deductive reasoning. For example, in a data graph, information may be stored about entities in the form of relationships to other entities. An entity may be may be a person, place, item, idea, topic, word, phrase, abstract concept, concrete element, other suitable thing, or any combination of these. Entities may be related to each other by labeled edges that represent relationships. The labeled edges may be directed or undirected. For example, the entity representing the National Football League may be related to a Jaguar entity by a "has team" relationship. A data graph with a large number of entities and even a limited number of relationships may have billions of connections. In some implementations, data graph 190 may be stored in an external storage device accessible from server 110 and/or mobile device 170. In some implementations, the data graph 190 may be distributed across multiple storage devices and/or multiple computing devices, for example multiple servers. The entities and relationships in the data graph 190 may be searchable, e.g., via an index. For example, the index may include text by which an entity has been referred to. Thus, reference to the data graph 190 may be understood to include an index that facilitates finding an entity using a text equivalent.

Figure 25:
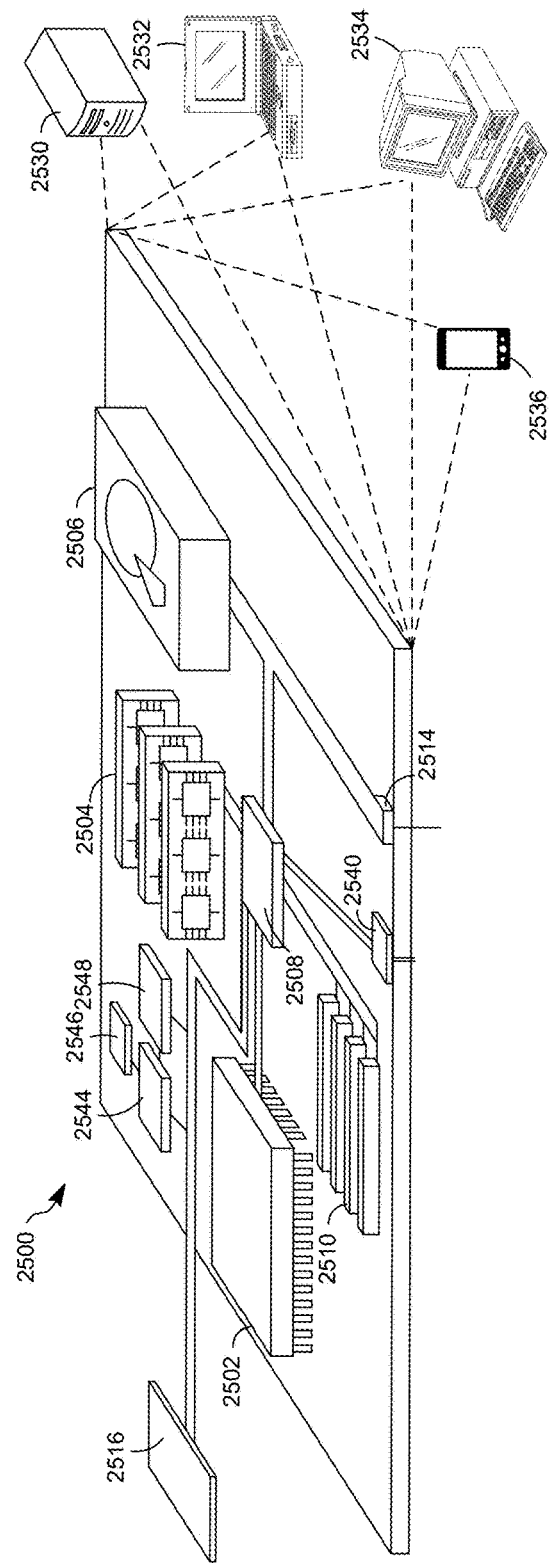
FIG. 25 shows an example of a computer device that can be used to implement the described techniques.
Figure 26:
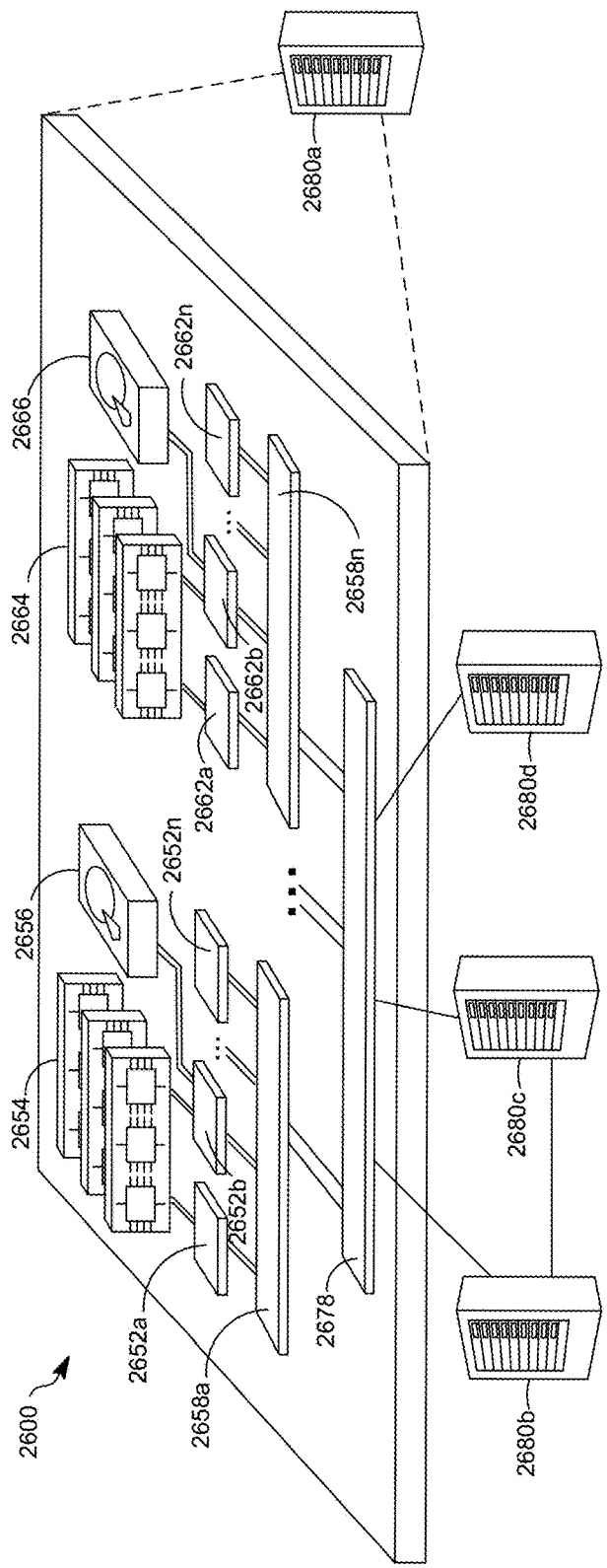
FIG. 26 shows an example of a distributed computer device that can be used to implement the described techniques.

The mobile content context system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 2500, as depicted in FIG. 25, or computer device 2600, as depicted in FIG. 26. Server 110 may include one or more processors formed in a substrate configured to execute one or more machine executable instructions or pieces of software, firmware, or a combination thereof. The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules that, when executed by the one or more processors, perform certain operations. In some implementations, the modules may be stored in an external storage device and loaded into the memory of server 110.

The mobile content context system 100 may include a content engine 120 and an annotation engine 130. The content engine 120 may include components that analyze images of screenshots taken on a mobile device to determine content that can be used to provide context and assistance, as well as supporting components that index, search, and share the content. Annotation engine 130 may include components that use the content identified by the content engine and provide a user-interface layer that offers additional information and/or actions to the user of the device in a manner consistent across mobile applications. As illustrated in FIG. 1, components of the content engine 120 and the annotation engine 130 may be executed by server 110. In some implementations, one or more components of the content engine 120 and the annotation engine 130 may be executed as a mobile application on mobile device 170, either as part of the operating system or a separate application.

Figure 2:
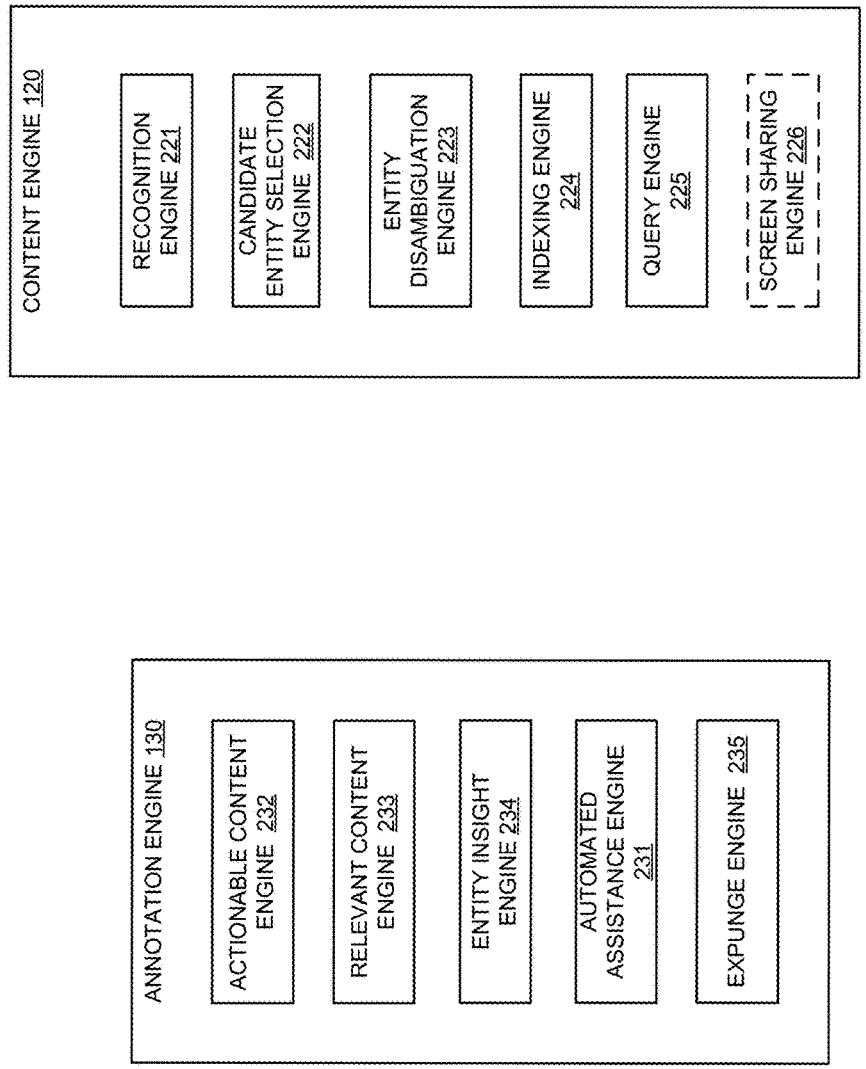
FIG. 2 is an example block diagram that illustrates components that can be used in an example system, in accordance with the disclosed subject matter.

FIG. 2 is a block diagram that illustrates components of the content engine 120 and the annotation engine 130 that can be used in an example system. The content engine 120 includes a recognition engine 221. The recognition engine 221 may be configured to perform various types of recognition on an image, including character recognition, image recognition, logo recognition, etc., using conventional or later developed techniques. Thus, recognition engine 221 may be configured to determine text, landmarks, logos, etc. from an image and the location of these items in the image.

The content engine 120 may also include a candidate entity selection engine 222. The candidate entity selection engine 222 may match the items identified by the recognition engine 221 to entities in the data graph 190. Entity mention identification can include looking up tokens or sequences of ngrams (each an example of an item identified by the recognition engine) and matching them to entities, for example in a table that maps from the token or ngram to an entity. Entity mention identified can also involve several techniques, including part-of-speech tagging, dependency parsing, noun-phrase extraction, and coreference resolution on the identified items. Part-of-speech tagging identifies the part of speech that each word in the text of the document belongs to. Dependency parsing identifies the relationships between the parts-of-speech. Noun-phrase extraction identifies, or segments, noun phrases such as the phrases "Barack Obama," "Secretary Clinton," or "First Lady." In other words, noun-phrase extraction aims to identify potential mentions of entities, including the words used to describe them. Coreference resolution aims to match a pronoun or pronominal to a noun phrase. The candidate entity selection engine 222 may use any conventional techniques for part-of-speech tagging, dependency parsing, noun-phrase extraction, and coreference resolution. "Accurate Unlexicalized Parsing" by Klein et al. in the Proceedings of the 41$^{st}$ Annual Meeting on Association for Computational Linguistics, July 2003, and "Simple Coreference Resolution With Rich Syntactic and Semantic Features" by Haghighi et al. in Proceedings of the 2009 Conference on Empirical Methods in Natural Language Processing, August 2009, which are both incorporated herein by reference, provide examples of such methods.

Once possible entity mentions are found the candidate entity selection engine 222 may identify each entity in the data graph 190 that may match the possible entity mentions in the text and/or images. For example, if the candidate entity selection engine 222 identifies the text "Jaguar" as a possible entity mention, the candidate entity selection engine 222 may match that text, also referred to as a text mention, to three entities: one representing an animal, one representing an NFL team, and the third representing a car. Thus, the text mention has three candidate entities. It is understood that entities may be associated with text or with images and logos. For example, a picture of Big Ben may be associated with an entity representing Big Ben in the data graph. Similarly, a picture of President Obama may be associated with an entity representing Barack Obama in the data graph.

The content engine 120 may also include an entity disambiguation engine 223. The entity disambiguation engine 223 determines a winner from among the candidate entities for a text mention. The disambiguation engine 223 may include a machine-learning algorithm that uses conventional entity disambiguation signals as well as signals unique to a mobile application environment. The entity disambiguation engine 223 may also assign a rank to the disambiguated entities. Detection of entities in text as a user is surfing the Internet in a web-browser-based environment has been used, with user consent, to provide context for improving the user experience, for example by personalizing search, targeting advertising, and providing user assistance. But as users move away from web-based browsers to using mobile devices, such context is lost because mobile applications are closed and cannot be crawled. Thus, as a user performs more tasks using mobile apps, user context information is lost. The content engine 120 provides a method of capturing the context to maintain in a mobile environment the personalized user experience provided in a web-browser based environment. In some implementations, the disambiguation engine 223 may operate over a window of screenshots, so that screen capture images that come before and after a particular time period can be used as context for disambiguating entities found in the center of the window. The entities detected in the screen capture images may be stored, for example in screen capture index 118, where the detected entity is a key value. After disambiguating the entities, the disambiguation engine 223 may rank the entities and store the rankings, for example as ranked entities and collections 117. In some implementations, the ranking and entity information may be stored as part of screen capture index 118. In some implementations, ranks determined over a short period of time may be stored in the screen capture index 118 and ranks for entities over a longer period of time may be stored in ranked entities and collections 117. Collections of entities may represent entities with a common type or some other common characteristic. Thus, the system may cluster entities into one or more collections based on the characteristics. For example, a collection may be Italian restaurants, horror movies, luxury cars, etc.

The content engine 120 may also include an indexing engine 224. The indexing engine 224 may index a screen capture image according to the text, entities, images, logos, etc. identified in the image. Thus, for example, the indexing engine 224 may generate index entries for an image. The index may be an inverted index, where a key value (e.g., word, phrase, entity, image, logo, etc.) is associated with a list of images that have the key value. The index may include metadata (e.g., where on the image the key value occurs, a rank for the key value for the image, etc.) associated with each image in the list. In some implementations, the index may also include a list of images indexed by a timestamp. Because the indexing engine 224 may use disambiguated entities, in some implementations, the indexing engine 224 may update an index with non-entity key items at a first time and update the index with entity key items at a second later time. The first time may be after the recognition engine 221 is finished and the second time may be after the disambiguation engine 223 has analyzed a window of images. The indexing engine 224 may store the index in memory, for example screen capture index 118 of FIG. 1.

The content engine 120 may also include a query engine 225. The query engine 225 may use the screen capture index 118 generated and maintained by the indexing engine 224 to respond to queries. The query engine 225 may return a list of screen capture images as a search result. In some implementations, the query engine 225 may generate a user display of the responsive screen capture images, for example in a carousel or other scrollable list. In some implementations, the content engine 120 may also include a screen sharing engine 226. The screen sharing engine 226 may enable a user of the mobile device to share a captured screen with a designated recipient. The captured screen may be a current image, or an indexed image. If the user chooses to share a series of screens, the screen sharing engine 226 may also stitch the images into a larger image that is navigable, making the resulting image easier to view for the recipient. The screen sharing engine 226 may also provide user input data that corresponds with a shared screen, when requested by the user, to the recipient device.

The annotation engine 130 may include components that build annotation information designed to be integrated with the screen of the mobile device. The annotation information may be an overlay displayed on top of the screen being displayed, an underlay displayed behind the screen being displayed, or information configured to be added to the current screen in the display buffer of the mobile device. In other words, the annotation information represents information added to a screen generated at the mobile device, whether displayed over, under, or integrated into the screen when it is displayed. The various components of the annotation engine 130 may generate various types of annotation data. The annotation data may be configured to be displayed with a screen on the mobile device so that only the visual cues, labels, images, etc., included in the annotation data are visible. In addition or alternatively, the annotation data may include expunge areas that are visible over the screen and hide or mask corresponding areas of the screen on the mobile device. For example, an expunge area may hide passwords, offensive language, pornographic images, etc. displayed on the screen.

For example, the annotation engine 130 may include an actionable content engine 232. Actionable content includes any content in the screen capture image that can be associated with a type of action. For example, the actionable content engine 232 may use templates to identify text that represents phone numbers, email addresses, physical addresses, etc., with each template having an associated action. For example, phone numbers may be associated with a "dial now" action, email addresses may be associated with a "compose a new message" action, street addresses may be associated with a "view on map" action, etc. In some implementations, the user of the mobile device may select a default action for each template (e.g., each type of actionable content). For example, the user may choose to associate email addresses with an "add to contacts" action instead of a "compose message" action. In some implementations, the system may determine the action dynamically. For example, the system may look for an email address or phone number in a contacts data store, either on the mobile device or associated with an account for the user. If the phone number is found, the system may use the "dial now" action and if the phone number is not found the system may provide the user with the opportunity to choose a "dial now" action and an "add to contacts" action. In addition to template-based text items, actionable content may include entities identified in the text, for example by the candidate entity selection engine 222 and the disambiguation engine 223. The action associated with an entity may be to bring up a short description or explanation of the entity. For example, the system may generate the description from properties and/or relationships of the entity in the data graph 190 or may open a wiki page or a knowledge panel describing the entity. A knowledge panel is a collection of information that describes an entity and may be derived from relationships between the entity and other entities or entity properties/attributes in a data graph.

When the actionable content engine 232 finds actionable content, it may generate annotation data that includes a visual cue for each item of actionable content. The visual cue may be any cue that sets the actionable content apart from non-actionable content. For example, visual cues may include, but are not limited to, highlighting, underlining, circling, outlining, and even darkening out or obscuring non-actionable content. Each visual cue in the annotation data may be associated with an action and configured to detect a selection that initiates the action. The visual cue thus, acts like a hyperlink in an HTML-based document. Because the mobile content context system 100 can provide the annotation data for any mobile application running on the mobile device, actions are consistent across mobile applications. In some implementations, the actionable content engine 232 may identify too many actionable content items in one screen capture image. In such a situation, the actionable content engine 232 may generate a visual cue for the more relevant entities, for example those more highly ranked in the search index 118 or the ranked entities and collections 117.

The annotation engine 130 may also include a relevant content engine 233. The relevant content engine 233 may annotate content that is important or relevant to the user of the mobile device. Content may be important or relevant because it summarizes a body of text or because it ranks highly with regard to user preferences. For example, the relevant content engine 233 may identify entities in the content of a screen capture image as of particular interest based on the rank of the entity, for example in the ranked entities and collections 117 data store. In some implementations, the relevant content engine 233 may determine whether the entity is part of a structure element, such as one of a list of items. If so, the relevant content engine 233 may generate annotation data that includes a visual cue for the entire structure element, for example highlighting the entire list entry and not just the text or image representing the entity. This may enable a user to more quickly notice a relevant item in a list of items displayed on the screen of the mobile device. As another example, the relevant content engine 233 may identify a body of text, e.g., an article or a paragraph, and use conventional summarization techniques to identify elements of the body of text that effectively summarize the body. The elements that summarize the body of text are considered content-relevant and the relevant content engine 233 may generate annotation data that highlights these elements. Such highlighting may draw the user's attention to the summary, allowing the user to more quickly identify the main point of the body of text. The relevant content engine 233 may work in conjunction with the actionable content engine 232. For example, in some implementations, the visual cue for relevant content may be highlighting while the actionable content may be identified by underlining or circling.

The annotation engine 130 may also include an entity insight engine 234. The entity insight engine 234 may provide an interface for surfacing information about the entities found in a screen captured from the mobile device. In some implementations, the entity insight engine 234 may generate annotation data for entities found in the image of the mobile screen. The annotation data may include a visual cue for each entity, similar to the actionable content engine 232. The visual cue may be configured to respond to an insight selection action. The insight selection action may be a long press, for example. The entity insight engine 234 and the actionable content engine 232 may work together to generate one set of annotation data. A short press may initiate the action associated with the entity and a long press may initiate the insight interface, which provides the user with additional information about how the entities displayed in the screen are related. For example, if the user performs a long press on the visual cue for the entity, the system may respond by generating annotation data that shows which entities on the screen are related to the selected entity in the data graph 190. In some implementations, the annotation data may include a line drawn between the entity and its related entities. In some implementations the line may be labeled with a description of the relationship. This may work best when there are few related entities displayed on the screen. If the annotation data does not include a labeled line, selection of the line (or other indication that the entities are related) may provide a text description of how the entities are related. The text description may be based on information stored in the data graph 190. The text description may also be based on previous co-occurrences of the two entities in a document. For example, if the two entities co-occur in a recent news article, the system may use the title of the news article as the text description.

In some implementations, if the user performs an insight selection action on two entities (e.g., does a long press on the visual cues for two entities at the same time), the entity insight engine 234 may provide the text description of how the entities are related in annotation data. In some implementations, the text description and entity relations may be included in the annotation data but may be invisible until the user performs the insight selection of an entity (or of two entities at the same time). In some implementations, when the entity insight engine 234 receives a second insight selection of the same entity the entity insight engine 234 may search previously captured screens for entities related in the data graph 190 to the selected entity. For example, the entity insight engine 234 may determine entities related to the selected entity in the data graph 190 and provide these entities to the query engine 225. The query engine 225 may provide the results (e.g., matching previously captured screen images) to the mobile device.

The annotation engine 130 may also include automated assistance engine 231. The automated assistance engine 231 may use the information found on the current screen (e.g., the most recently received image of the screen) and information from previously captured screens to determine when a user may find additional information helpful and provide the additional information in annotation data. For example, the automated assistance engine 231 may determine when past content may be helpful to the user and provide that content in the annotation data. For example, the automated assistance engine 231 may use the most relevant or important key values from the image as a query issued to the query engine 225. The query engine 225 may provide a search result that identifies previously captured screens and their rank with regard to the query. If any of the returned screens have a very high rank with regard to the query the automated assistance engine may select a portion of the image that corresponds to the key item(s) and use that portion in annotation data. As another example, the automated assistance engine 231 may determine that the current screen includes content suggesting an action and provide a widget in the annotation data to initiate the action or to perform the action. For example, if the content suggests the user will look up a phone number, the widget may be configured to look up the phone number and provide it as part of the annotation data. As another example, the widget may be configured to use recognized items to suggest a further action, e.g., adding a new contact. A widget is a small application with limited functionality that can be run to perform a specific, generally simple, task.

The annotation engine 130 may also include expunge engine 235. The expunge engine 235 may be used to identify private, objectionable, or adult-oriented content in the screen capture image and generate annotation data, e.g. expunge area, configured to block or cover up the objectionable content or private content. For example, the expunge engine may identify curse words, nudity, etc. in the screen capture image as part of a parental control setting on the mobile device, and generate expunge areas in annotation data to hide or obscure such content. The expunge engine 235 may also identify sensitive personal information, such as a password, home addresses, etc. that the user may want obscured and generate annotation data that is configured to obscure such personal information from the screen of the mobile device.

Returning to FIG. 1, the mobile content context system 100 may include data stores associated with a user account or profile. The data stores are illustrated in FIG. 1 as residing on server 110, but one or more of the data stores may reside on the mobile device 170 or in another location specified by the user. The data stores may include the screen capture events 113, ranked entities and collections 117, screen capture index 118, event actions 114, and default actions 115. The data stores may be stored on any non-transitory memory. The screen capture events 113 may include the images of screens captured from the mobile device 170. The screen capture events 113 may also include candidate entities identified by the content engine 120. The screen capture events 113 may be used by the content engine 120 to provide a window in which to disambiguate the candidate entities. The ranked entities and collections 117 may represent rankings for the various entities identified in the screen capture images. The rank of an entity with respect to a particular screen capture image may be stored, for example, as metadata in the screen capture index 118. In addition or alternatively, the rank of an entity may also represent the rank of an entity over a period of time e.g., how long an entity has been on the screen and whether the entity appeared in different contexts (e.g., different mobile applications). Thus, the ranked entities and collections 117 may include an indication of how relevant an entity is to the user. The collections in the ranked entities and collections 117 may represent a higher-level concepts that an entity may belong to, such as "horror movies". The entities may be grouped into collections and ranked based on the collection.

The screen capture index 118 may be an inverted index that stores key values and lists of images (e.g., images stored in screen capture events 113), that include the key values. The key values may be text, entities, logos, locations, etc. discovered during recognition by the content engine 120. Thus, when candidate entities are selected by disambiguation for a particular screen capture image the indexing engine may add the particular screen capture image to the list associated with each disambiguated entity. The image may be associated with a timestamp, for example in screen capture events 113. In some implementations, the screen capture index 118 may include an index that orders the images by timestamp. The screen capture index 118 may also include metadata about each image, such as a rank for the key value for the image, coordinates in the image where the key value can be found, etc. In some implementations, the user may specify how long screen capture images are kept in the screen capture events 113 and the screen capture index 118.

The default actions 115 may include the default actions for one or more types of actionable content. For example, a phone number type may have an "initiate call" action or an "add new contact" action. The user may specify and modify the default action. The default actions 115 may be used by the actionable content engine when generating the annotation data.

The event actions 114 represent default event actions or widgets to provide assistance for actions suggested in a screen capture image. Each suggested action may be associated with a default event action, for example in a model that predicts actions based in interaction understanding.

The mobile content context system 100 may also include mobile device 170. Mobile device 170 may be any mobile personal computing device, such as a smartphone or other handheld computing device, a tablet, a wearable computing device, etc., that operates in a closed mobile environment rather than a conventional open web-based environment. Mobile device 170 may be an example of computer device 2500, as depicted in FIG. 25. Mobile device 170 may be one mobile device used by user 180. User 180 may also have other mobile devices, such as mobile device 190. Mobile device 170 may include one or more processors formed in a substrate configured to execute one or more machine executable instructions or pieces of software, firmware, or a combination thereof. The mobile device 170 may thus include one or more computer memories configured to store one or more pieces of data, either temporarily, permanently, semi-permanently, or a combination thereof. The mobile device 170 may thus include mobile applications 175, which represent machine executable instructions in the form of software, firmware, or a combination thereof. The components identified in the mobile applications 175 may be part of the operating system or may be applications developed for a mobile processing environment. Conventionally, mobile applications operate in a closed environment, meaning that the user employs separate applications to do activities conventionally performed in a web-based browser environment. For example, rather than going to hotels.com to book a hotel, a user of the mobile device 170 can use a mobile application in mobile applications 175 provided by hotels.com. The mobile device 170 may also include data 177, which is stored in the memory of the mobile device 170 and used by the mobile applications 175. FIG. 3 includes more detail on the components of the mobile applications 175 and data 177.

The mobile device 170 may be in communication with the server 110 and with other mobile devices 190 over network 160. Network 160 may be for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the server 110 may communicate with and transmit data to/from mobile devices 170 and 190, and mobile device 170 may communicate with mobile device 190.

The mobile content context system 100 represents one example configuration and implementations may incorporate other configurations. For example, some implementations may combine one or more of the components of the content engine 120 and annotation engine 130 into a single module or engine, one or more of the components of the content engine 120 and annotation engine 130 may be performed by the mobile device 170. As another example one or more of the data stores, such as screen capture events 113, screen capture index 118, ranked entities and collections 117, event actions 114, and default actions 115 may be combined into a single data store or may distributed across multiple computing devices, or may be stored at the mobile device 170.

FIG. 3 illustrates a block diagram illustrating another example system in accordance with the disclosed subject matter. The example system of FIG. 3 illustrates an example of the mobile content context system 300 operating using just the mobile device 170 without server 110. Of course it is understood that implementations include the mobile device 170 and a server where one or more of the components illustrated with dashed lines may be stored or provided by the server. Thus, the mobile device 170 of FIG. 3 may be an example of the mobile device 170 of FIG. 1.

The mobile applications 175 may include one or more components of the content engine 120 and the annotation engine 130, as discussed above with regard to FIG. 2. The mobile applications 175 may also include screen capture application 301. The screen capture application 301 may be configured to capture the current screen, e.g. by copying or reading the contents of the device's frame buffer at intervals. The interval can be small, for example every half second or every second. In some implementations, the screen capture application 301 may be configured to capture the screen every time a touch event occurs (e.g., every time the user touches the screen to scroll, zoom, click a link etc.) or when the device transitions from one mobile application to another mobile application. In some implementations, the screen capture application 301 may increase the interval at which a screen capture occurs when the screen does not change. In other words, when the screen is static, the screen capture application 301 may capture images less often. The screen capture application 301 may provide the captured screen images and metadata to the recognition engine 221, which may be on the mobile device 170 or a server, such as server 110. The metadata may include the timestamp, the mobile device type, a mobile device identifier, the mobile application running when the screen was captured, e.g., the application that generated the screen, etc. In some implementations, the mobile applications 175 may include the recognition engine 221, which stores the captured image and metadata and any key values identified in the image. For example, the stored image may be stored in screen capture events 360 on the mobile device 170 or may be sent to the server 110 and stored in screen capture events 113.

In addition to capturing images of the screen of the mobile device 170, the screen capture application 301 may also capture user input action data 351. User input action data 351 represents user input actions such as taps, swipes, text input, or any other action the user takes to interact with the mobile device 170. The user input action data 351 may record a timestamp for each action that indicates when the action occurred. The user input action data 351 may also record the screen coordinates for a touch action, beginning and ending coordinates for a swipe action, and the text entered for keyboard actions. If the user performs a multiple finger action, the input action data 351 may include multiple entries with the same timestamp. For example if the user "pinches" with two fingers to zoom out, the screen capture application 301 may record one entry in the user input action data 351 for the first (e.g., index finger) digit and a second entry in the user input action data 351 for the second (e.g., thumb) digit, each having the same timestamp. The input action data 351 may be used to automate some tasks, as explained herein in more detail. The user input action data 351 may be indexed by timestamp or stored in timestamp order. The user of the mobile device 170 may control when the screen capture application 301 is active. For example, the user may specify that the screen capture application 301 is active only when other specified mobile applications 175 are running (e.g., only when in a social media mobile application). The user may also manually turn the screen capture application on and off, for example via a settings application. In some implementations, the user may turn the capture of user input data on and off independently of turning the screen capture functionality off.

In some implementations, the screen capture application 301 may also capture additional device information, such as which applications are active, the location of the device, the time of day, ambient light, motion of the device, etc. The system may use this additional device information to assist in content analysis (e.g., entity disambiguation), annotation data generation (e.g., reducing the quantity of annotations when the device is moving, deciding what content is most relevant), etc. In some implementations, the screen capture application 301 may provide this additional information to the content engine and/or annotation engine.

The screen capture application 301 may use annotation data 352 to integrate the additional information provided in annotation data 352 with a current screen. For example, when the screen capture application 301 receives annotation data 352, the screen capture application 301 may combine the annotation data with the current display. In some implementations, the annotation data may be generated as an overlay, as an underlay, or interleaved with the current screen in the display buffer. The annotation data may be stored in annotation data 352, for example. Each annotation data entry may be associated with a timestamp. In some implementations, the screen capture application 301 may be configured to verify that the currently displayed screen is similar enough to the captured screen image before displaying the annotation data. For example, the annotation data may include coordinates for the portion of the image that corresponds with one or more visual cues in the annotation engine, and the screen capture application 301 may compare the image portion represented by the coordinates with the same coordinates for the currently displayed image. In some implementations, the screen capture application 301 may be configured to look a short distance for visual elements similar to those for a visual cue. If found, the screen capture application 301 may adjust the position of the visual cues in the annotation data to match the movement of the underlying screen. In some implementations, the system may display the annotation data until the user scrolls or switches mobile applications. In some implementations the annotation data 352 may include the image data for the coordinates of each visual cue. In some implementations, the mobile device 170 may store previously captured screen images for a few seconds, for example in screen capture events 360, and these stored images may be used for comparison with the current screen. In such implementations, the annotation data 352 may have the same timestamp as the image it was generated for so that the system can easily identify the screen capture image corresponding to the annotation data.

The mobile applications 175 may also include application automation engine 302. The application automation engine 302 may be configured to use previously captured screen images and user input action data to automatically perform tasks or automatically change the state of the mobile device. For example, after selecting a previously captured image from a search result, the application automation engine 302 may try to take the user back to the mobile application that generated the screen and use the user input actions to re-create the series of interactions that resulted in the captured image. Thus, the application automation engine 302 may allow the user to jump back to the place in the application that they had previously been. Jumping to a specific place within a mobile application is changing the state of the mobile device. In some implementations, the application automation engine 302 may enable the user to switch mobile devices while maintaining context. In other words, the user of mobile device may share a screen and user input actions with a second mobile device, such as mobile device 190, and the application automation engine 302 running on mobile device 190 may use the sequence of user input actions and the shared screen to achieve the state represented by the shared screen. In some implementations, the application automation engine 302 may be configured to repeat some previously performed action using minimal additional data. For example, the application automation engine 302 may enable the user to repeat the reservation of a restaurant using a new date and time. Thus, the application automation engine 302 may reduce the input provided by a user to repeat some tasks.

The mobile applications 175 may also include screen sharing application 303. The screen sharing application 303 may enable the user of the mobile device to share a current screen, regardless of the mobile application running. The screen sharing application 303 may also enable a user to share a previously captured screen with another mobile device, such as mobile device 190. Before providing the image of the screen to be shared, the screen sharing application 303 may provide the user of the mobile device 170 an opportunity to select a portion of the screen to share. For example, the user may select a portion to explicitly share or may select a portion to redact (e.g., not share). Thus, the user controls what content from the image is shared. Screen sharing application 303 may enable the user to switch mobile devices while keeping context, or may allow the user to share what they are currently viewing with another user. The mobile device 170 may be communicatively connected with mobile device 190 via the network 160, as discussed above with regard to FIG. 1. In some implementations, the screen sharing application 303 may share captured screens and input action sequences via a server that the mobile device 170 and the mobile device 190 are each communicatively connected to.

The mobile applications 175 may also include event help applications 304. Event help applications 304 may be widgets that surface information for an action. For example, annotation data 352 may include annotation data that launches a widget to complete the annotation data 352 before it is displayed. The widget may, for example, query the calendar data on the mobile device 170 to show availability for a time frame specified in the annotation data. The result of the query may be displayed with the current screen (e.g., overlay, underlay, interlaced, etc.). As another example, the widget may obtain contact information, such as a phone number or an email address from the contacts data stored on the mobile device 170. Thus, event help applications 304 may include various widgets configured to surface information on the mobile device 170 that can be provided as data in an assistance window for the user.

When stored in data 177 on the mobile device 170, the data graph 356 may be a subset of entities and relationships in data graph 190 of FIG. 1, especially if data graph 190 includes millions of entities and billions of relationships. For example, the entities and relationships in data graph 356 may represent the most popular entities and relationships from data graph 190, or may be selected based on user preferences. For example, if the user has a profile, entities and relationships may be selected for inclusion in data graph 356 based on the profile. The other data stores in data 177 may be similar to those discussed above with regard to FIG. 1. Specifically the screen capture index 355 may be similar to screen capture index 118, the ranked entities 357 may be similar to ranked entities and collections 117, the screen capture events may be similar to screen capture events 113, the event actions 359 may be similar to event actions 114, and the default actions 358 may be similar to the default actions 115.

The mobile content context system 300 represents one example configuration and implementations may incorporate other configurations. For example, some implementations may combine one or more of the components of the screen capture application 301, the application automation engine 302, the screen sharing application 303, the event help applications 304, the content engine 120, and the annotation engine 130 into a single module or engine, and one or more of the components of the content engine 120 and annotation engine 130 may be performed by a server. As another example one or more of the data stores, such as screen capture events 360, screen capture index 355, ranked entities 357, event actions 359, and default actions 358 may be combined into a single data store or may distributed across multiple computing devices, or may be stored at the server.

To the extent that the mobile content context system 100 collects and stores user-specific data or may make use of personal information, the users may be provided with an opportunity to control whether programs or features collect the user information (e.g., information about a user's social network, social actions or activities, user input actions, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a mobile content context system.

Identifying Entities Mentioned in Mobile On-Screen Content

In order to provide context and personalized assistance in a mobile application environment, disclosed implementations may identify, with user consent, entities displayed on the screen of a mobile device. Implementations may use a window of screen capture images to improve entity disambiguation and may use signals unique to the mobile environment in disambiguating and ranking entities. For example, the system may use mobile application metadata to adjust probability priors of candidate entities. Probability priors are probabilities learned by the entity detection engine (e.g., a mention of jaguar has an 70% chance of referring to the animal, a 15% chance of referring to the car and a 5% chance of referring to the football team). The system may adjust these learned priors based on a category for the mobile application that generated the captured image. For example, if the window is made up of screens from an auto-trader or other car-related mobile application, the system may increase the probability prior of candidate entities related to a car. Implementations may also use signals unique to the mobile environment to set the window boundaries. Because the amount of onscreen content is limited, performing entity detection and disambiguation using a window of images provides a much larger context and more accurate entity disambiguation.

Figure 4:
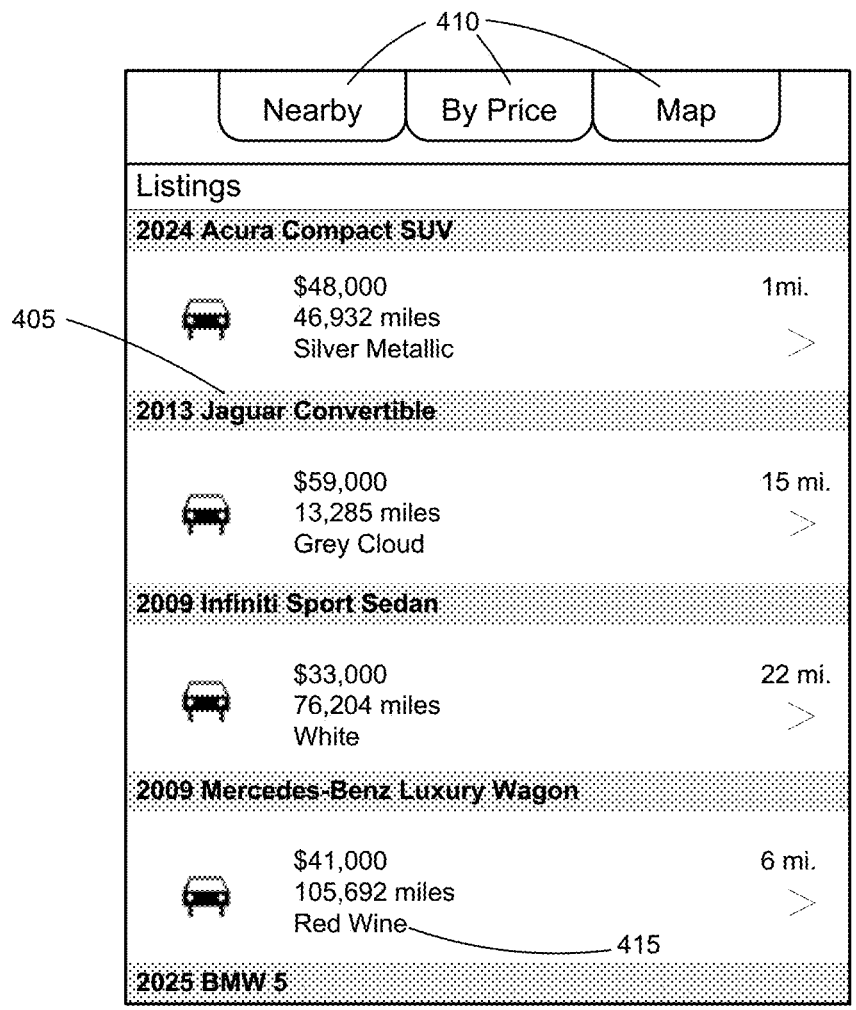
FIG. 4 illustrates an example display of a mobile computing device.

FIG. 4 illustrates an example display 400 of a mobile computing device. In the example of FIG. 4, the display is from a mobile application that searches for new and used cars for sale. The display may be a display of a mobile device, such as mobile device 170 of FIG. 1 or 3. The display 400 includes some static items 410 that are always on the screen while the mobile application is open. The display also includes a list of cars that are displayed to the user. The display 400 may be captured at a mobile device and provided to a content engine that performs recognition on the image, identifies possible entity mentions, and disambiguates and ranks the entities found. For example, the term Jaguar 405 in the image of the display may be a possible entity mention, as are Acura, Sedan, Luxury Wagon, BMW, Cloud, Silver, etc.

Figure 5:
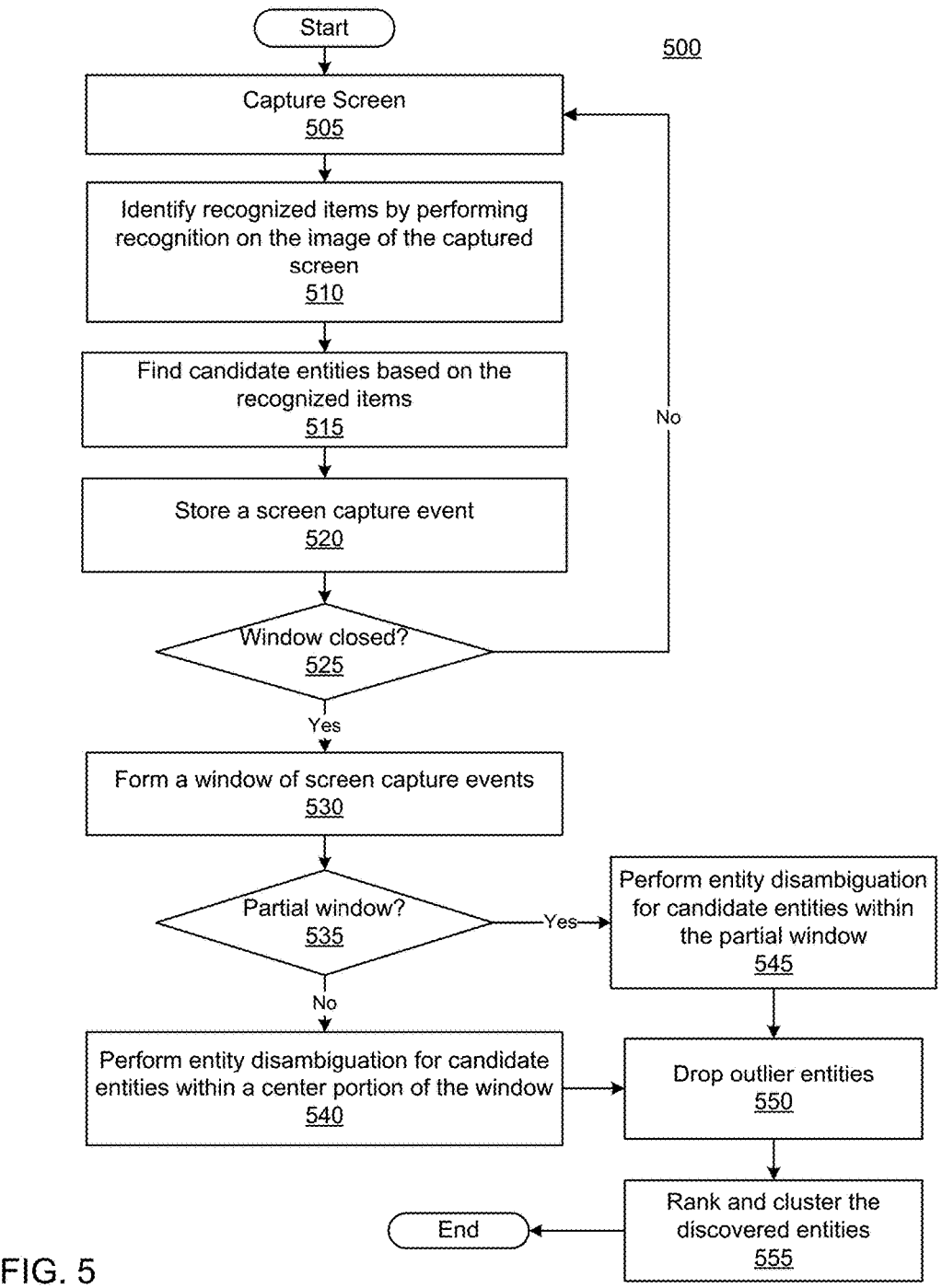
FIG. 5 illustrates a flow diagram of an example process for identifying and ranking entities displayed on a mobile computing device, in accordance with disclosed implementations.

FIG. 5 illustrates a flow diagram of an example process 500 for identifying and ranking entities displayed on a mobile computing device, in accordance with disclosed implementations. Process 500 may be performed by a mobile content context system, such as system 100 of FIG. 1 or system 300 of FIG. 3. Process 500 may be used to identify entities in the content of a display of a mobile device to provide context and personalized assistance in a mobile environment. Process 500 may begin by receiving an image of a screen captured on the mobile device (505). The captured image may be obtained using conventional techniques. The system may identify recognized items by performing recognition on the image of the captured screen (510). Recognized items may be text characters or numbers, landmarks, logos, etc. located using various recognition techniques, including character recognition, image recognition, logo recognition, etc. Thus, recognized items may include words as well as locations, landmarks, logos, etc.

The system may find candidate entities based on the recognized items (515). For example, the system may perform part-of-speech tagging, dependency parsing, noun-phrase extraction, and coreference resolution using any conventional techniques for finding possible entity mentions and determining what entities may correspond to each entity mention. The system may also look for a fixed set of names, images, or ngrams in the recognized items. For example, the system may look for the text equivalent or image of a particular set of entities in the recognized items. The system may store the candidate entities, the recognized items, and the image as a screen capture event (520). This enables subsequent use of the recognized items and candidate entities in disambiguation and ranking of the entities. In some implementations the candidate entities and recognized items may be temporarily stored until entity disambiguation is complete and the image indexed.

The system may then determine whether a window is closed (525). A window represents a sequence of captured screen images for the same mobile application, or for two mobile applications when the second mobile application was launched from the first mobile application. A user switching from one mobile application to a second mobile application may be considered a context switch (e.g., the user is starting a new task), and including screen capture images from both applications may provide false context signals when disambiguating entities found on images from the second mobile application. Thus, switching applications may break the window boundary and force the window to close. However, if the user switches to the second application from within the first mobile application, the context may be helpful. Therefore, the system may not break a window boundary and forcibly close the window due to this type of user action. Thus, when a user switches from a first mobile application to a second mobile application, for example by returning to a home screen, the system may consider the window closed for the first mobile application and begin another window for the second mobile application. But when the user selects a link that opens the second application, the system may not forcibly close the window and may continue to use screen capture images for the first application as context.

In addition to forcibly closing a window, the system may consider a window closed when the window reaches a pre-specified size, for example covering a pre-specified length of time, including a pre-specified number of images, or including a pre-specified quantity of unique entity mentions (e.g., tokens). The latter two options have the advantage of being adaptive so that detection is performed over a longer window when the screen is static. When the window size is met, for example when the system has screen capture images that span the length of time or has the pre-specified number of images or unique tokens, the window may be considered closed (525, Yes). If there are not enough screen captures for a window (525, No), the system may continue receiving (505) and analyzing screen captured images (510, 515) and storing them as screen capture events (520) until the window size is reached or the window is forcibly closed, for example from a change from one mobile application to another mobile application.

When a window is closed (525, Yes), the system may form a chronological window from a plurality of screen capture events (530). As indicated above, the window may include sequential screen capture events or, in other words, images that represent a chronological time period. Because screen capture images may be received on a regular basis, for example one to two images every second, the window may be a rolling window. For example, a first window may include screen captures during time t1-t10, a second may include screen captures during time t5-t15, a third may include screen captures during time t10-t20, etc. As another example, a first window may include the first 5 screen captures for an application, a second window may include the first 10 screen captures, the third window may include screen captures 5-15, etc. Thus, process 500 may be ongoing as long as screen capture images keep arriving, and some of the images in the window may have already had entity disambiguation performed. Furthermore, when the window size is based on a quantity of screen capture images, the window may represent a variable length of time because, for example, the system may send fewer screen capture images when the screen on the mobile device is static. The recognized content for the images included in the window may be stitched together to form a document, which provides the context for disambiguating entities in the document.

A partial window may occur when the window does not cover the entire pre-specified size. For example, when a window is forcibly closed or when a window represents the first few seconds or images of a new window (e.g., the images captured when a new mobile application starts). Accordingly, the system may determine whether the window is a full or a partial window (535). When the window is full (535, No), the system may perform entity disambiguation on the candidate entities associated with the screen capture images in a center portion of the window (540). When entity disambiguation is performed on a center portion of the window, the recognized items and disambiguated entities associated with images in the first portion of the window, and the recognized items and candidate entities in a last portion of the window may be used to provide context for entity disambiguation in the center portion. For example, entity disambiguation systems often use a machine learning algorithm and trained model to provide educated predictions of what entity an ambiguous entity mention refers to. The models often include probability priors, which represent the probability of the ambiguous entity mention being the particular entity. For example, the trained model may indicate that the term Jaguar refers to the animal 70% of the time, a car 15% of the time and the football team 5% of the time. These probability priors may be dependent on context, and the model may have different probability priors depending on what other words or entities are found close to the entity mention. This is often referred to a coreference.

In addition to using these traditional signals, the system may also take into account signals unique to the mobile environment. For example, the system may adjust the probability priors based on a category for the mobile application that generated the screen captured by the image. For example, knowing that a car search application or some other car-related application generated the display 400, the system may use this as a signal to increase the probability prior for the car-related entity and/or decrease the probability prior for any entities not car related. In the example of FIG. 4, the system may boost the probability prior of Jaguar the car over Jaguar the animal for mention 405 based on the type or category for the mobile application. Once probabilities have been calculated for each candidate entity for a particular entity mention, the system selects the candidate entity with the highest probability as the discovered entity for the mention. If the probabilities are too close, the system may not select an entity and the mention does not correspond to a discovered entity. Such mentions may be considered ambiguous mentions. In some implementations, entity disambiguation may be accomplished via a classifier (e.g., neural network) that takes as input a candidate and context features. In some implementations, entity disambiguation can be a weighted combination of the entity name prior along with scores for supporting entities.

If the window is a partial window (535, Yes), the system may perform entity disambiguation on the candidate entities associated with the images in the partial window (545), using techniques similar to those discussed above with regard to step 540.

Once entities have been disambiguated, resulting in discovered entities, the system may drop outlier entities (550). Outlier entities are discovered entities that are not particularly relevant to the document formed by the window. For example, the discovered entities may be grouped by category and categories that have a small quantity of discovered entities may be dropped. In the example of FIG. 4, there are many car-related entities but the entity Red Wine 415 is not car related and may be dropped from the discovered entities. In some implementations, the application type may be used to determine outliers. For example, in an automobile related application the entity Red Wine or a particular category of entities unrelated to automobiles may always be considered an outlier regardless of the number of entities in the category. In some implementations, step 550 is optional and all discovered entities are ranked.

The system may then rank and cluster the discovered entities (555). The rank assigned to a discovered entity may be based on frequency, for example how often and how long an entity is on screen. How long an entity is on screen can be determined using the window of captured screen images—and is thus a signal unique to the mobile environment. When an entity is always on screen at the same position, the system may rank the entity low. For example, the map entity mention 410 of FIG. 4 is always on screen. So although a map may be car-related, this map entity mention is not particularly relevant to the main content in the window. However, entities that are on screen but not always at the same position may be given a high rank. Furthermore, if the window includes a large quantity of mentions for the same entity, the entity may be given a higher rank. Furthermore, the system may use historical data to determine if the entity has been seen across multiple mobile applications. If so, the system may boost the rank for the entity as it is a strong indication the entity is relevant. For example, if a user books a flight to Hawaii, makes a hotel reservation to Hawaii, and is now looking at national parks in Hawaii, the entity for Hawaii may have a high ranking for this time period. Ranking may also account for positioning on the screen. For example, entities that occur in titles may have a higher rank that entities found in the text of a paragraph under the title or a footnote. In some implementations, the system may use the mobile application that generated the content or a user model to rank and cluster the entities. For example, entities that appear in the content of a particular mobile application may receive a boost, or entities that appear in the content of another mobile application may be demoted. In some implementations, a user model may determine or specify which mobile applications receive a boost. The system may also cluster the discovered entities and calculate a rank for an entity based on the cluster or collection.

The system may store the discovered entities and the associated ranks. In some implementations, the discovered entities and rank may be stored in an index, such as the screen capture index 119 of FIG. 1. In some implementations, the rank may be stored in the ranked entities and collections 117. These discovered entities and ranks may be used to provide a more personalized user experience, as explained in more detail below. The system may perform process 500 continually while screen capture images are received, so that the data stores of discovered and ranked entities and indexed screen capture images may be continuously updated.

Providing Actions for Mobile On-Screen Content

Some implementations may identify actionable content in the onscreen content of a mobile device and provide default actions for the actionable content. Actionable content may include discovered entities and landmarks and data that fits a template, such as phone numbers, email addresses, street addresses, dates, etc. Each type of actionable content may be associated with a default action. The system may generate annotation data that provides a visual cue for each actionable item. When a user selects the visual cue the system may initiate the default action. The system may identify actionable content across all applications used on a mobile device, making the user experience consistent. For example, while some mobile applications turn phone numbers into links that can be selected and called, other mobile applications do not. The annotation data generated by the system provides the same functionality across mobile applications.

FIG. 6A illustrates an example display 600 of a mobile computing device. A mobile content context system, such as system 100 of FIG. 1 or system 300 of FIG. 3, may capture the display 600 in an image, perform recognition on the image, and find areas of actionable content. The system may then provide annotation data that can be displayed with the current screen. FIG. 6B illustrates the example display of FIG. 6A with annotation data identifying actionable content, in accordance with disclosed implementations. In the display 600' of FIG. 6B the annotation data provides a visual cue 625 for the entity Palo Alto, a visual cue 605 for the entity Mio Ristorante Italiano, a visual cue 610 for a web site, a visual cue 615 for a street address, and a visual cue 620 for a phone number. In some implementations the visual cues may differ for each type of actionable content. Each visual cue may be selectable, for example via a touch, and, when selected, may initiate a default action associated with the particular cue. In some implementations when there are two or more possible actions, the system may allow the user to select the default action to perform.

Figure 7:
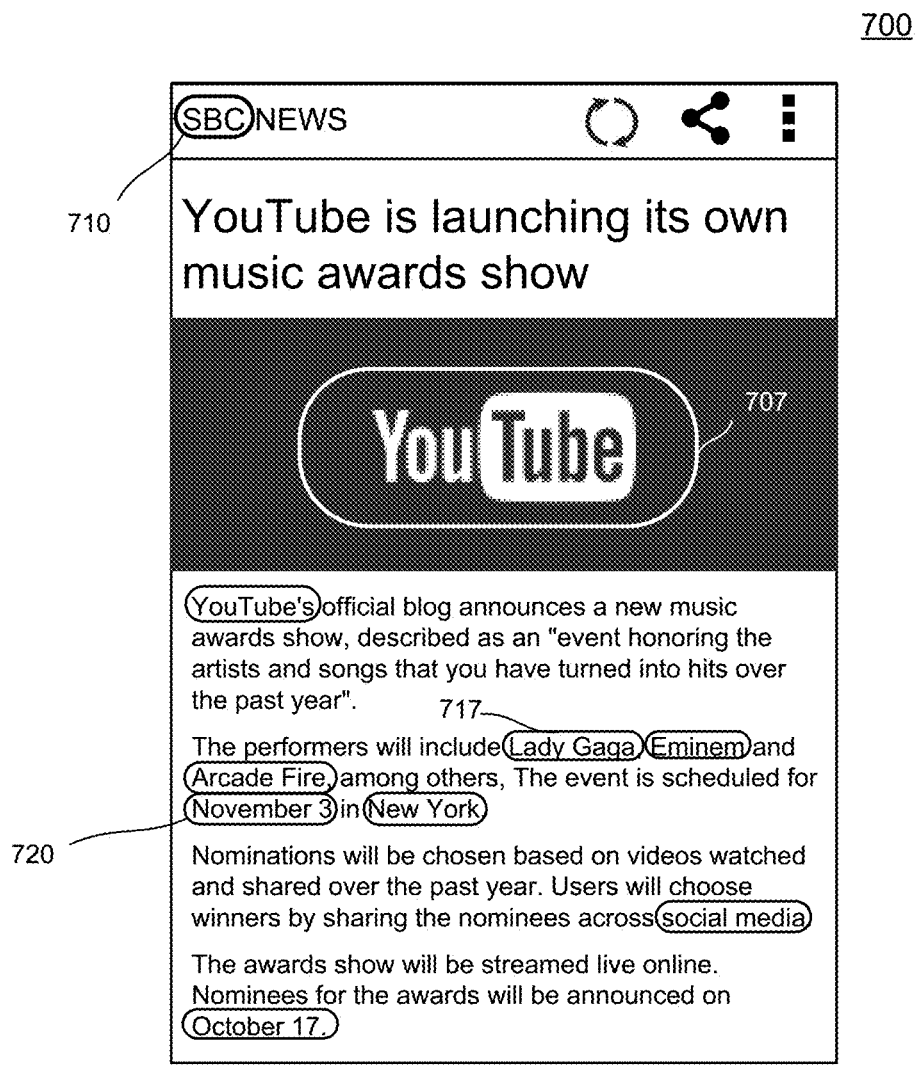
FIG. 7 illustrates another example display of a mobile computing device with annotation data identifying actionable content, in accordance with disclosed implementations.

FIG. 7 illustrates another example display 700 of a mobile computing device with annotation data identifying actionable content, in accordance with disclosed implementations. In the display 700 the annotation data provides visual cues for several entities and two dates in the display. For example, the display 700 with annotation data provides a visual cue 710 for the entity SBC (e.g., State Broadcasting System), a visual cue 707 for the YouTube logo, a visual cue 717 for the entity Lady Gaga, and a visual cue 720 for the date "3 November." Each visual cue may represent an area that is selectable by the user of the mobile device to initiate an action. For example, if the user selects the visual cue 717, the system may open a WIKIPEDIA page about Lady Gaga. As another example, if the user selects the visual cue 720 the system may open a calendar application to that date.

Figure 8:
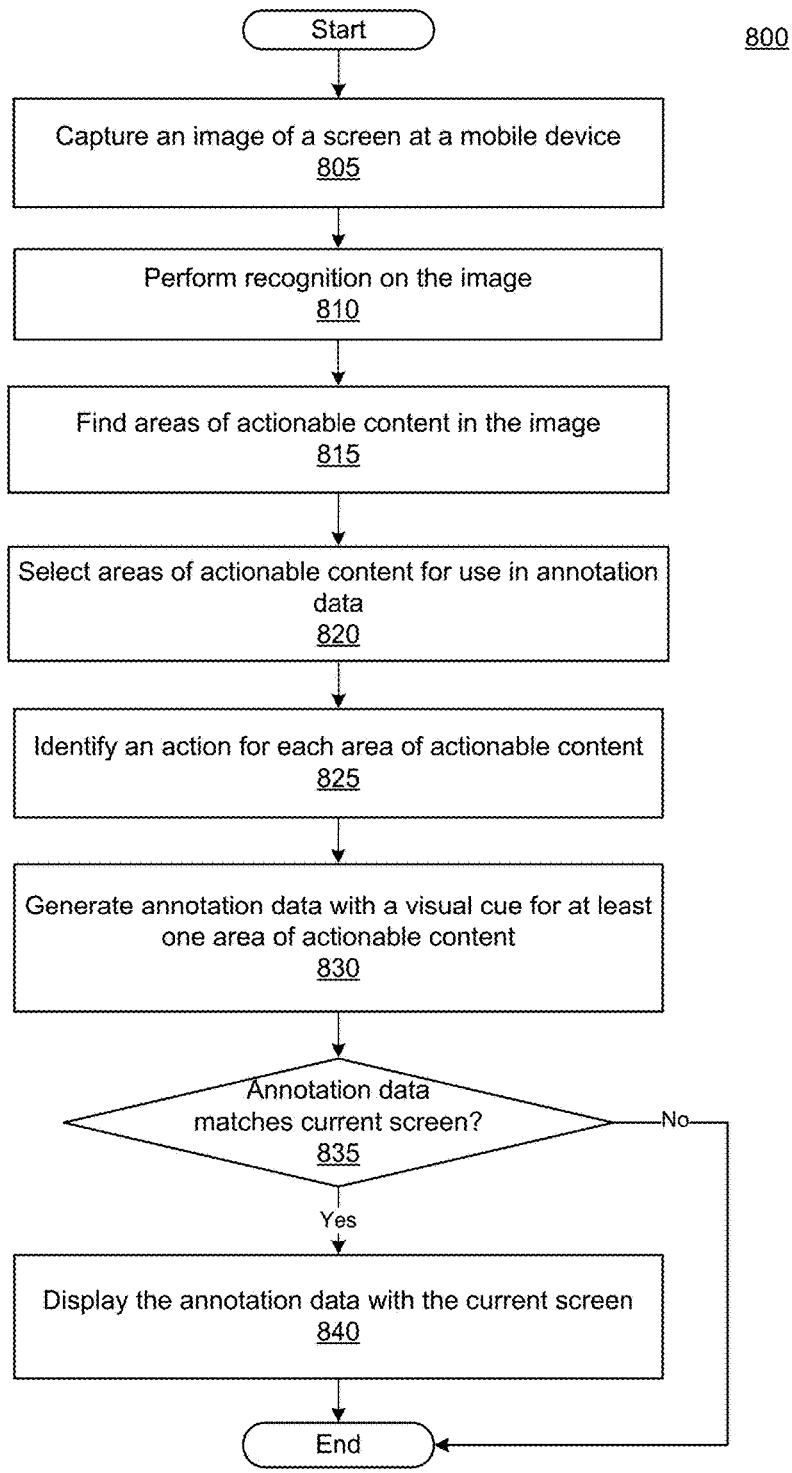
FIG. 8 illustrates a flow diagram of an example process for generating annotation data for actionable content displayed on a mobile computing device, in accordance with disclosed implementations.

FIG. 8 illustrates a flow diagram of an example process 800 for generating annotation data for actionable content displayed on a mobile computing device, in accordance with disclosed implementations. Process 800 may be performed by a mobile content context system, such as system 100 of FIG. 1 or system 300 of FIG. 3. Process 800 may be used to identify areas of actionable content in a screen capture image from a mobile device and generate annotation data that highlights or otherwise differentiates the area of actionable content and provides a default action for the content. Process 800 may begin by receiving an image of a screen captured on the mobile device (805). The captured image may be obtained using conventional techniques. The system may identify recognized items by performing recognition on the image of the captured screen (810). Recognized items may be text characters or numbers, landmarks, logos, etc. locating using various recognition techniques, including character recognition, image recognition, logo recognition, etc. Thus, recognized items may include words as well as locations, landmarks, logos, etc. In some implementations steps 805 and 810 may be performed as part of another process, for example the entity detection process described in FIG. 5.

The system may locate areas of actionable content in the screen capture image (815). The system may use templates to locate the content. For example, a phone number template may be used to find phone numbers in text recognized during the recognition. Similarly, an email template may be used to find email addresses, a street address template may be used to locate street addresses, a website template may be used to find websites, etc. Each template may represent a different type of actionable content. In addition to text that matches templates, an area of actionable content may also be any content determined to correspond to an entity. Entity detection may be performed, for example, by process 500. Thus, process 800 may use determined entities and/or candidate entities when looking for actionable content. An entity type is another type of actionable content and an entity type may have one or more associated default actions. For example, a movie entity may have associated actions such as "review the movie," "buy tickets," etc.

The system may select some of the identified areas of actionable content for use in annotation data (820). For example, the system may determine that too many areas have been identified and generating visual cues for every identified area of actionable content may make the display unreadable and distracting. This may occur, for example, where the system identifies many entities in the screen capture image. Accordingly, the system may select the most important or most relevant areas of actionable content to be included in the annotation data. In some implementations, the system may keep all areas of actionable content that are not entities and may use the rank of the identified entities to determine which areas to use as areas of actionable content. Whether too many actionable content items have been identified may be based on the amount of text on the screen. For example, as a user zooms in, the amount of text and the spacing of the text grows, and actionable content items that were not selected when the text was normal size in a first captured screen image may be selected as the user zooms in, with a second captured screen image representing the larger text.

Each type of actionable content may be associated with a default action, for example in a data store such as default actions 115 of FIG. 1 or default actions 358 of FIG. 3. Accordingly, the system may identify a default action for each area of actionable content (825) based on the type of an actionable content item. For example, a street address item may open a map mobile application to the address represented by the actionable content item. As another example, a web addresses item may open a browser mobile application to the web address, similar to a hyperlink. While some mobile applications offer a phone number or physical address as a hyperlink, some do not, which makes the user experience less consistent. Furthermore, in mobile applications that do offer a phone number or physical address as a hyperlink, the triggered response is often not predictable. For example, one mobile application may open a first map mobile application while another may open a browser application or a second map mobile application. Because process 800 works across all mobile applications the user is provided a consistent user interface across all mobile applications with regard to actionable content. Other examples of default actions include opening a contacts mobile application for an email address or phone number, initiating a phone call for a phone number, sending an email to an email address, adding an event or reminder in a calendar for a date, etc. In some implementations, the system may identify two actions for a type, e.g., adding a contact and sending an email. Thus, an area of actionable content may have more than one default action.

The system may generate annotation data with a visual cue for each of the areas of actionable content identified (830). The visual cue may be any type of highlighting, outlining, shading, underlining, coloring, etc. that identifies the region of the screen capture image that represents an actionable item. In some implementations, the visual cue may include an icon, such as a button or down arrow, near the actionable content. In some implementations, the system may have a different visual cue for each type of actionable item. For example, entities may be highlighted in a first color, phone numbers in a second color, websites may be underlined in a third color, email addresses may be underlined in a fourth color, street addresses may be circled, etc. In some implementations the user of the mobile device may customize the visual cues. Each visual cue is selectable, meaning that if the user of the mobile device touches the screen above the visual cue, the mobile device will receive a selection input which triggers or initiates the action associated with the visual cue. For example, if the user touches the screen above the visual cue 707 of FIG. 7, the system may open a WIKIPEDIA page that pertains to the entity YouTube. If the selected visual cue is for an actionable content item that has two actions, the system may prompt the user of the mobile device to select an action. For example, if the user selects the visual cue 620 of FIG. 6, the system may provide the user with an opportunity to select making a call to the phone number or adding a new contact.

Each visual cue in the annotation data may have coordinates that indicate where on the screen the visual cue is located. In some implementations, each visual cue may also have the image data of the captured screen image that corresponds to the coordinates and size of the visual cue. In other words, the visual cue may include a portion of the screen capture image that corresponds to the visual cue. In some implementations, the mobile device may have access to the screen capture image the annotation data was generated for and may not need to associate the image data with the visual cue, as the system can determine the image data from the screen capture image using the coordinates of the visual cue. In another implementation, the system may store one portion of the screen capture image and its coordinates as a reference point. The coordinates and portion of the screen capture image may help the system determine whether or not to display the annotation data with a current screen. If a server generates the annotation data, the server may provide the annotation data to the mobile device.

At the mobile device, the system may determine whether the annotation data matches the current screen (835). For example, if the mobile application currently running (e.g., the mobile application that is generating the current screen) is different from the mobile application that generated the screen capture image, the system may determine the annotation data does not match the current screen. As another example, the system may use the screen coordinates or partial image data for at least some of the visual cues in the annotation data to determine if the currently displayed screen is similar to the screen capture image for which the annotation data was generated. For example, the system may match the image portion that corresponds with a visual cue with the same portion, using screen coordinates, of the current screen. If the image data for that portion does not match, the system may determine that the annotation data does not match the current screen. As another example, the annotation data may include a fiducial mark, e.g., one portion of the screen capture image used to generate the annotation data and the system may only compare the fiducial mark with the corresponding portion of current screen. In either case, if the user has scrolled, zoomed in, or zoomed out, the current screen may not match the annotation data. In some implementations, the system may look for the reference point or the portion of the image close by and may shift the display of the annotation data accordingly. In such a situation the system may determine that the current screen and the annotation data do match.

If the annotation data and the current screen match (835, Yes), the system may display the annotation data with the current screen (840). If the annotation data and the current screen do not match (835, No), the system may not display the annotation data with the current screen and process 800 ends for the screen capture image. Of course, the system may perform process 800 at intervals, e.g., each time a screen capture image is generated. As indicated earlier, process 800 can provide a consistent user-interaction experience across all mobile applications running on the mobile device, so that similar types of actionable content act the same regardless of the mobile application that produced the content. Of course, a user may choose to turn the screen capture feature off, which prevents process 800 from running. In some implementations, the user may also choose to turn off the visual cues generated by process 800, or visual cues associated with a specific type of actionable content.

It is noted here, yet also applicable to various of the embodiments described herein, that capabilities may be provided to determine whether provision of annotation data (and/or functionality) is consistent with rights of use of content, layout, functionality or other aspects of the image being displayed on the device screen, and setting capabilities accordingly. For example, settings may be provided that limit content or functional annotation where doing so could be in contravention of terms of service, content license, or other limitations on use. Such settings may be manually or automatically made, such as by a user when establishing a new service or device use permissions, or by an app installation routine or the like.

Identifying Relevant Mobile On-Screen Content

Some implementations may identify content on a mobile display that is important or relevant to the user of the mobile device. Content may be important or relevant because it summarizes a body of text or because it ranks highly with regard to user preferences. For example, the system may identify entities of interest based on a user profile, which can include interests specifically specified by the user or entities and collections of entities determined relevant to the user based on past interactions with mobile applications, e.g., ranked entities and collections 117 of FIG. 1. When the system identifies a relevant entity in a structure element, e.g., one of a number of entries in a list, the system may include the entire structural element as relevant content. For example, the system may generate a visual cue in annotation data that calls-out the entire list entry. The system may also recognize a body of text in the image and use conventional summarization algorithms to identify elements of the text that effectively summarize the body of text. The elements that summarize the body are considered important or relevant content and may be highlighted or otherwise differentiated from other screen content using a visual cue in the annotation data.

Figure 9:
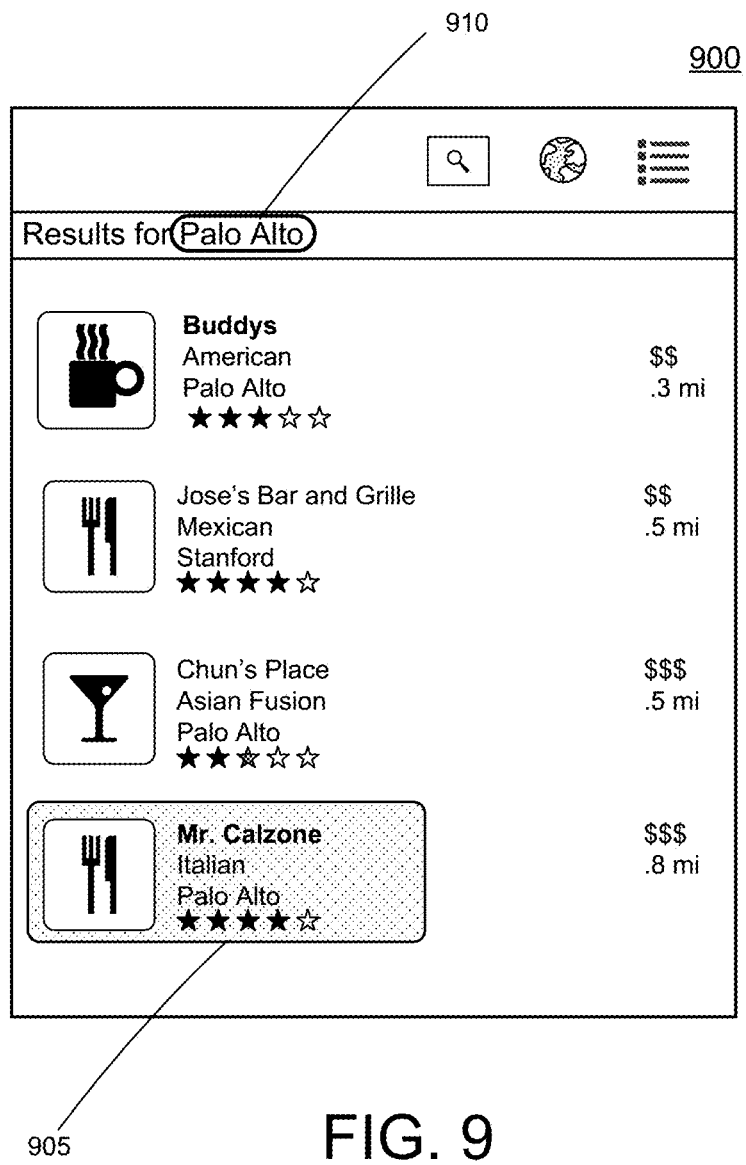
FIG. 9 illustrates an example display of a mobile computing device with annotation data identifying user-relevant content, in accordance with disclosed implementations.

FIG. 9 illustrates an example display 900 of a mobile computing device with annotation data identifying user-relevant content, in accordance with disclosed implementations. A mobile content context system, such as system 100 of FIG. 1 or system 300 of FIG. 3, may generate annotation data that is displayed with a current screen to produce the visual cue 905 on the current screen. The visual cue 905 may call the user's attention to a particular structure element that includes at least one entity highly relevant to the user. A structure element may be an entry in a list, a cell or row in a table, or some similar display structure that repeats. Calling out user-relevant content via a visual cue may personalize a display of the data. For example, if a person likes Italian food, the system may generate a visual cue for an Italian restaurant listed in a list of nearby restaurants. In other words, the visual cue 905 may assist the user in finding a list item, table row, etc., that is most likely interesting to the user of the mobile device. The annotation data may also include other visual cues, such as visual cue 910 that represents actionable content, as described herein.

Figure 10:
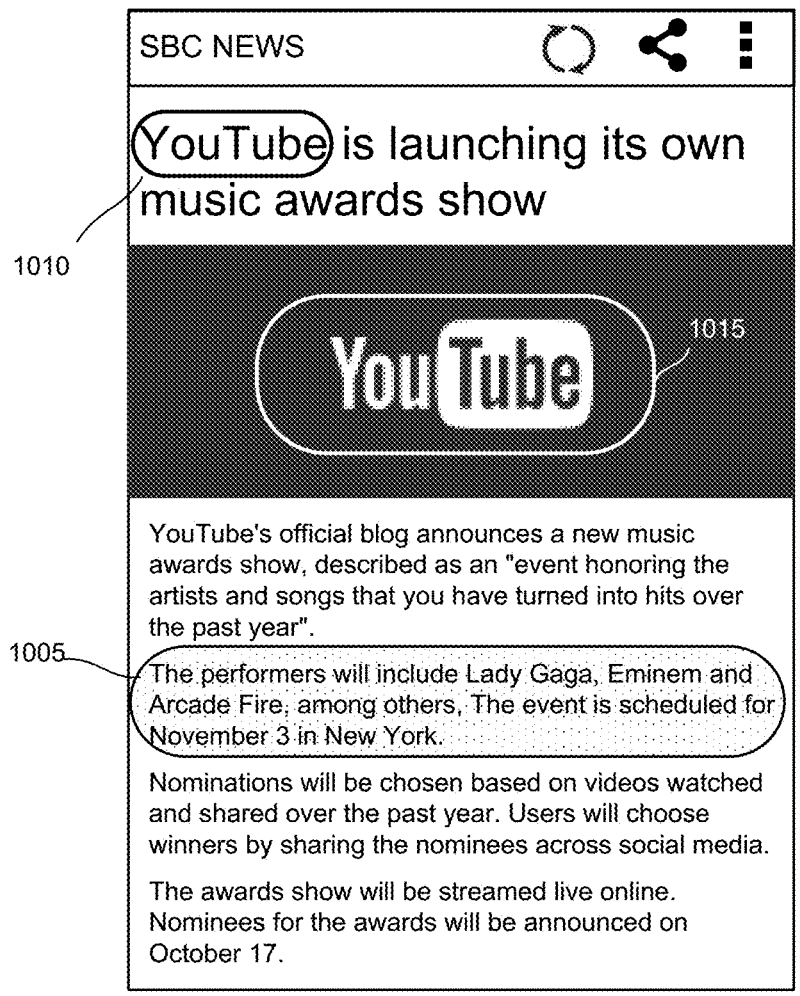
FIG. 10 illustrates an example display of a mobile computing device with annotation data identifying content-relevant content, in accordance with disclosed implementations.

FIG. 10 illustrates an example display 1000 of a mobile computing device with annotation data identifying content-relevant content, in accordance with disclosed implementations. In the display 1000 the annotation data provides a visual cue 1005 for an area of the image that summarizes a body of text. A mobile content context system, such as system 100 of FIG. 1 or system 300 of FIG. 3, may generate the visual cue 1005 after analyzing the content of a screen capture image of the display and using conventional summarization techniques. For example, content-relevant content summarizes the onscreen content and may be one sentence or a paragraph. Calling out such content-relevant summaries may make it quicker and easier for a user to scan through or read a news article, message, document, or other body of text. The annotation data may also include other visual cues, such as visual cues 1010 and 1015 that represent actionable content, as described herein.

Figure 11:
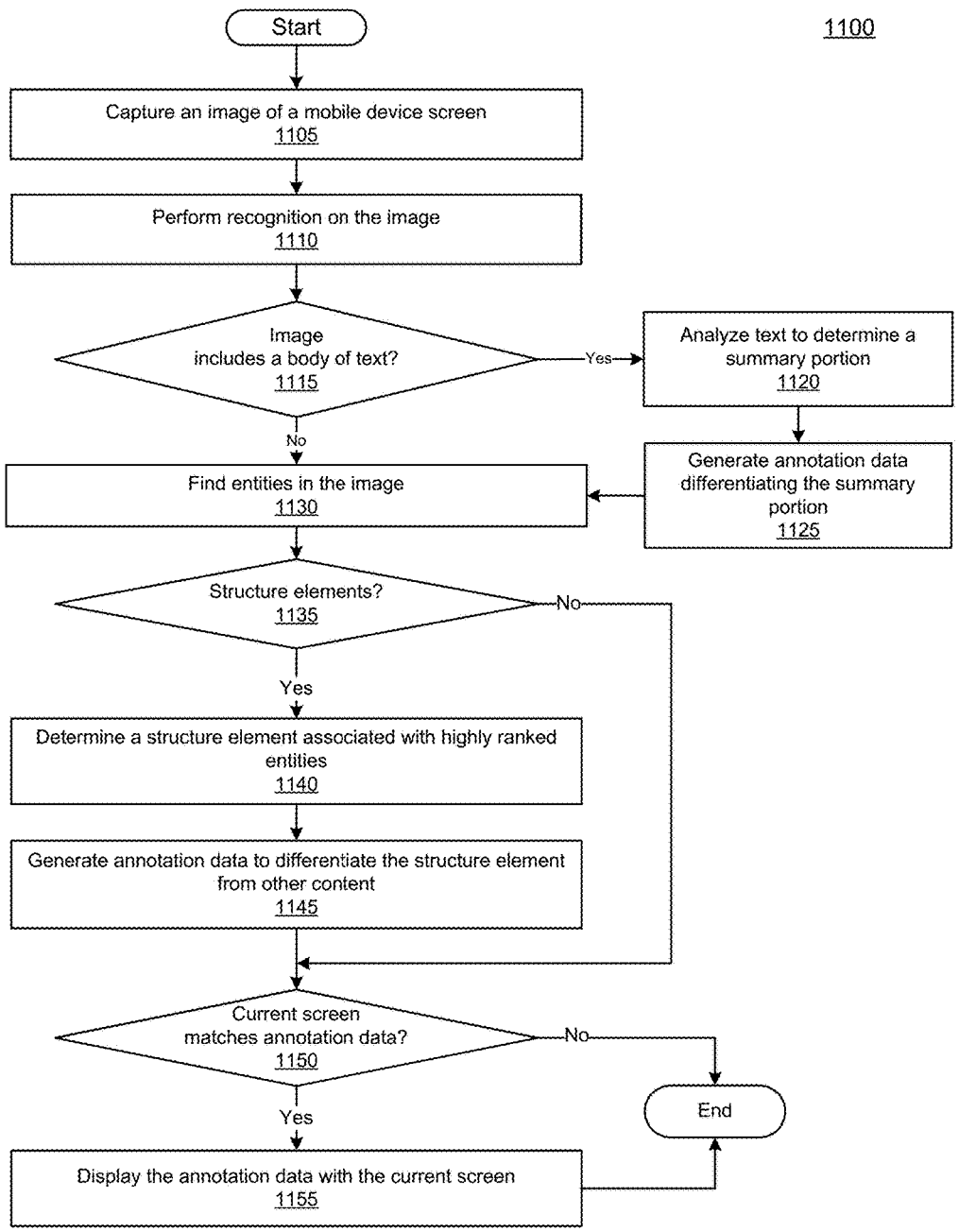
FIG. 11 illustrates a flow diagram of an example process for generating annotation data identifying relevant content in the display of a mobile computing device, in accordance with disclosed implementations.

FIG. 11 illustrates a flow diagram of an example process 1100 for generating annotation data identifying relevant content in the display of a mobile computing device, in accordance with disclosed implementations. Process 1100 may be performed by a mobile content context system, such as system 100 of FIG. 1 or system 300 of FIG. 3. Process 1100 may be used to identify content on a mobile screen that is either content-relevant or user-relevant, which may make it easier for a user to scan the onscreen content. The system may generate annotation data that highlights or otherwise differentiates the content-relevant or user-relevant content from the rest of the display. Process 1100 may begin by receiving an image of a screen captured on the mobile device (1105). The captured image may be obtained using conventional techniques. The system may identify recognized items by performing recognition on the image of the captured screen (1110). Recognized items may be text characters or numbers, landmarks, logos, etc. identified using various recognition techniques, including character recognition, image recognition, logo recognition, etc. Thus, recognized items may include words as well as locations, landmarks, logos, etc. In some implementations steps 1105 and 1110 may be performed as part of another process, for example the entity detection process described in FIG. 5 or the actionable content process described with regard to FIG. 8.

The system may determine whether the recognized items include a body of text (1115). The system may determine that the screen capture image includes a body of text when the character recognition identifies one or more paragraphs or when a percentage of the screen capture image that includes text is greater than 50%. In some implementations, the system may determine that the body of text includes a minimum number of words. The system may consider each paragraph a separate body of text, or the system may considered a continuous block of text, for example when the paragraphs relate to the same topic. For example the system can determine if two paragraphs refer to the same entities, or a have a minimum number of entities in common. If the system finds a body of text in the image (1115, Yes), the system may analyze the text using conventional summarization techniques to determine a portion of the body that serves as a summary (1120). The portion may be a sentence or a paragraph, or some other portion of the text. The system may generate annotation data that includes a visual cue that differentiates the summary portion from surrounding content (1125). As previously mentioned, the visual cue may be any kind of marking that differentiates the summary portion from the other content of the mobile screen. The visual cue may include or be associated with metadata, such as screen coordinates, an image portion, etc. as described herein. The summary portion is considered content-relevant because it summarizes the content of the screen capture image.

The system may also look for entities mentioned in the recognized content (1130). This may be performed as discussed above with regard to FIG. 5. In some implementations, the system may use candidate entities identified in the screen capture image. The system may also determine whether the content of the screen capture image includes structure elements (1135). Structure elements may represent any kind of repeating display item, such as list entries, table rows, table cells, search results, etc. If the content includes a structure element (1135, Yes), the system may determine if there is a structure element associated with a highly ranked entity (1140) or with a number of such entities. An entity may be highly ranked based on a user profile, device profile, general popularity, or other metric. The profile may include areas of interest specified by the user and entities or collections determined to be particularly relevant to a user based on historical activity. For example, the system may use a data store of ranked entities and collections, such as ranked entities and collections 117 of FIG. 1 or ranked entities 357 of FIG. 3. In particular, if an entity is a member of a collection that is of interest to the user, for example Italian restaurants, the system may boost a rank for the entity, even if the entity does not have a high rank with regard to the image or recent activity. In some implementations, the system may identify more than one entity in a structure element and calculate an aggregated rank for the entities found in the structure element. The system may compare the aggregated rank to a rank threshold and, when the aggregated rank meets the threshold the entities may be considered highly ranked. In some implementations, entities with a rank that exceeds a rank threshold may be considered highly ranked. When a highly ranked entity is associated with a structure element, the system may generate annotation data with a visual cue that differentiates the structure element (1145). The system may generate a visual cue for each structure element that includes a highly relevant entity. In some implementations, if the system identifies too many highly relevant entities the system may adjust the rank threshold to eliminate some of the entities considered highly ranked or select a predetermined number of the highest ranked entities, thereby decreasing the number of visual cues that correspond to user-relevant items. In an implementation where a server generates the annotation data, the server may provide the annotation data to the mobile device.

At the mobile device, the system may determine whether the annotation data matches the current screen (1150). For example, if the mobile application currently running (e.g., the mobile application that is generating the current screen) is different from the mobile application that generated the screen capture image, the system may determine the annotation data does not match the current screen. As another example, the system may use the screen coordinates or partial image data for at least some of the visual cues in the annotation data to determine if the currently displayed screen is similar to the screen capture image for which the annotation data was generated. For example, the system may match the image portion that corresponds with a visual cue with the same portion, using screen coordinates, of the current screen. If the image data for that portion does not match, the system may determine that the annotation data does not match the current screen. As another example, the annotation data may include a reference point, e.g., one portion of the screen capture image used to generate the overlay and the system may only compare the reference point with the current screen. In either case, if the user has scrolled, zoomed in, or zoomed out, the current screen may not match the annotation data. In some implementations, the system may look for the reference point or the portion of the image close by and may shift the display of the annotation data, in scale or position, accordingly. In such a situation the system may determine that the current screen and the annotation data do match.

If the annotation data and the current screen match (1150, Yes), the system may display the annotation data with the current screen (1155). If the annotation data and the current screen do not match (1150, No), the system may not display the annotation data with the current screen. Process 1100 ends for the screen capture image, although the system may perform process 1100 at intervals, e.g., each time a screen capture image is generated. As indicated earlier, process 1100 can provide a consistent user-interaction experience across all mobile applications running on the mobile device, so that user-relevant or content-relevant items are called out regardless of the mobile application that produced the content. Of course, a user may choose to turn the screen capture feature off, which prevents process 1100 from running. In some implementations, the user may also be provided the opportunity to turn on and off the visual cues generated by process 1100.

Providing Insight for Entities in Mobile On-Screen Content

Some implementations may identify entities in a screen displayed on a mobile device and provide an interface for surfacing information about the entities. The interface provides a powerful way of answering queries about an entity without leaving the context of the mobile application. The interface may be combined with, for example, the actionable content interface described earlier, with a different input triggering the insight interface. For example, a visual cue generated for an entity may be actionable to initiate a default action when the entity is selected with a short tap and may be actionable to initiate a process that provides insight on the connection(s) of the entity to other entities on the screen with a long press, or press-and-hold action, or a two-finger selection, etc. The second input need only be different from the first input that triggers the default action. The second input can be referred to as an insight selection. If the user performs an insight selection on one entity, the system may traverse a data graph to find other entities related to the selected entity in the graph that also appear on the screen. If any are found, the system may provide annotation data that shows the connections. A user can select the connection to see a description of the connection. If a user performs an insight selection on two entities at the same time, the system may walk the data graph to determine a relationship between the two entities, if one exists, and provide annotation data that explains the connection. In some implementations, the system may initiate a cross-application insight mode, for example when a user performs a second insight selection of an entity. The cross-application insight mode may cause the system to search for previously captured images that include entities related to the selected entity. Any previously captured images with an entity related to the selected entity may be provided to the user, similar to a search result. In some implementations, the system may provide the images in a film-strip style user interface or other scrollable user interface.

Figures 12A, 12B:
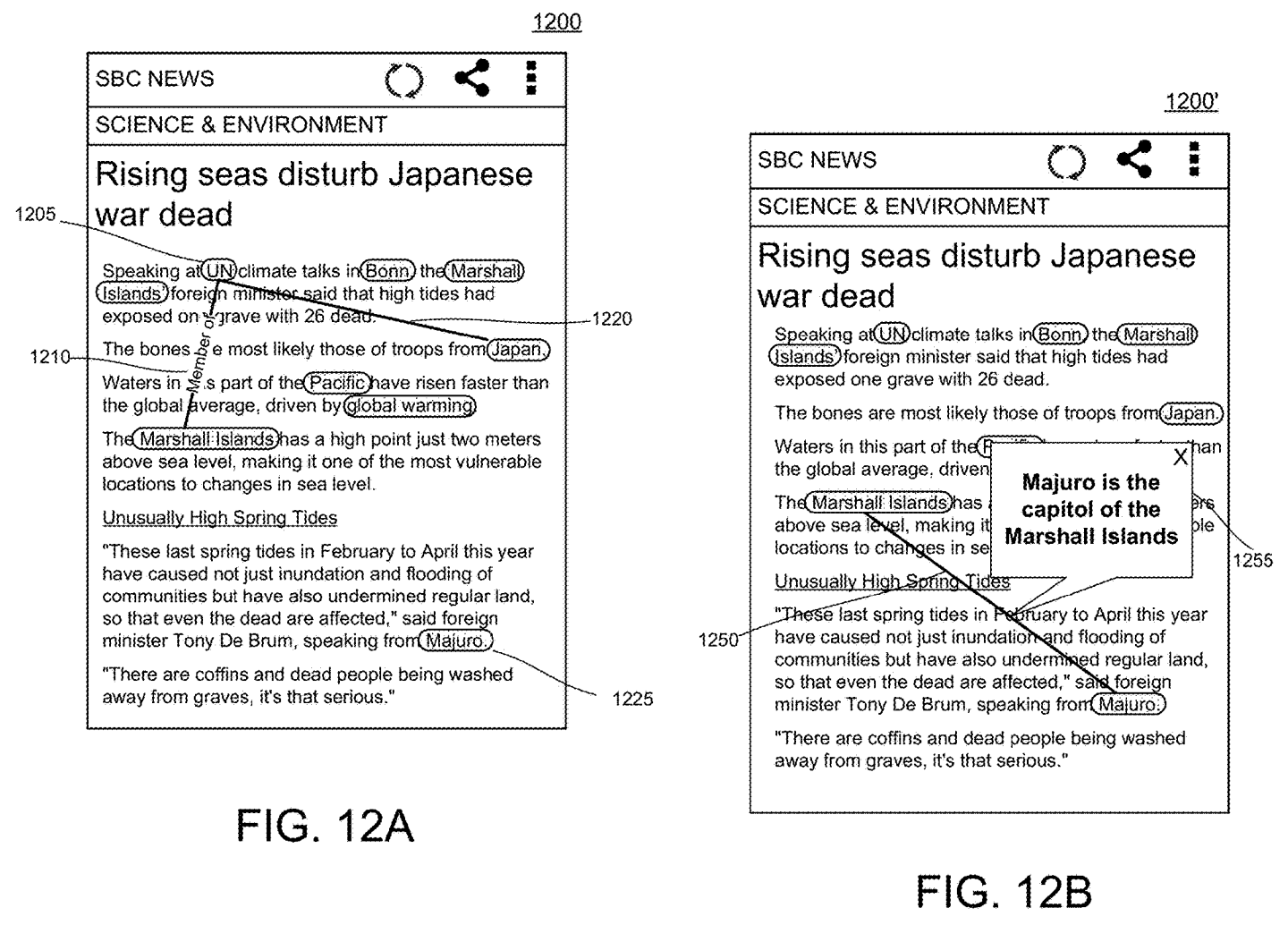

FIG. 12A illustrates an example display 1200 of a mobile computing device screen with annotation data highlighting connections between entities found in the content displayed on a mobile device, in accordance with disclosed implementations. A mobile content context system, such as system 100 of FIG. 1 or system 300 of FIG. 3, may generate annotation data that is displayed with a current screen on a mobile device to produce the display 1200. The display 1200 may include visual cues 1210 and 1220 that indicate entities related to the entity represented by the visual cue 1205. The entities themselves may have a visual cue, such as visual cue 1205 and visual cue 1225. In some implementations, the visual cue showing a relationship may be a line linking the entities. In some implementations, the line may be labeled with a description of the relationship between the two entities, such as visual cue 1210. In some implementations the line may not be labeled, such as visual cue 1220. The visual cue showing the relationship may also include an indication of relatedness. For example, a line between two actors who co-starred in one movie may be thinner or a different color or pattern from the line between two actors who co-starred in several movies. Visual cues may provide functionality, such a hyperlink to a source discussing the relationship between the entities. Of course, the visual cue representing the relationship is not limited to a line and may include changing the appearance of the visual cues for entities that are related, etc. In some implementations, the system may generate the visual cue 1210 and 1220 in response to an insight selection of the visual cue 1205.

FIG. 12B illustrates an example display 1200' of a mobile computing device displayed with annotation data providing information about a connection between two entities found in the content displayed on a mobile device, in accordance with disclosed implementations. A mobile content context system, such as system 100 of FIG. 1 or system 300 of FIG. 3, may generate annotation data that is displayed with a current screen on a mobile device to produce the display 1200'. The display 1200 may include annotation data that includes visual cue 1250 and explanation 1255 to be displayed with the current screen. The display 1200' may thus represent the same current screen as display 1200 in FIG. 12A, but different annotation data based on a different insight selection. For example, the system may generate the annotation data used to produce display 1200' when a user selects both the Marshall Islands entity and the Majuro entity at the same time. As a result, the system may determine the relationship between these two entities in a data graph and provide an explanation of the relationship as explanation 1255. The annotation data used to generate display 1200' may of course also include other visual cues, such as visual cues in addition to visual cue 1250 and explanation 1255.

Figure 13A:
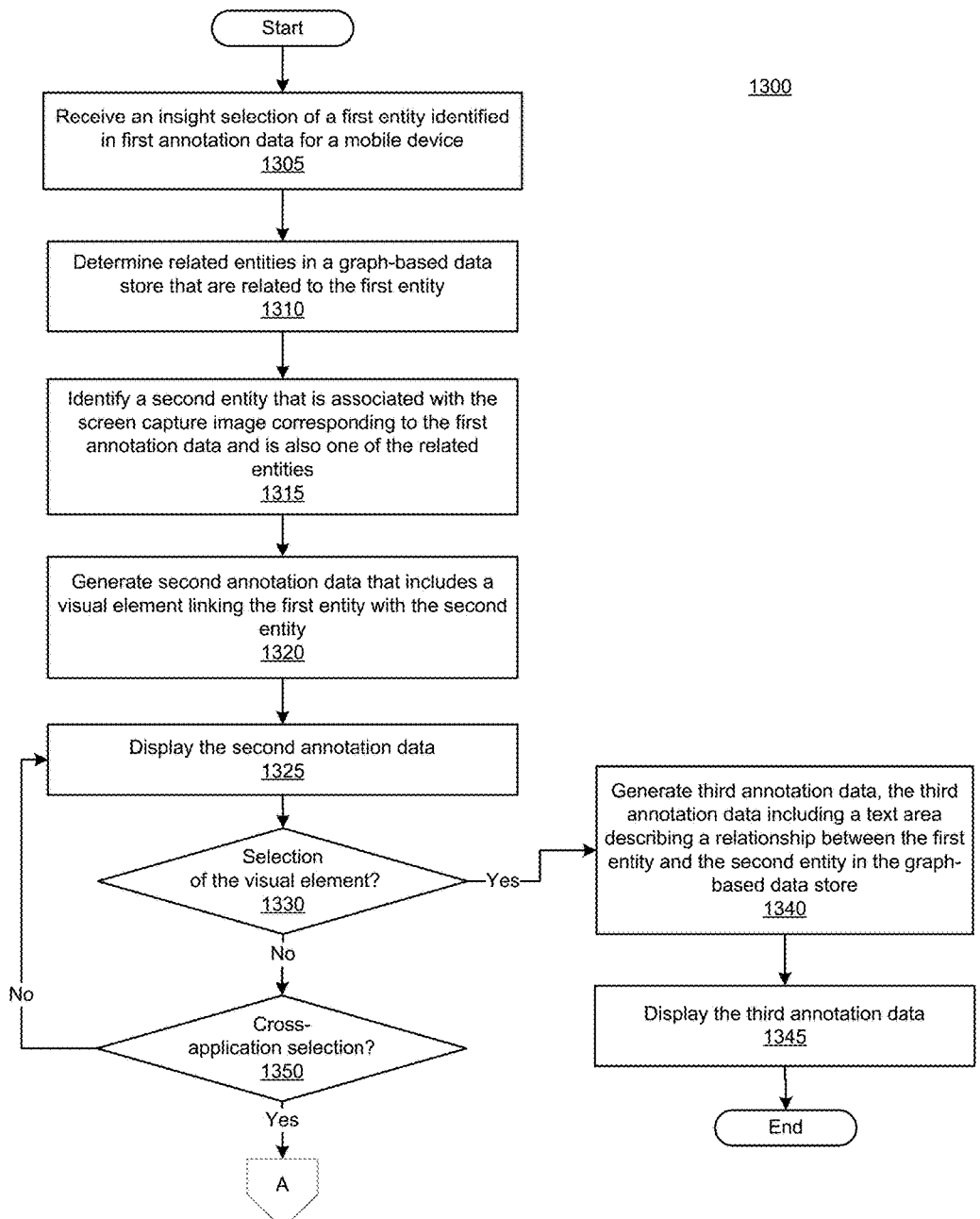
FIGS. 13A-B illustrate a flow diagram of an example process for generating annotation data identifying connections between entities found in the content of the display of a mobile computing device, in accordance with disclosed implementations.
Figure 13B:
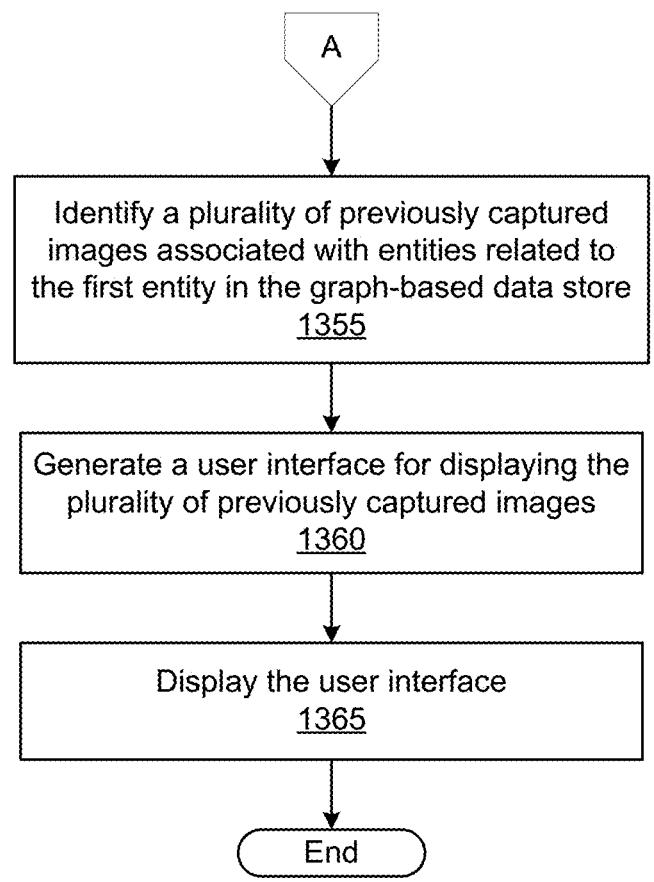

FIGS. 13A-B illustrate a flow diagram of an example process 1300 for generating annotation data identifying insightful connections between entities found in the content displayed on a mobile device content in the display of a mobile computing device, in accordance with disclosed implementations. Process 1300 may be performed by a mobile content context system, such as system 100 of FIG. 1 or system 300 of FIG. 3. Process 1300 may be used to provide insight about relationships with onscreen entities without leaving the context of the current application. In this manner, process 1300 may provide answers to queries using annotation data displayed along with the current screen generated by the mobile application. Process 1300 may begin when the system receives an insight selection of a first entity that is identified in a first annotation data for a mobile device (1305). For example, the system may have generated the first annotation data as a result of process 800 described above with regard to FIG. 8. The first annotation data may thus have visual cues for actionable content. The visual cues associated with entity types of actionable content may be configured to react to two types of input, one that initiates a default action and another that initiates entity insight surfacing. In some implementations the insight selection may be a long press or a press-and-hold type of action.

The system may determine entities related to the first entity in a data graph (1310). For example, in some implementations the system may walk the data graph, such as data graph 190, from the first entity to each entity it is connected to within a specified path length. In some implementations the path length may be one or two. In other words, the system may consider entities related to the first entity if the entities are directly related, or related through one intermediate entity, to the first entity. Entities reached via the paths within the specified path length may be considered related entities. The system may then identify a second entity that is a related entity and is associated with the screen capture image that corresponds with the first annotation data (1315). The system may identify more than one entity that is a related entity and also associated with the screen capture image. The system may generate second annotation data, the second annotation data including a visual element linking the first entity with the second entity (1320). The second annotation data may include the first annotation data or may be displayed with the first annotation data. In some implementations the visual element may be a line connecting the first entity and the second entity. If the system identifies more than one entity related to the first entity, the system may generate one visual element for each entity found. Thus, for example, in FIG. 12A the system generated visual element 1210 and visual element 1220. The system may display the second annotation data with the current screen (1325). This may occur in the manner described above with regard to FIGS. 8 and 11. Accordingly, if the second annotation data does not match the current screen, process 1300 may end, as the user has left the screen that corresponds with the second annotation data. If the second annotation data does not include the first annotation data, step 1325 may include displaying the first annotation data and the second annotation data with the current screen.

The system may determine if a selection of one of the visual elements representing the link has been received (1330). The selection may be a touch of the line that connects the two entities, for example. If a selection of the visual element has been received (1330, Yes), the system may generate third annotation data (1340). The third annotation data may include a text area describing the relationship between the first entity and the second entity in the graph-based data store. The text area may be a label added to the visual element, such as visual element 1210 of FIG. 12A or may be an explanation box, such as explanation 1255 of FIG. 12B. The third annotation data may include the second annotation data and the first annotation data or may be configured to be displayed with the first annotation data and the second annotation data. The mobile device may display the third annotation data with a current screen on the mobile device (1345). This may occur in the manner described above with regard to step 1325.

If a selection of the visual element has not occurred (1330, No), the system may check for a cross-application selection (1350). A cross-application selection may be a second insight selection for the same entity. For example, if the user performs a long press on an entity and the system provides visual elements linking that entity to other entities, and the user performs another long press on the same entity, the second long press may be considered a cross-application selection.

When the system receives a cross-application selection (1350, Yes), the system may identify a plurality of previously captured images associated with the related entities (1355 of FIG. 13B). The related entities may have been determined as part of step 1310 or the system may determine related entities again. In some implementations, the system may issue a query against an index of previously captured images, the query including each of the related entities. In some implementations, the system may select the most highly ranked related entities and use these in the query. The system may use the previously captured screens that are provided as a search result to generate a user interface for displaying the plurality of previously captured images (1360). In some implementations, the user interface may be provided as annotation data. In some implementations, the system may switch the mobile application to a search application that displays the search result, for example, as a scrollable film-strip or some other array of images.

Process 1300 can provide a method of making information in the data graph accessible and available in a consistent way across all mobile applications. This allows a user to query the data graph without leaving the context of the application they are currently in. Such insight can help the user better understand onscreen content and more easily find answers to questions.

Figure 14:
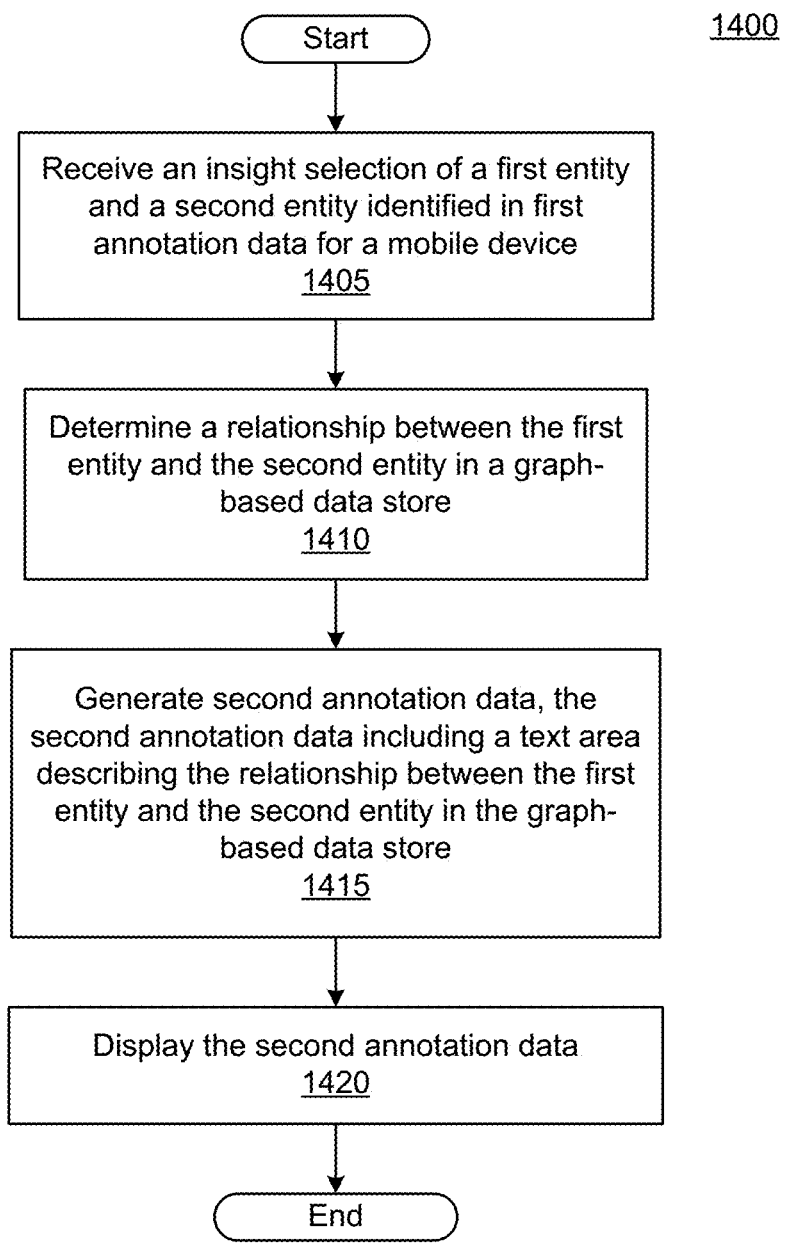
FIG. 14 illustrates a flow diagram of an example process for generating annotation data providing information on a connection between entities found in the content of the display of a mobile computing device, in accordance with disclosed implementations.

FIG. 14 illustrates a flow diagram of an example process 1400 for generating annotation data providing information on a connection between entities found in the content displayed on a mobile device content in the display of a mobile computing device, in accordance with disclosed implementations. Process 1400 may be performed by a mobile content context system, such as system 100 of FIG. 1 or system 300 of FIG. 3. Process 1400 may also be used to provide insight about relationships with onscreen entities without leaving the context of the current application. In this manner, process 1400 may provide answers to queries using annotation data displayed along with the current screen generated by the mobile application. Process 1400 may begin when the system receives an insight selection of a first entity and a second entity (1405). The first entity and the second entity may be identified via visual cues in a first annotation data for a mobile device. The system may then determine the relationships that connect the first entity to the second entity in the data graph (1410). In some implementations, the system may walk paths from the first entity to the second entity. In some implementations, the walks may be limited by a path length, for example two or three. The system may generate second annotation data, the second annotation data including a text area that describes the relationship between the first entity and the second entity in the graph-based data store (1415). For example, the system may base the text on the labeled edges in the data graph that connect the two entities. The system may display the second annotation data with a current screen on the mobile device (1420), as explained above with regard to FIGS. 8, 11, and 13A.

Indexing Mobile OnScreen Content

Some implementations may identify content on a screen of a mobile device and may index the content in a way that allows the content to be searched and recalled at a later time. The system may identify key items in a screen capture image and generate an index that matches the key items to the screen capture image. Key items may be words, phrases, entities, landmarks, logos, etc., discovered via recognition performed on the image. The index may be an inverted index that, for each key item, includes a list of images associated with the key item. In some implementations, any annotation data generated for an image may also be stored with the image. The system may rank key items using conventional signals as well as signals unique to the mobile environment.

The system may query the index by searching for key items responsive to the query. In some implementations, the system may generate annotation data for responsive data that includes a visual cue for content that is responsive to the query, helping the user to see why the previously captured image was responsive. In some implementations, the system may provide only a portion of the previously captured image, e.g., a snippet, that includes the responsive content. The snippet may include an area around the responsive key item in the image. The search result may be a scrollable list, such as a carousel of images, a grid of images, a film-strip style list, etc. The system may use conventional natural language processing techniques to respond to natural language queries, whether typed or spoken. The system may use signals unique to the mobile environment to generate better search results. For example, some verbs provided in the query may be associated with certain types of mobile applications and images captured from those mobile applications may receive a higher ranking in generating the search results. For example, the verb "mention" and similar verbs may be associated with communications applications, such as chat and mail applications. When the system receives a query that includes the verb "mention" the system may boost the ranking of responsive content found in images associated with the communications applications. Selecting a search result may display the search result with associated annotation data, if any, or may take the user to the application and, optionally, to the place within the application that the selected search result image was taken from.

Figure 15:
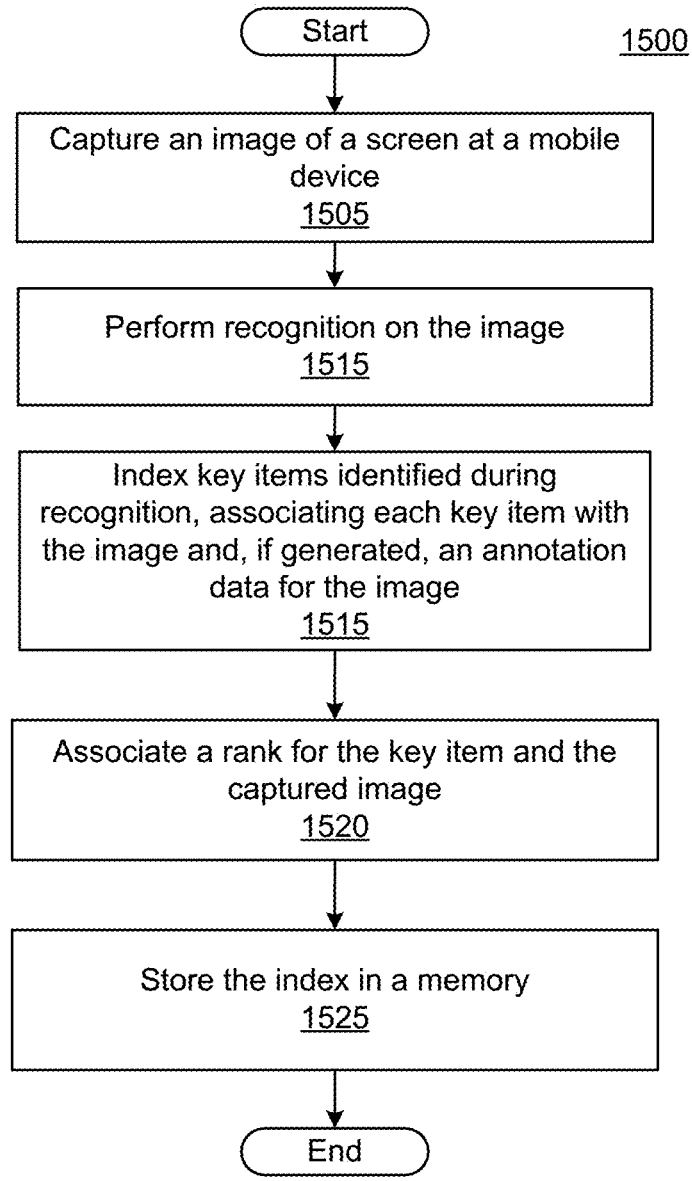
FIG. 15 illustrates a flow diagram of an example process for generating an index of screen capture images taken at a mobile device, in accordance with disclosed implementations.

FIG. 15 illustrates a flow diagram of an example process 1500 for generating an index of screen capture images taken at a mobile device, in accordance with disclosed implementations. Process 1500 may be performed by a mobile content context system, such as system 100 of FIG. 1 or system 300 of FIG. 3. Process 1500 may be used to generate an index that makes previously captured screen images searchable, so that the user can retrieve the user's previously viewed content. Process 1500 may begin when the system receives an image of a screen captured at a mobile device (1505). The captured image may be obtained using conventional techniques. The system may identify recognized items by performing recognition on the image of the captured screen (1510). Recognized items may be text characters or numbers, landmarks, logos, etc. identified using various recognition techniques, including character recognition, image recognition, logo recognition, etc. Thus, recognized items may include words as well as locations, landmarks, logos, etc. In some implementations steps 1505 and 1510 may be performed as part of another process, for example the entity detection process described in FIG. 5, the actionable content process described with regard to FIG. 8, or the relevant content process described with regard to FIG. 11.

The system may index key items identified by the recognition (1515). For example, the system may identify words and phrases from text recognition, may identify entities from text recognition, image recognition, and logo recognition, landmarks from image recognition, etc. In some implementations, the entities may be candidate entities and discovered entities identified during process 500, described above. The words, phrases, entities, and landmarks are examples of key items. The system may associate the image with each of the key items identified in the image using the index. In some implementations, the index may be an inverted index, so that each key item has an associated list of images in which the key item was found. In addition, the system may associate metadata with the image and key item. For example, the metadata may include where in the image the key item occurs, the rank of the key item with regard to the image, a timestamp for the image, a geo location of the device when the image was captured, etc. Accordingly, the system may calculate a rank for the key item with regard to the image and store the rank with the image and key item in the index. (1520). The rank of a key item may be calculated using conventional ranking techniques as well as with additional signals unique to the mobile environment. For example, when a key item is static across each image captured for a particular application, the system may rank the key item very low with regard to the image, as the key item occurs in boilerplate and is likely not very relevant to the user or the user's activities. Examples of boilerplate include item 710 of FIG. 7 and items 410 of FIG. 4. In some implementations, key items located in areas of the screen that do not change for a particular mobile application may be eliminated from the index. In some implementations, ranking may be similar to or updated by the rank calculated by process 500 of FIG. 5.

The system may store the index in a memory (1525). In some implementations, the user may specify the location of the stored index, such as on the mobile device or at a server that includes a profile for the user. In some implementations, the index may store screen capture images and key items from more than one device operated by the user. In some implementations, the index may include the screen capture image, and in some implementations the screen capture image may be stored in a separate data store or table. In some implementations, annotation data generated for the image may be stored with the image and may be displayed with the image after selection of the image from a search result. Process 1500 ends for this image, but the system may repeat process 1500 each time a screen capture image is generated by the mobile device. Of course, a user may choose to turn the screen capture feature off, which prevents process 1500 from running.

Figure 16:
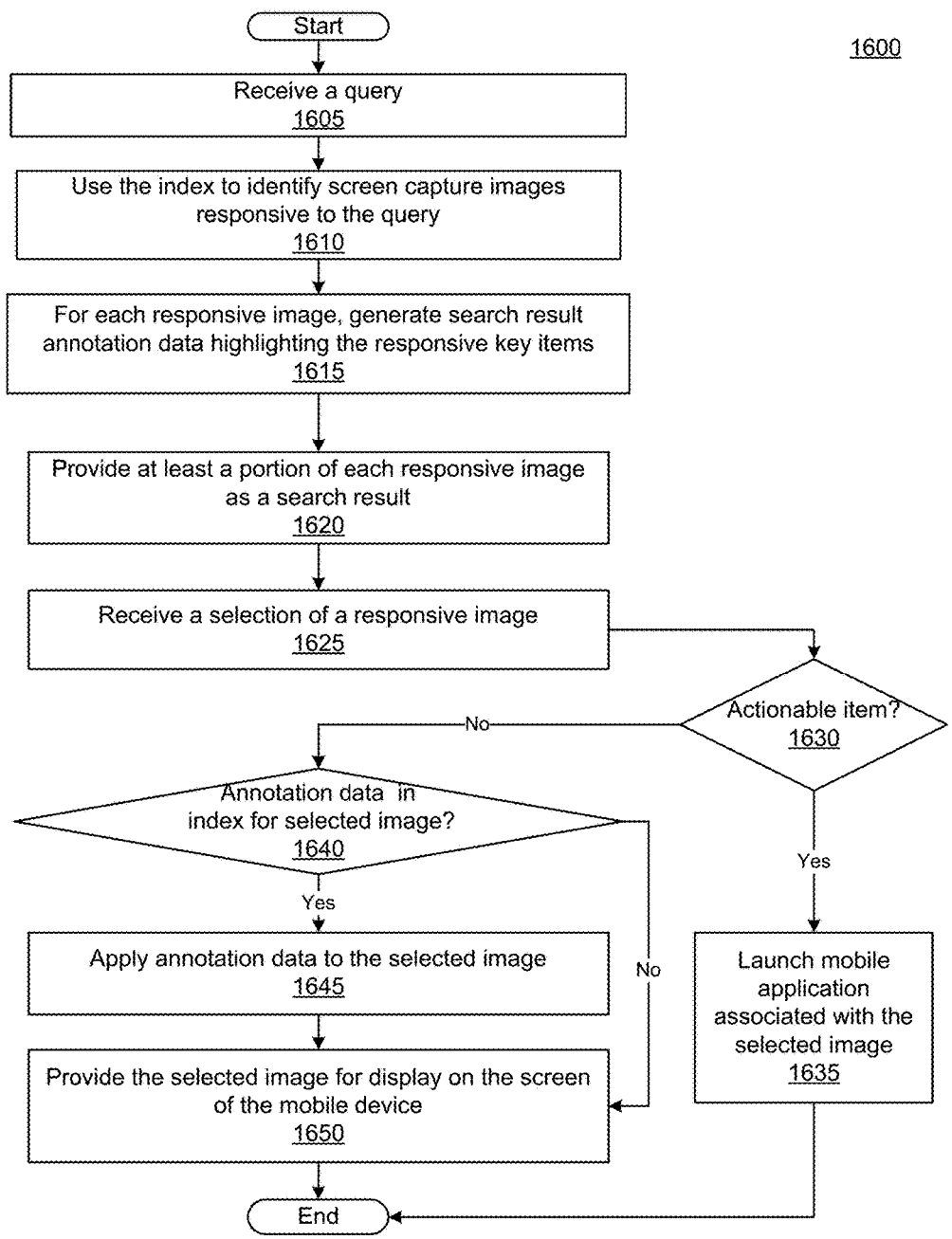
FIG. 16 illustrates a flow diagram of an example process for querying an index of screen captures taken at a mobile device, in accordance with disclosed implementations.

FIG. 16 illustrates a flow diagram of an example process 1600 for querying an index of screen capture images taken at a mobile device, in accordance with disclosed implementations. Process 1600 may be performed by a mobile content context system, such as system 100 of FIG. 1 or system 300 of FIG. 3. Process 1600 may be used to search an index of previously captured screen images that were captured on a user's mobile device. A search result for a query may include one or more of the previously captured screen images or portions of the images that include key items responsive to the query. The search result may rank the responsive previously captured screen images (or the portions) with regard to the query, so that higher ranking screen capture images appear first in the search results. The system may use ranking signals unique to the mobile environment to determine the rank of a responsive screen capture image. In some implementations, the system may associate certain verbs with a type or class of mobile application. For example, the verbs "say" and "mention" may be associated with communication applications, such as messaging and email applications. Likewise, the verbs "watch" and "view" may be associated with video applications, such as YouTube, Face-Time, Netflix, etc., When a user enters a natural language query, the system may boost the rank of a responsive image that matches the type associated with the verbs.

Process 1600 may begin when the system receives a query (1605). The query can be a natural language query or a query that includes other key items. In some implementations, the query may be submitted via a search mobile application on the mobile device by the user. In some implementations, the query may be submitted by the system to help generate annotation data, as will be explained in further detail herein. The system may use conventional natural language processing techniques and query parsing techniques to determine what key items are associated with the query. The system may use the key items associated with the query to search the index for screen capture images responsive to the query (1610). Screen capture images captured from the user's mobile device that are associated with key items associated with the query may be considered responsive images. For each responsive image, the system may generate search result annotation data (1615). In some implementations, the search result annotation data may generate a visual cue for each area of the image that corresponds with a responsive key item. In some implementations, the search result annotation data may make the image (or the image portion) an area of actionable content, where the action associated with the actionable content opens the mobile application that generated the screen captured in the image and may optionally take the user to the place or state in the mobile application represented by the image.

The system may provide at least a portion of each responsive image as a search result (1620). In some implementations, the portion may be a thumbnail size image with the annotation data that includes a visual cue for responsive key items. In some implementations, the portion may be a portion of the image that includes the responsive key item, so that the system displays a responsive snippet from the original image. In some implementations, the portion may be the whole image. In some implementations, the system may present the search results, which can include a plurality of previously captured images, in a scrollable list, such as a film-strip, a carousel, a scrollable grid, etc.

The user may select one of the images from the search results, and the system may receive the selection (1625). If the selected image was an area of actionable content with a default action (1630 Yes), the system may launch the mobile application associated with the selected image as the default action (1635). If the selection did not involve an actionable item (1630, No), the system may determine whether annotation data associated with the selected image exists (1640). The annotation data may have been generated, for example, as part of determining actionable content or relevant content for the image. In some implementation, the annotation data may be associated with the image after it is generated, for example in the index or screen capture data. If the annotation data exists (1640, Yes), the system may apply the annotation data to the selected image (1645). The system may provide the selected image for display on the screen of the mobile device (1650). For example, when the user selects a search result (e.g., the thumbnail or portion of a previously captured image), the system may display the full image, and any annotation data previously generated for the image, on the display of the mobile device. In some implementations, the user may perform an action on the displayed image that attempts to return the user to the state of the mobile device represented by the image. For example, the user may perform an action that causes the mobile device to return to the mobile application and the place within the mobile application represented by the image, as will be explained in further detail herein. Process 1600 then ends, having provided the user with an interface for searching previously viewed content.

Providing User Assistance from Interaction Understanding

Some implementations may use information on the current screen of the mobile device and information from previously captured screen images to predict when a user may need assistance and provide the assistance in annotation data. In one implementation, the system may use key content from a captured image as a query issued to the system. Key content represents the most relevant or important (i.e., highest ranked) key items for the image. When a key item for a previously captured screen image has a rank that meets a relevance threshold with regard to the query the system may select the portion of the previously captured screen image that corresponds to the key item and provide the portion as annotation data for the current screen capture image. In some implementations, the system may analyze the key items in the current screen capture image to determine if the key items suggest an action. If so, the system may surface a widget that provides information for the action. In some implementations, the system may use screen capture images captured just prior to the current screen capture image to provide context to identify the key content in the current screen capture image. The system may include a model trained by a machine learning algorithm to help determine when the current screen suggests an action, and which type of action is suggested.

Figures 17, 18:
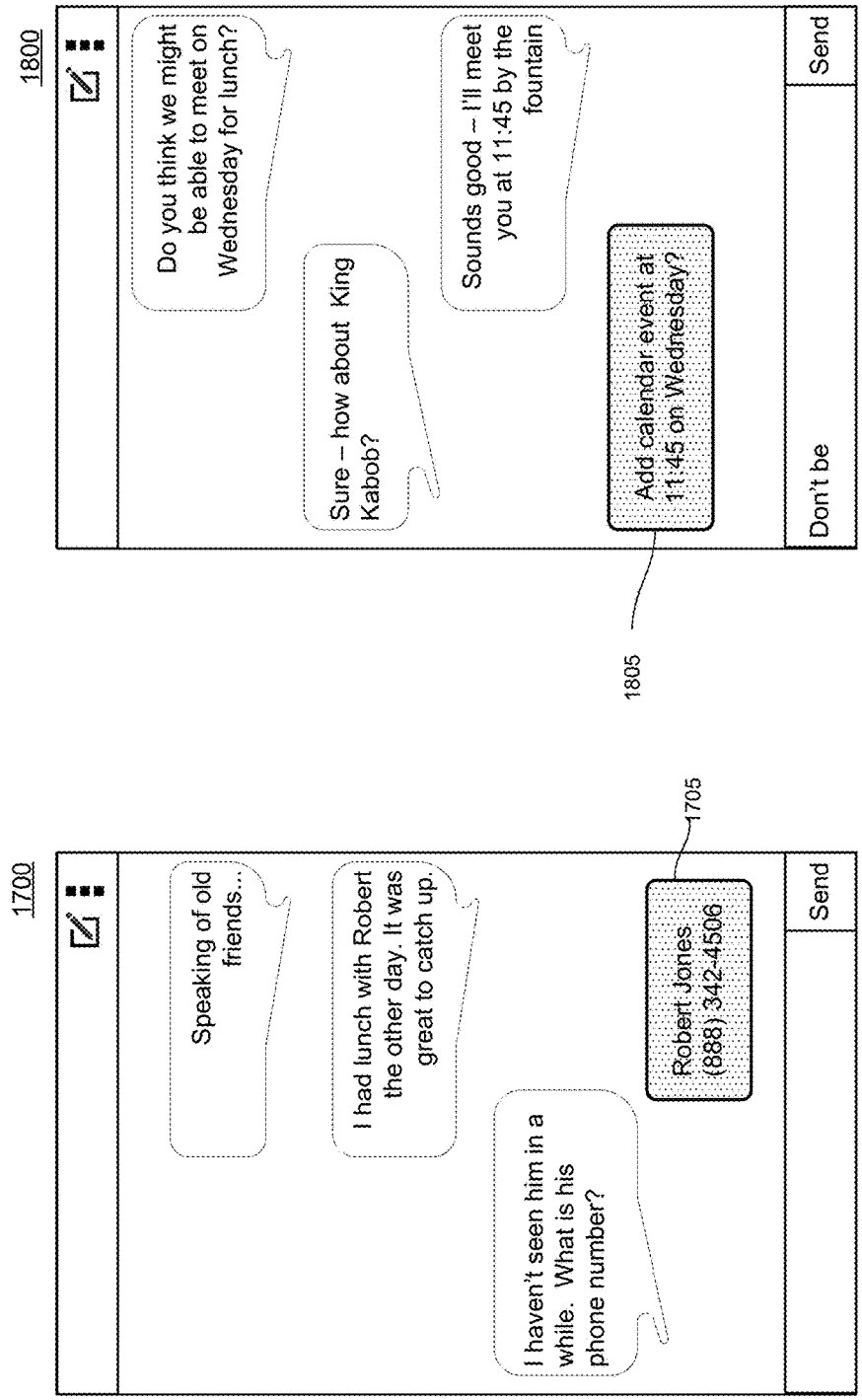
FIGS. 17-19 illustrate example displays for a mobile computing device with automated assistance from interaction understanding, in accordance with disclosed implementations.
Figure 19:
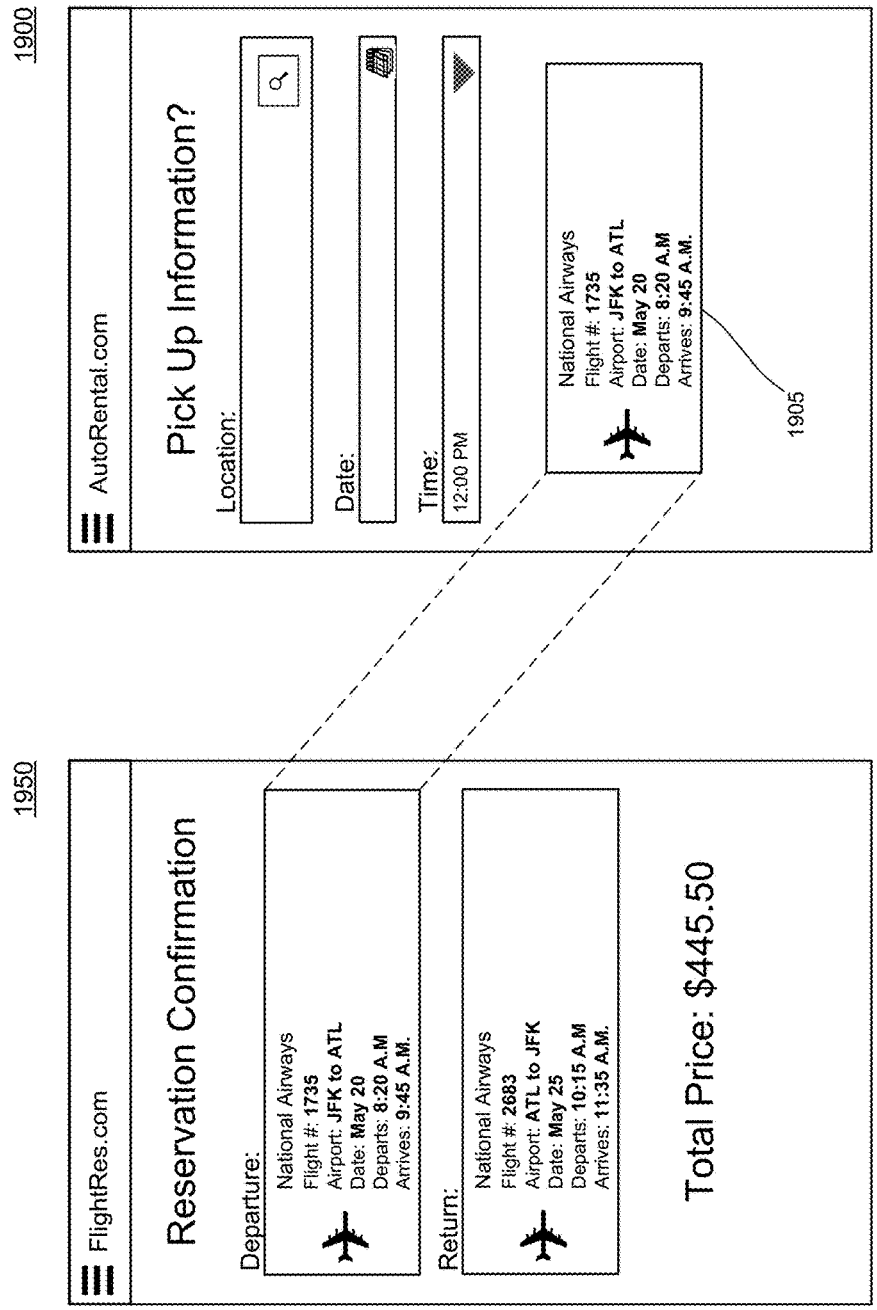

FIGS. 17-19 illustrate example displays for a mobile computing device with automated assistance from interaction understanding, in accordance with disclosed implementations. A mobile content context system, such as system 100 of FIG. 1 or system 300 of FIG. 3, may generate annotation data that is displayed with a current screen on a mobile device to produce the displays illustrated. In the example of FIG. 17, the system has determined that the current screen includes information that suggests looking up a contact (e.g., suggests an action). The system has provided annotation data that includes assistance window 1705 to produce display 1700. The assistance window 1705 includes information surfaced using a contact widget. For example, the contact widget may look in the contacts associated with the mobile device for the person mentioned and provide the information about the contact.

In the example of FIG. 18, the system has determined that the current screen includes information that suggests scheduling an event (e.g., another type of action). The system has provided annotation data that includes assistance window 1805 to produce display 1800. The assistance window 1805 includes a calendar widget that adds a new event to the calendar with the event information, such as date and time, surfaced based on information found in the screen. Thus, an assistance window may be configured to perform an action (e.g., adding a new calendar event) as well as displaying information obtained from another mobile application (e.g., displaying any existing calendar events for the date mentioned). In the example of FIG. 19, the system has determined that a previously viewed screen, e.g., screen 1950, has information that may be helpful or relevant to the user for the current screen, e.g., screen 1900. The system has provided annotation data that includes assistance window 1905 to produce display 1900. The assistance window 1905 includes a snippet of the previously viewed screen, indicated by the dashed lines, that includes information highly relevant to the current screen 1900. The previously viewed screen 1950 may have been captured and indexed, as discussed herein.

Figure 20:
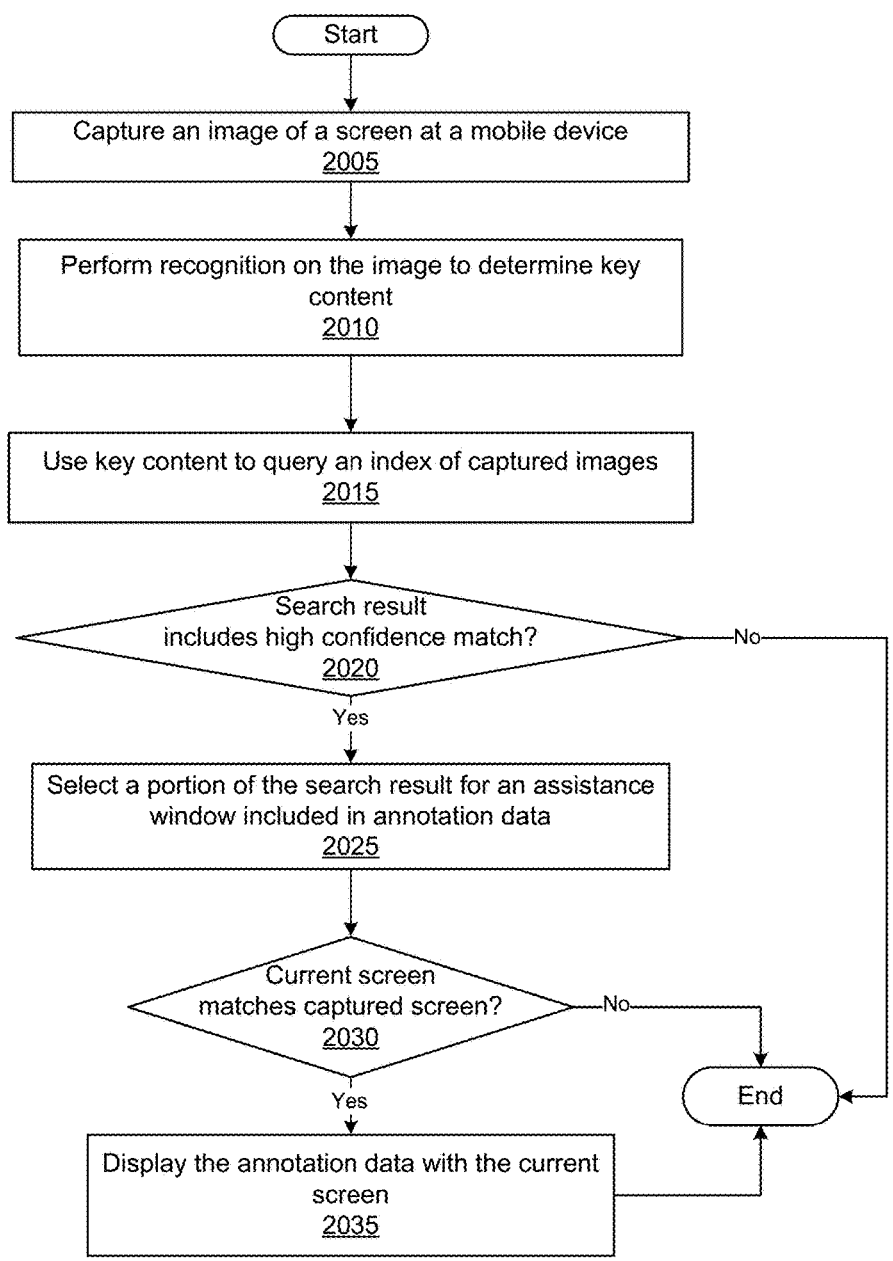
FIG. 20 illustrates a flow diagram of an example process for generating annotation data with an assistance window based on interaction understanding, in accordance with disclosed implementations.

FIG. 20 illustrates a flow diagram of an example process 2000 for generating annotation data with an assistance window based on interaction understanding, in accordance with disclosed implementations. Process 2000 may be performed by a mobile content context system, such as system 100 of FIG. 1 or system 300 of FIG. 3. Process 2000 may be used to automatically generate an assistance window based on the context of the current screen. Process 2000 may begin when the system receives an image of a screen captured at a mobile device (2005). The captured image may be obtained using conventional techniques. The system may identify recognized items by performing recognition on the image of the captured screen (2010). Recognized items may be text characters or numbers, landmarks, logos, etc. identified using various recognition techniques, including character recognition, image recognition, logo recognition, etc. Thus, recognized items may include words as well as locations, landmarks, logos, etc. In some implementations steps 2005 and 2010 may be performed as part of another process, for example the entity detection process described in FIG. 5, the actionable content process described with regard to FIG. 8, the relevant content process described with regard to FIG. 11, or the indexing process described with regard to FIG. 15.

The system may identify key content in the image and use the key content to query an index of previously captured images (2015). Key content may include key items, e.g., those identified during a indexing process such as process 1500 of FIG. 15, that have the highest ranks with regard to the image. In some implementations, the rank may need to exceed a threshold to be considered key content. The system may issue a query using the key content, for example using process 1600 described above with regard to FIG. 16. When the system receives the search results, the system may determine if the search results include a search result with a high confidence match with regard to the query (2020). For example, previously captured screen images that occur close in time to the image may be considered more relevant. In addition, previously captured screen images that were capturing from mobile applications of the same type or classification (e.g., travel applications) may be considered more relevant. The system may use a threshold to determine if any of the search results include a high enough confidence. If none do, process 2000 ends, as the system is not confident that any of the relevant previously viewed images would be of assistance to the user.

If at least one search result is a high confidence match (2020, Yes), the system may select a portion of the search result (e.g., the entire previously captured screen image, or a snippet of the image that includes responsive items) for use in annotation data that includes an assistance window (2025). The snippet may include an area of the image around the responsive content. The annotation data may be provided to the mobile device for display with the currently running application. Accordingly, at the mobile device, the system may determine whether the annotation data matches the current screen (2030). For example, if the mobile application currently running (e.g., the mobile application that is generating the current screen) is different from the mobile application that generated the screen capture image (e.g., from step 2005), the system may determine the annotation data does not match the current screen. As another example, the annotation data may include a reference point, e.g., one portion of the screen capture image used to generate the annotation data, and the system may compare the reference point with the current screen. In either case, if the user has scrolled, zoomed in, or zoomed out, the current screen may not match the annotation data. In some implementations, the system may look for the reference point close by and may shift the display of the annotation data accordingly. In such a situation the system may determine that the current screen and the annotation data do match.

If the annotation data and the current screen match (2030, Yes), the system may display the annotation data with the current screen (2035). If the annotation data and the current screen do not match (2030, No), the system may not display the annotation data with the current screen. Process 2000 ends for the screen capture image, although the system may perform process 2000 at intervals, e.g., each time a screen capture image is generated. In some implementations, process 2000 may be performed in conjunction with other analysis and processes performed on a captured image. Of course, a user may choose to turn the screen capture feature off, which prevents process 2000 from running. In some implementations, the user may also be provided the opportunity to turn on and off the visual cues generated by process 2000.

Figure 21:
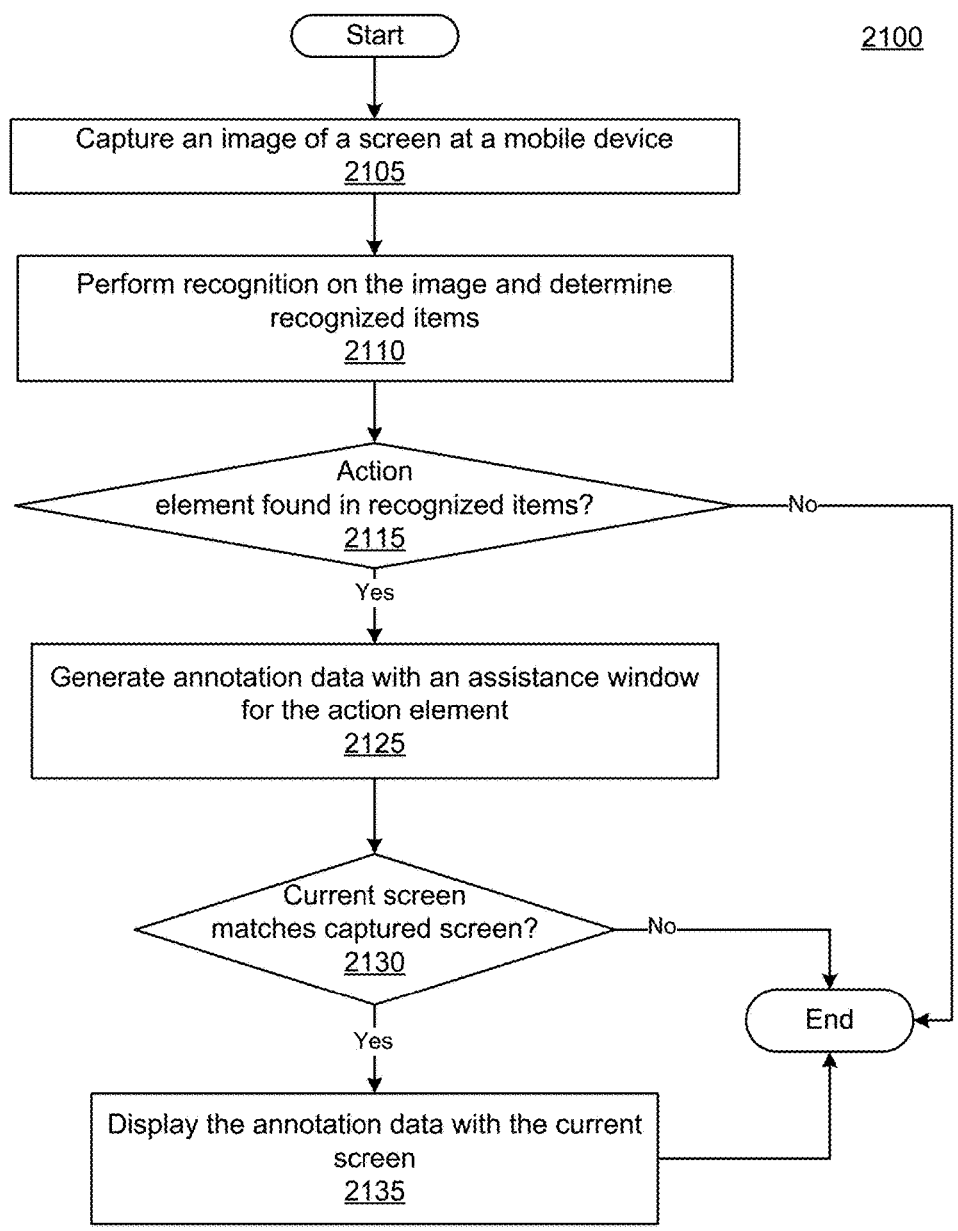
FIG. 21 illustrates a flow diagram of another example process for generating annotation data with an assistance window based on content captured from a mobile device, in accordance with disclosed implementations.

FIG. 21 illustrates a flow diagram of another example process 2100 for generating annotation data with an assistance window based on content captured from a mobile device, in accordance with disclosed implementations. Process 2100 may be performed by a mobile content context system, such as system 100 of FIG. 1 or system 300 of FIG. 3. Process 2100 may use a model trained by a machine learning algorithm to recognize actions within the content of a screen capture image and may provide a default event action or widget to provide assistance based on the action. Process 2100 may begin when the system receives an image of a screen captured at a mobile device (2105) and identifies recognized items by performing recognition on the image of the captured screen (2110), as described above. In some implementations steps 2105 and 2110 may be performed as part of another process, for example the entity detection process described in FIG. 5, the actionable content process described with regard to FIG. 8, the relevant content process described with regard to FIG. 11, the indexing process described with regard to FIG. 15, or process 2000 described above.

The system may determine whether any action is suggested in the recognized content of the screen capture image (2115). Actions can be any activity that suggests an action to be taken by the user. For example, actions may include adding an event for a calendar entry, looking up availability for a certain date, looking up or adding names, numbers, and addresses for a contact, adding items to a to-do list, looking up items in a to-do list, or otherwise interacting with a the mobile device. In some implementations, the system may include a machine learning algorithm that can learn actions commonly performed by the user in the past and predict when it is likely the user intends to perform those actions again. For example, if the user commonly opens two applications together, e.g., a crossword application and a dictionary application, the action may be opening the dictionary application when the user opens the crossword application. An action element may be the text that triggers or suggests the action. If no action elements are found (2115, No), process 2100 ends as no assistance window is generated. If an action element is found (2115, Yes), the system may generate annotation data with an assistance window for the action element (2125). In some implementations, the system may have a data store that associates an event action with an action element. For example, the system may determine if the action element is related to a contacts widget or a calendar widget using, for example, event actions 114 of FIG. 1. The assistance window may include information obtained from a data store. For example, the assistance window may query the data store and provide data from the data store in text format. For example, the system may query contact information for a person mentioned in the content of the screen capture image and provide the contact information in the assistance window. As another example, the system may query calendar information for the user for a window of time that includes a date and time suggested in the image and provide the schedule of the user for the window of time in the assistance window. As another example, the system may determine, e.g., using a machine learning algorithm, that the user is likely to repeat some action previously performed and suggest performing the action. Performing the repeated action may include automating user input, as described below. In some implementations, the assistance window may include a suggestion to automatically perform an action. For example, the assistance window may include text that describes the action to be performed, such as adding a new contact, and the assistance window may be selectable. When selected, the assistance window may launch the action suggested on the mobile device.

The annotation data may be provided to the mobile device for display with the current screen. Accordingly, at the mobile device, the system may determine whether the annotation data matches the current screen (2130). For example, if the mobile application currently running (e.g., the mobile application that is generating the current screen) is different from the mobile application that generated the screen capture image (e.g., from step 2105), the system may determine the annotation data does not match the current screen. As another example, the annotation data may include a reference point, e.g., one portion of the screen capture image used to generate the annotation data, and the system may compare the reference point with the current screen. In either case, if the user has scrolled, zoomed in, or zoomed out, the current screen may not match the annotation data. In some implementations, the system may look for the reference point close by and may shift the display of the annotation data accordingly. In such a situation the system may determine that the current screen and the annotation data do match.

If the annotation data and the current screen match (2130, Yes), the system may display the annotation data with the current screen (2135). If the annotation data and the current screen do not match (2130, No), the system may not display the annotation data with the current screen. Process 2100 ends for the screen capture image, although the system may perform process 2100 at intervals, e.g., each time a screen capture image is generated. In some implementations, process 2100 may be performed in conjunction with other analysis and processes performed on a captured image. Of course, a user may choose to turn the screen capture feature off, which prevents process 2100 from running. In some implementations, the user may also be provided the opportunity to turn on and off the visual cues generated by process 2100.

Automating User Input from Mobile On-Screen Content

Some implementations may capture user input actions while screen capture images are captured on a mobile device and use the user input actions to return the mobile device to a state represented by a previously captured screen image or to automatically perform a task for a user with minimal additional input. The user input actions include taps, swipes, text input, etc. performed by a user when interacting with the touch-screen of a mobile device. The system may store the input actions and use them to replay the actions of the user. Replaying the input actions may cause the mobile device to return to a previous state, or may enable the mobile device to repeat some task with minimal input. For example, the user input actions may enable the mobile device reserve a restaurant using a specific mobile application by receiving the new date and time using user input actions used to reserve the restaurant a first time. Returning to a previous state provides the user with the ability to deep-link into a particular mobile application. In some implementations, the mobile device may have an event prediction algorithm, for example one used to determine action elements as part of process 2100 of FIG. 21, that determines a previously captured image that represents an action the user will likely repeat.

Figure 24:
FIG. 24 illustrates example displays for a mobile computing device for selecting a previously captured image, in accordance with disclosed implementations.

FIG. 24 illustrates example displays for a mobile computing device for selecting a previously captured image, in accordance with disclosed implementations. In the example of FIG. 24, display 2400 represents a selectable assistance window 2405 with a preview 2410 of the previously captured image. The previously captured screen image represented by preview 2410 may be included, for example, in an index of previously captured screen images from the user device. When the user selects the assistance window (or a control for the window, etc.), the system may automatically take the mobile device to the state represented by the preview 2410, using the previously captured screen image as the selected image. As one example, the system may use the machine learning algorithm to determine that the user makes a dinner reservation for two at Mr. Calzone most Fridays and generate assistance window 2405 to automate the next reservation. Display 2450 illustrates an example of a search result for previously captured screen images. When the user selects image 2455, the system may endeavor to automatically take the mobile device to the state represented by the image 2455, as described below. In other words, the system may attempt to open the app that originally generated image 2455 and re-create the actions that resulted in image 2455.

Of course implementations may include other methods of obtaining a previously captured screen image.

Figure 22:
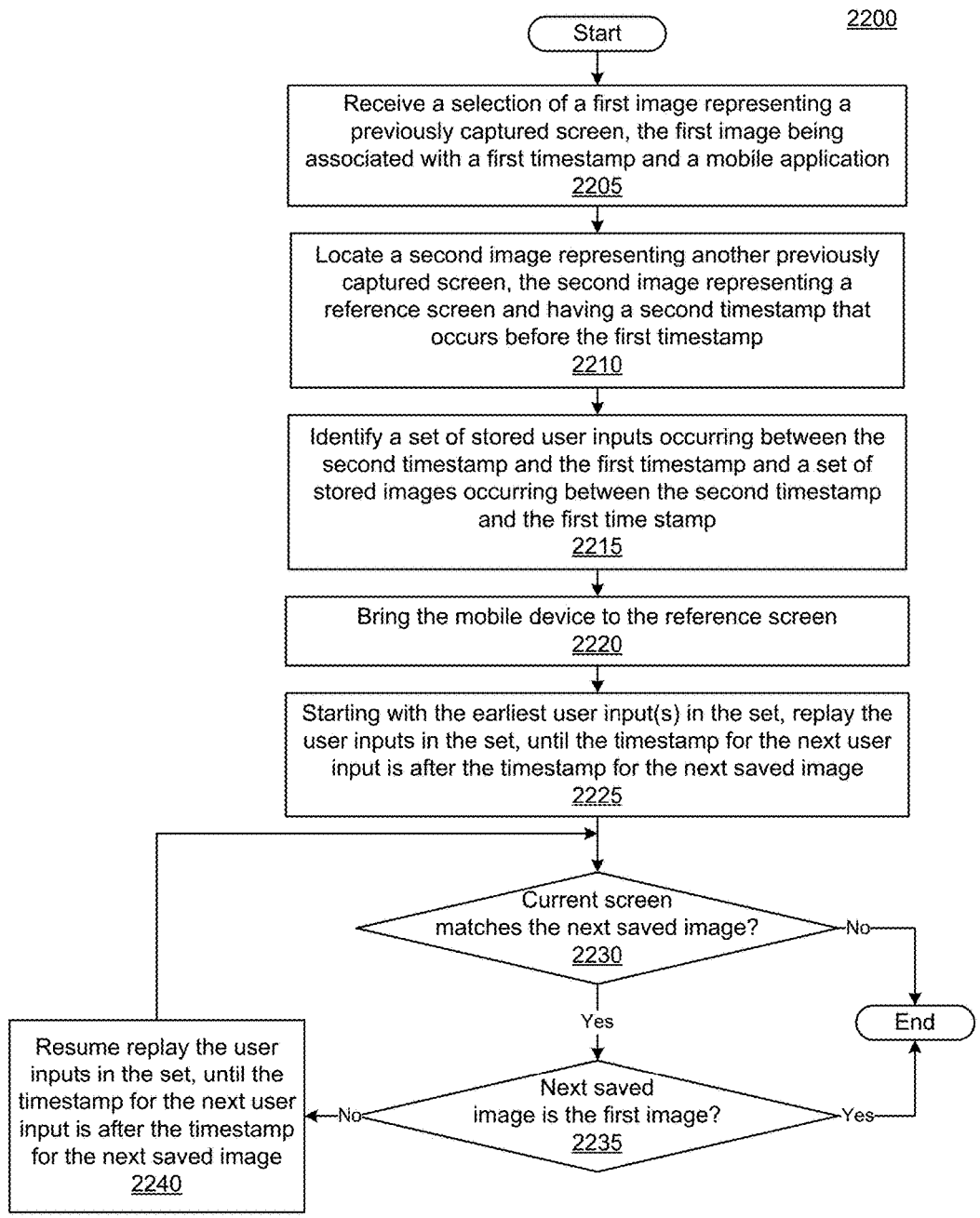
FIG. 22 illustrates a flow diagram of an example process for automating user input actions based on past content displayed on a mobile device, in accordance with disclosed implementations.

FIG. 22 illustrates a flow diagram of an example process 2200 for automating user input actions based on past content displayed on a mobile device, in accordance with disclosed implementations. Process 2200 may be performed by a mobile content context system, such as system 100 of FIG. 1 or system 300 of FIG. 3. Process 2200 may use previously captured user input data to take the user back to a state represented by a selected image of a previous screen viewed by the user. Process 2200 may be an optional process that the user of the mobile device controls. In other words, the user of the mobile device may choose to have user input actions stored, or the user may turn of storing of user input actions. When the user turns on the collection of user input actions, the user may have access to the functionality provided by process 2200.

Process 2200 may begin when the system receives a selection of a first image that represents a previously captured screen (2205). The selection may be from a search result, or may be from a mobile application configured to allow the user to select a previously captured screen, or may be a screen selected as a prior action the user wants to repeat, or may be a screen shared with the user from another mobile device. The first image is associated with a timestamp and a mobile application that was executing when the image was captured. The system may then locate a second image that represents a different previously captured screen (2210). The second image represents a reference screen. The reference screen may be a home screen for the mobile device (e.g., the screen that displays when the mobile device is turned on) or may be an initial screen for the mobile application (e.g., the screen that first displays when the mobile application is activated from the home screen). The second image also has a timestamp, which is earlier than the timestamp of the first image. In other words, the system may look backwards in time through previously captured screen images for an image representing a reference screen. The second image, thus, represents the reference screen that preceded the first image.

The system may identify a set of stored user inputs occurring between the two timestamps and a set of previously captured screen images that occur between the two timestamps (2215). The user inputs may have been captured, for example, by a screen capture engine, such as screen capture application 301 of FIG. 3. The system may cause the mobile device to begin at the reference screen (2220). In other words, the system may take the mobile device to the home screen or may start-up the application associated with the first image, as if it were initiated from the home screen, depending on what the reference screen reflects. The system may then begin replaying the user input actions in order, e.g., starting with the earliest user input action in the set (2225). The system may replay the user input actions until the next user input action in the set occurs after the timestamp for the next screen capture image in the set of images. In re-playing the user input actions, the system sends a signal to the processor of the mobile device that mimics the action and location performed by the user. User input actions with the same timestamp may be replayed at the same time—e.g., simulating a multi-finger input. The mobile device then responds to the replayed action as if a user had performed the action. In some implementations, the system may replay the actions using a virtual screen, e.g., one that is not visible to a user of the mobile device until the replay ends.

After the system replays the user input action that occurred just prior to the next screen capture image in the set of images, the system compares the screen displayed on the mobile device with the next screen capture image in the set (2230). Determining whether the screens match may be similar to determining whether annotation data matches a current screen, as described above. In other words, the system may compare portions of the screen displayed and the next screen capture image, or portions thereof. If the two screens do not match (2230, No), the system may stop replaying user input actions and process 2200 ends. This may occur because the user input actions no longer lead to the same place in the application. In other words, the system cannot recapture the state. This may occur for several reasons, one of which is that content has been deleted or moved. Thus, the system will attempt to bring the user as close as possible to the desired state, but may terminate when it is apparent that the path followed using the original user input actions leads to a different place.

If the screens do match (2230, Yes), the system may determine if the next image in the set of images is the first image (2235). In other words, the system may determine if it has arrived at the desired state. If so (2235, Yes), process 2200 ends. If not (2235, No), the system may resume replay of the user inputs until the timestamp of the next user input in the set is after the timestamp of the next screen capture image in the set of images (2240). Then the system may repeat determining whether to abort the replay, whether the state has been achieved, or whether to continue replaying the user actions. Replaying the user input actions saves the user time as the replay may occur more quickly than the user actually performing the actions. Furthermore, replaying the user input actions enables the user to switch mobile devices while keeping the same state, or to help another user achieve the same state, as will be described in more detail with regard to FIG. 23.

Process 2200 may be used to automatically repeat a task for the user. For example, the system may provide an interface that enables the user to choose a previous screen and indicate the user wishes to repeat the action that led to the screen. In such an implementation, the system may find the set of user input actions, as described above. The system may replay the user input actions as above, except that for text input actions, the system may not replay the actions but may obtain or wait for input from the user. For example, the system may search the user input actions in the set and determine the user input actions that include a text input. The system may prompt the user for new text input to replace the text input identified in the user input actions. The system may use the new text input when replaying the user input actions. Such implementations allow the user, for example, to make a restaurant reservation by selecting the image from a previous reservation and providing the date and time of the new reservation (e.g., via the interface). In addition or alternatively, the user interface may enable the user to indicate a recurring action, such as reserving a table for 8 pm every Tuesday for some specified time frame. The system may then calculate the date rather than asking the user for the date. In such implementations, process 2200 can shorten the number of key-presses and actions needed by the user to repeat an action.

In some implementations, the mobile device may provide the user input actions and the set of screen capture images to a server. The server may use the user input actions and set of screen capture images as input to a machine learning algorithm, for example as training data. The machine learning algorithm may be configured to predict future actions based on past actions, and could be used to determine action events, as discussed above. The user input actions and screen capture images may be treated in one or more ways before it is stored or used at the server, so that personally identifiable information is removed. For example, the data may be treated so that no personally identifiable information can be determined for the user, or a user's geographic location may be generalized where location information is obtained (such as to a city, ZIP code, or state level). In some implementations, the server may periodically provide the mobile device with coefficients and the mobile device may use the coefficients to execute an algorithm to predict likelihood of user action so that the mobile device can make a prediction without communicating with the server for each prediction. The mobile device may periodically update the server with historical data, which the server may use to calculate updated coefficients. The server may provide the updated coefficients to the mobile device. In some implementations, the user device may operate its own machine learning algorithm to determine prediction coefficients, obviating the need for communication with any other computer.

Sharing Screen Content in a Mobile Environment

Some implementations may provide a user with the capability of sharing current screen content or previous screen content with others. The system may enable the user to choose the areas of the screen to share. Because sharing works across all mobile applications running on the mobile device, sharing a picture works the same as sharing a news article, making the user experience more fluid and consistent. The user may also choose to share a previously viewed screen. For example, the user may be chatting with another person and desire to share a previously viewed article. The user may search for the article, for example using a search application for the index of previously captured screens, and select a screen showing the article from a search result. The user may then share the selected screen with the other person. Sharing may occur directly from mobile device to mobile device or via a server. In a server implementation, sharing the screen may include copying the screen from the sender's data to the recipient's data store of shared screens and sending a notification that the screen is ready to be viewed.

The recipient of a shared screen may view the shared screen as a picture. In some implementations, if the recipient's mobile device is also running the screen capture application, the recipient's system may capture the picture, index it, generate annotation data, etc. In some implementations, receiving a shared screen may trigger an automated response. One automated response may be to perform recognition on the image and find a web page or other URL (e.g., document available via the Internet) that matches the recognized content. If a matching URL is found, the system may open this URL in a browser application for the recipient or in a corresponding mobile application. For example, if the shared image came from a news application, for example a State Broadcasting Company (SBC) application, the recipient's mobile device may use the SBC application to open the URL. In some implementations, the application used to capture the shared screen may be sent with the shared image so the recipient mobile device knows which application to use to open the URL. If the recipient does not have the mobile application installed, the browser application may be used, or the recipient's mobile device may ask if the recipient wants to install the application.

In another automated response, a user may send a shared screen and user input actions (e.g., taps, swipes, text input) to the second device. This may allow the recipient device to automatically take the recipient device to a state represented by the shared image, as described above with regard to FIG. 22. Sharing a set of screens and a set of user input actions may allow a user to switch mobile devices while keeping a state, or may allow a recipient to achieve the state of the sender. Of course, the system may only share user input actions when authorized by the sender. In some implementations, when a user sends multiple screenshots, e.g., a range of screen shots captured in a certain timeframe, the system may stitch the screens together so that the recipient receives a larger image that can be scrolled, rather than individual screens. In some implementations the screen sharing mode may be automatic when the user is in a particular application (e.g., the camera or photo application). In some implementations, the device may share the screen each time a photo is taken. Automatic sharing may allow the user to post photos automatically to a second device operated by a user or by a friend or family of the user.

Figure 23:
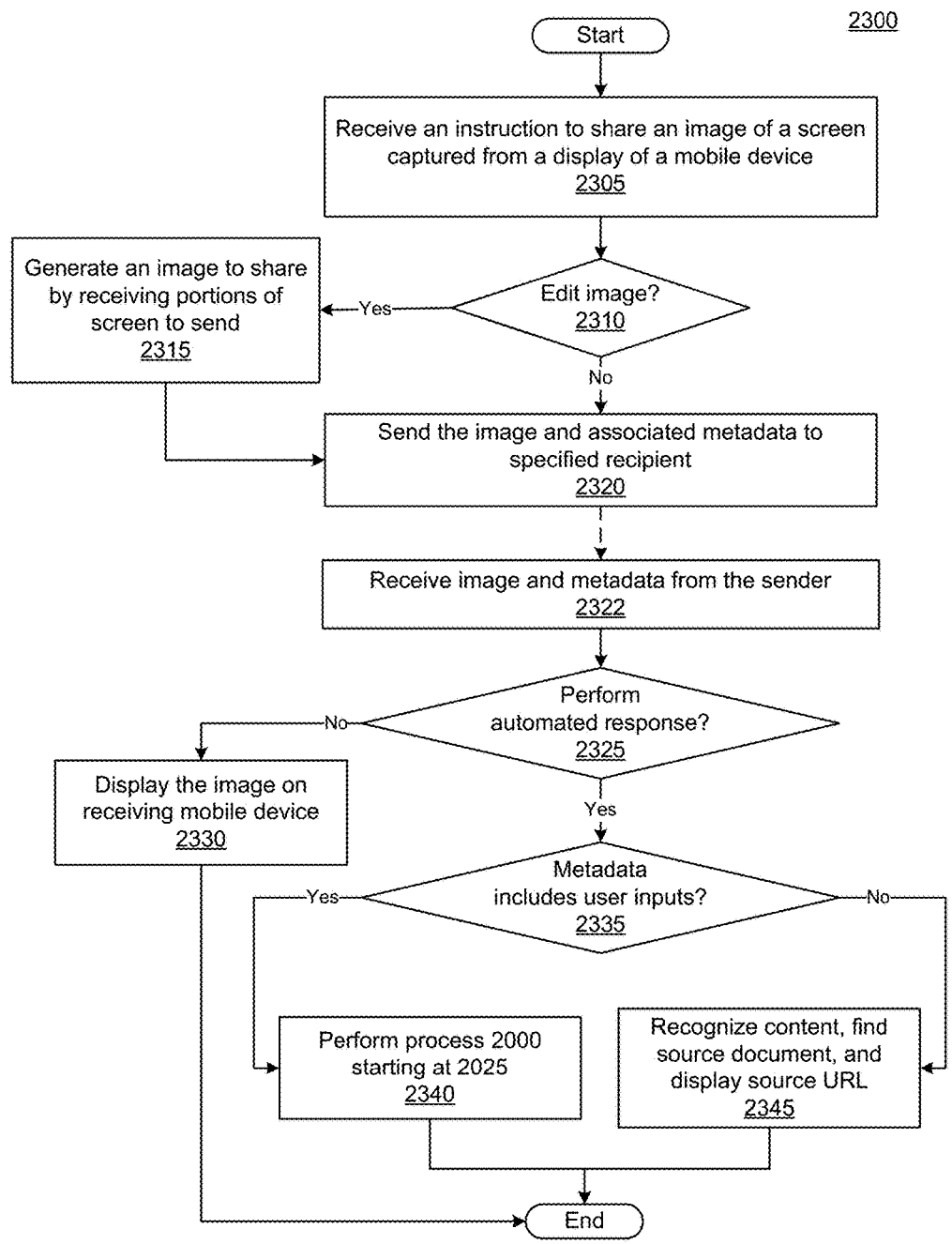
FIG. 23 illustrates a flow diagram of an example process for sharing an image of screen content displayed on a mobile device, in accordance with disclosed implementations.

FIG. 23 illustrates a flow diagram of an example process for sharing an image of screen content displayed on a mobile device, in accordance with disclosed implementations. Process 2300 may be performed by a mobile content context system, such as system 100 of FIG. 1 or system 300 of FIG. 3. Process 2300 may enable a user of a mobile device to share one screen or a series of previously captured screen images with a recipient. The recipient may be another mobile device for the same user or may be a mobile device for a different user.

Process 2300 may begin when the system receives an instruction to share an image of a screen captured from a display of a mobile device (2305). The instruction may be in the form of a gesture or an option in the notification bar. The image may be an image of a screen currently being displayed on the mobile device or may be an image from a previously captured screen. For example, the image may be an image that is part of a search result. In some implementations, the image may be a series of images taken over a period of time. In such implementations, the system may stitch together the series of images into a single image that is scrollable prior to sending the image. The system may determine whether the sender wants to edit the image to be shared prior to sending the image (2310). In other words, the system may provide the sender with an opportunity to indicate portions of the image to send or portions of the image not to send, e.g., portions to redact. If the sender wants to edit the image (2310, Yes) the system may provide the sender an interface where the sender can select a portion of the image to share or can select a portion of the image to redact (2315). In this manner the system enables the sender to redact or obscure information on the screen capture image prior to sharing the image or to share a limited portion of the image. Obscuring the image may include changing the image data in the redacted portion. For example the system may change the image data to all high values or all low values. In some implementations, the image may be transmitted without the redacted portions. In some implementations, the system may prompt the user to redact a portion. For example, if the user previously redacted a phone number before sharing a screen, and the system identifies the same phone number in the image, the system may suggest that the user redact the phone number again.

The system may transmit the image and associated metadata to a specified recipient mobile device (2320). The specified recipient mobile device may be a second mobile device operated by the sender, or can be a mobile device associated with another user. The metadata may include an application used to generate the screen image, a timestamp for the image, etc. In some implementations, the metadata may also include user input data associated with the image to be shared. For example, the system may provide the opportunity for the sender to indicate whether to share information that enables the recipient mobile device to automatically enter the state represented by the shared image. When the user indicates state information may be shared, the system may provide the set of user input data that occurred between a timestamp associated with a reference screen and the timestamp associated with the shared image, as discussed above. The metadata may also include any previously captured screen images with a timestamp between the timestamp for the reference image and the shared image. The image and associated metadata may be shared directly from the sending mobile device to the recipient mobile device, e.g., using a cellular network or wireless network, etc., or may be accomplished via a server. When the system uses a server as an intermediary, sending the image and associated metadata may include copying the image and associated metadata from a user account for the sender to a user account for the recipient and sending a notification to the recipient mobile device. In some implementations, sending the image and associated metadata may include providing access to image on the server to the recipient based on permissions established by the user.

At the recipient mobile device, the system may receive the image and the associated metadata from the sender (2322). The system may determine whether to perform an automated response in response to receiving the image (2325). For example, if the recipient mobile device does not have the screen capture mobile application installed or if the recipient has disabled automated responses on the mobile device, the system may not perform an automated response (2325, No) and the recipient mobile device may display the image as a picture or a mark-up document, such as an HTML document (2330). If the system displays the image as a mark-up document, the system may annotate the mark-up document so that various portions of the document are actionable For example, at a server the system may annotate the image with a generic profile and construct an HTML document from the image, making the entities actionable using conventional mark-up techniques. Thus, the recipient may receive the mark-up document rather than an image. If the recipient is running the screen capture mobile application, the recipient mobile device may generate annotation data for the shared image and display the annotation data for the image. Of course, the annotation data generated for the recipient may differ from any annotation data generated for the same image at the sending mobile device as the user context and preferences differ. Process 2300 then ends, having successfully shared the screen.

If the received image does trigger an automated response (2325, Yes), the system may determine whether the metadata associated with the received image includes user input data (2335). If it does not (2335, No), the system may perform recognition on the received image, as previously described (2245). Recognized items in the received image may be text characters or numbers, landmarks, logos, etc. identified using various recognition techniques, including character recognition, image recognition, logo recognition, etc. The system may use the recognized items to find a source document for the received image using conventional techniques. Such techniques are described in International Patent Publication No WO 2012/075315 entitled "Identifying Matching Canonical Documents in Response to a Visual Query," the disclosure of which is incorporated herein its entirety. The source document may be represented by a URL. The recipient's mobile device may then navigate to the URL in a browser application, or in other words open a window in the browser application with the URL. In some implementations, the recipient's mobile device may navigate to the URL using the mobile application identified in the metadata associated with the received image. For example, if the sender was viewing a news article in an SBC mobile application, the recipient's system may use the SBC mobile application to open the article. If the recipient's mobile device does not have the corresponding mobile application installed, the system may ask the recipient to install the application or may use a browser application to view the URL. Of course, if a source document cannot be located the recipient's mobile device may display the received image as discussed above with regard to step 2330.

When the metadata does include user inputs (2335, Yes), the system may use the user input data to replay the sender's actions to take the recipient's mobile device to a state represented by the shared image. In other words, the recipient's mobile device may perform process 2000 of FIG. 20 starting at step 2025, as the set of user input actions and the set of images are provided with the shared image to the recipient. Process 2300 then ends. Of course, the recipient's mobile device may capture the displayed screen and index the screen as described above. Process 2300 may enable the user of two mobile devices may transfer the state of one mobile device to the second mobile device, so that the user can switch mobile devices without having to re-create the state, saving time and input actions.

FIG. 25 shows an example of a generic computer device 2500, which may be operated as system 100, and/or client 170 of FIG. 1, which may be used with the techniques described here. Computing device 2500 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 2500 includes a processor 2502, memory 2504, a storage device 2506, and expansion ports 2510 connected via an interface 2508. In some implementations, computing device 2500 may include transceiver 2546, communication interface 2544, and a GPS (Global Positioning System) receiver module 2548, among other components, connected via interface 2508. Device 2500 may communicate wirelessly through communication interface 2544, which may include digital signal processing circuitry where necessary. Each of the components 2502, 2504, 2506, 2508, 2510, 2540, 2544, 2546, and 2548 may be mounted on a common motherboard or in other manners as appropriate.

The processor 2502 can process instructions for execution within the computing device 2500, including instructions stored in the memory 2504 or on the storage device 2506 to display graphical information for a GUI on an external input/output device, such as display 2516. Display 2516 may be a monitor or a flat touchscreen display. In some implementations, multiple processors and/or multiple buses may be used, as appropriate, along with multiple memories and types of memory. Also, multiple computing devices 2500 may be connected, with each device providing portions of the necessary operations (e.g., as a server bank, a group of blade servers, or a multi-processor system).

The memory 2504 stores information within the computing device 2500. In one implementation, the memory 2504 is a volatile memory unit or units. In another implementation, the memory 2504 is a non-volatile memory unit or units. The memory 2504 may also be another form of computer-readable medium, such as a magnetic or optical disk. In some implementations, the memory 2504 may include expansion memory provided through an expansion interface.

The storage device 2506 is capable of providing mass storage for the computing device 2500. In one implementation, the storage device 2506 may be or include a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 2504, the storage device 2506, or memory on processor 2502.

The interface 2508 may be a high-speed controller that manages bandwidth-intensive operations for the computing device 2500 or a low speed controller that manages lower bandwidth-intensive operations, or a combination of such controllers. An external interface 2540 may be provided so as to enable near area communication of device 2500 with other devices. In some implementations, controller 2508 may be coupled to storage device 2506 and expansion port 2514. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2500 may be implemented in a number of different forms, as shown in the figure. For example, it may be implemented as a standard server 2530, or multiple times in a group of such servers. It may also be implemented as part of a rack server system. In addition, it may be implemented in a computing device, such as a laptop computer 2532, personal computer 2534, or tablet/smart phone 2536. An entire system may be made up of multiple computing devices 2500 communicating with each other. Other configurations are possible.

FIG. 26 shows an example of a generic computer device 2600, which may be system 100 of FIG. 1, which may be used with the techniques described here. Computing device 2600 is intended to represent various example forms of large-scale data processing devices, such as servers, blade servers, datacenters, mainframes, and other large-scale computing devices. Computing device 2600 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 2600 may include any number of computing devices 2680. Computing devices 2680 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 2680a includes multiple racks 2658a-2658n. Each rack may include one or more processors, such as processors 2652a-2652n and 2662a-2662n. The processors may include data processors, network attached storage devices, and other computer controlled devices. In some implementations, one processor may operate as a master processor and control the scheduling and data distribution tasks. Processors may be interconnected through one or more rack switches 2658, and one or more racks may be connected through switch 2678. Switch 2678 may handle communications between multiple connected computing devices 2600.

Each rack may include memory, such as memory 2654 and memory 2664, and storage, such as 2656 and 2666. Storage 2656 and 2666 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 2656 or 2666 may be shared between multiple processors, multiple racks, or multiple computing devices and may include a computer-readable medium storing instructions executable by one or more of the processors. Memory 2654 and 2664 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 2654 may also be shared between processors 2652a-2652n. Data structures, such as an index, may be stored, for example, across storage 2656 and memory 2654. Computing device 2600 may include other components not shown, such as controllers, buses, input/output devices, communications modules, etc.

An entire system, such as system 100, may be made up of multiple computing devices 2600 communicating with each other. For example, device 2680a may communicate with devices 2680b, 2680c, and 2680d, and these may collectively be known as system 100. As another example, system 100 of FIG. 1 may include one or more computing devices 2600. Some of the computing devices may be located geographically close to each other, and others may be located geographically distant. The layout of system 2600 is an example only and the system may take on other layouts or configurations.

According to certain aspects of the disclosure, a mobile device includes at least one processor and memory storing a graph-based data store of entities connected by edges and recognized items identified by performing recognition on each of a plurality of images of screens captured on the mobile device. The memory may also store instructions that, when executed by the at least one processor, cause the mobile device select a set of images from the plurality of images, the set representing a chronological window of time, each image in the set having a timestamp within the chronological window, and to identify entities from the graph-based data store in the recognized items of images in a first portion of the window using recognized items for images in a remaining portion of the window as context to disambiguate ambiguous entity references.

These and other aspects can include one or more of the following features. For example, the first portion may be a middle portion and the remaining portion includes a front portion of images having a timestamp prior to timestamps for images in the middle portion and a back portion of images having a timestamp after the timestamps for the images in the middle portion. As another example, the memory may further store, for each of the plurality of images, a mobile application associated with the image and selecting the set of images includes using the associated mobile applications to determine the set. As another example, the memory may further store, for each of the plurality of images, a mobile application associated with the image and selecting the set of images can include determining that a next chronological image is associated with a mobile application that differs from a mobile application associated with a last image in the set and closing the set in response to the determining. In some such implementations, the first portion may be a last portion and the remaining portion may include images having a timestamp prior to timestamps for images in the last portion.

As another example, the memory may further store, for each of the plurality of images, a mobile application associated with the image and selecting the set of images can include determining that a next chronological image is associated with a first mobile application that differs from a seconding mobile application associated with a last image in the set, determining that the first mobile application launched the second mobile application, and including the next chronological image in the set. As another example, the instructions further include instructions that, when executed by the at least one processor, cause the mobile device to determine, from the entities in the first portion, at least one entity that is an outlier and to store, in a user profile in the memory, the entities identified in the first portion except for the at least one entity. As another example, the instructions may further include instructions that, when executed by the at least one processor, cause the mobile device to calculate a rank for a first entity of the entities identified in the first portion based on an amount of time the first entity appears in the images. In some such implementations, calculating the rank can include determining that a location of the first entity remains constant across images and downgrading the rank in response to the determining.

According to certain aspects of the disclosure, a computer system includes at least one processor and memory storing instructions that, when executed by the at least one processor, cause the system to receive, from a mobile device, an image of a screen displayed on the mobile device, to identify recognized items for the image by performing recognition on the image, and to repeat the receiving and identifying for a plurality of images. The instructions may also include instructions that, when executed by the at least one processor, cause the system to select a set of images from the plurality of images, the set representing a chronological window of time, each image in the set having a timestamp within the chronological window and to identify entities appearing in the recognized items for images in a first portion of the window using the recognized items for images in a remaining portion of the window as context to disambiguate ambiguous entity references.

These and other aspects can include one or more of the following features. For example, the memory may further store instructions that, when executed by the at least one processor, causes the system to determine that a first candidate entity and a second candidate entity each correspond to a same recognized item for a first image in the first portion of the window, to determine that the first candidate entity shares a category with a mobile application associated with the first image, and to select the first candidate entity over the second candidate entity based on sharing the category. In some such implementations, the second candidate entity may have a higher prior probability than the first candidate entity. As another example, the memory may further store instructions that, when executed by the at least one processor, causes the system to determine that a next chronological image is associated with a mobile application that differs from a mobile application associated with a last image in the set and to close the set in response to the determining. As another example, the memory may further store instructions that, when executed by the at least one processor, causes the system to determine that a next chronological image is associated with a first mobile application that differs from a seconding mobile application associated with a last image in the set, to determine that the first mobile application launched the second mobile application, and to include the next chronological image in the set.

As another example, the instructions may also include instructions that, when executed by the at least one processor, cause the system to calculate a rank for a first entity of the entities identified in the first portion based on an amount of time the first entity appears in the images and to store the first entity with the rank in the memory. In some such implementations, calculating the rank can include determining that a location of the first entity remains constant across images and downgrading the rank in response to the determining.

According to certain aspects of the disclosure, a method includes receiving an image captured from a mobile device display for a mobile application, determining a window that includes a chronological set of images, the images each representing a respective screen captured from a display of a mobile device and having an associated timestamp, and identifying entities appearing in images in a first portion of the window using text for images in a remaining portion of the window as context to disambiguate ambiguous entity references.

These and other aspects can include one or more of the following features. For example, the first portion may be a middle portion and the remaining portion can include a front portion of images having a timestamp prior to timestamps for images in the middle portion and a back portion of images having a timestamp after the timestamps for the images in the middle portion. As another example, selecting the set of images can include determining that a next chronological image is associated with a mobile application that differs from a mobile application associated with a last image in the set and closing the set in response to the determining. In some such implementations, the first portion may be a last portion and the remaining portion may include images having a timestamp prior to timestamps for images in the last portion. As another example, selecting the set of images can include determining that a next chronological image is associated with a first mobile application that differs from a seconding mobile application associated with a last image in the set, determining that the first mobile application launched the second mobile application, and including the next chronological image in the set.

As another example, the method may also include providing the identified entities to the mobile device for customizing a mobile application and/or the method may include calculating a rank for a first entity of the entities identified in the first portion based on an amount of time the first entity appears in the images. In some implementations, calculating the rank can include determining that a location of the first entity remains constant and downgrading the rank in response to the determining. As another example, the mobile application may be a first mobile application and the method further includes determining a quantity of mobile applications associated with images having a first entity and boosting a rank of the first entity when the first entity is associated with more than one mobile application. As another example, the window may represent a fixed time period or the window may represent a quantity of images.

According to certain aspects of the disclosure, a method includes capturing a screen displayed on a mobile device as an image, sending the image to a server, and determining when to repeat the capturing and sending based on user interaction with the screen. These and other aspects can include one or more of the following features. For example, determining when to repeat the capturing and sending can include repeating the capturing and sending at a first interval when the screen displayed on the mobile device is static and repeating the capturing and sending at a second interval when the screen is not static. In addition or optionally, the second interval is no longer than one second. As another example, the method may also include receiving data from the server generated from the image and using the data to personalize the screen displayed to the user. As another example, the method may also include identifying entities from a data graph that appear in content represented by the captured screen and storing, in a user profile, the entities identified.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middle-ware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
  receiving a screen capture image from a client device, the screen capture image being generated responsive to a command from a user, and the screen capture image including content generated by an application;
  saving the screen capture image in a data store of images, the data store of images being associated with a user profile of the user;
  associating a timestamp with the screen capture image; and
  receiving an expiration time for the screen capture image from the user,
  wherein the screen capture image is available for display until the expiration time.

2. The method of claim 1, further comprising removing the screen capture image from the data store after the expiration time.

3. The method of claim 1, further comprising, prior to reaching the expiration time of the screen capture image:
  receiving a request from the user to share the screen capture image;
  receiving a destination; and
  making the screen capture image available to the destination.

4. The method of claim 3, further comprising:
  providing an interface displaying a selectable thumbnail for a portion of the images in the data store of images, the screen capture image being included in the portion; and
  receiving a selection of the thumbnail for the screen capture image, wherein the request to share the screen capture image is received subsequent to the selection of the thumbnail.

5. The method of claim 3, wherein the destination is a receiving user and making the screen capture image available to the destination includes copying the screen capture image from the data store of images associated with the user profile of the user to a data store of images associated with a user profile of the receiving user.

6. The method of claim 3, further comprising:
  receiving, from the user, a request to edit the screen capture image;
  receiving a selection of a portion of the image from the user; and
  obscuring the selected portion of the screen capture image.

7. The method of claim 1, wherein the data store is located on the client device.

8. The method of claim 1, wherein the data store is located on a server communicatively connected to the client device.

9. A personal computing device comprising:
  at least one processor formed in a substrate;
  a display device; and
  a memory storing instructions that, when executed by the at least one processor, cause the personal computing device to perform operations including:

receiving a command from a user of the personal computing device to capture content displayed on the display device, the content having been generated by an application, generating a screen capture image of the content responsive to receiving the command, receiving an expiration time for the screen capture image from the user, and saving the screen capture image in a data store of images, the data store of images being associated with a user profile of the user, wherein the screen capture image is available for display until the expiration time.

10. The device of claim 9, wherein the data store is located on the personal computing device.

11. The device of claim 10, wherein the operations further include removing the screen capture image from the data store after the expiration time.

12. The device of claim 9, wherein the operations further include, prior to reaching the expiration time of the screen capture image:

receiving a request from the user to share the screen capture image;

receiving a destination; and making the screen capture image available to the destination.

13. The device of claim 12, wherein the operations further include:

providing an interface displaying a selectable thumbnail for a portion of the images in the data store of images, the screen capture image being included in the portion; and receiving a selection of the thumbnail for the screen capture image, wherein the request to share the screen capture image is received subsequent to the selection of the thumbnail.

14. The device of claim 12, wherein the operations further include:

receiving, from the user, a request to edit the screen capture image;

receiving a selection of a portion of the image from the user; and obscuring the selected portion of the screen capture image.

15. The device of claim 9, wherein saving the screen capture image in a data store of images includes sending the screen capture image to a server communicatively connected to the device, wherein the server stores the screen capture image.

16. A non-transitory computer-readable storage medium having stored thereon computer executable program code which, when executed on a computer system, causes the computer system to perform operations comprising:

receiving a screen capture image, the screen capture image being generated responsive to a command from a user of a client device, and the screen capture image including content generated by an application executing on the client device;

receiving an expiration time for the screen capture image, the expiration time being from the user;

saving the screen capture image in a data store of images, the data store of images being associated with a user profile of the user; and associating a timestamp with the screen capture image, wherein the screen capture image is available for display until the expiration time.

17. The computer-readable medium of claim 16, the operations further comprising removing the screen capture image from the data store after the expiration time.

18. The computer-readable medium of claim 16, the operations further comprising, prior to reaching the expiration time of the screen capture image:

receiving a request from the user to share the screen capture image;

receiving a destination; and making the screen capture image available to the destination.

19. The computer-readable medium of claim 18, the operations further comprising:

displaying a selectable thumbnail for a portion of the images in the data store of images, the screen capture image being included in the portion; and receiving a selection of the thumbnail for the screen capture image, wherein the request to share the screen capture image is received subsequent to the selection of the thumbnail.

20. The computer-readable medium of claim 18, wherein the destination is a receiving user and making the screen capture image available to the destination includes copying the screen capture image from the data store of images associated with the user profile of the user to a data store of images associated with a user profile of the receiving user.

* * * * *